(12) United States Patent
Tadayon et al.

(10) Patent No.: US 11,910,207 B2
(45) Date of Patent: *Feb. 20, 2024

(54) SYSTEMS AND METHODS FOR ESTIMATING LOCATIONS OF SIGNAL SHADOWING OBSTRUCTIONS AND SIGNAL REFLECTORS IN A WIRELESS COMMUNICATIONS NETWORK

(71) Applicants: Navid Tadayon, Kanata (CA); Alireza Bayesteh, Ottawa (CA)

(72) Inventors: Navid Tadayon, Kanata (CA); Alireza Bayesteh, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/736,272

(22) Filed: May 4, 2022

(65) Prior Publication Data

US 2022/0272551 A1 Aug. 25, 2022

Related U.S. Application Data

(63) Continuation of application No. 16/695,909, filed on Nov. 26, 2019, now Pat. No. 11,350,293.

(51) Int. Cl.
*H04W 24/04* (2009.01)
*H04W 64/00* (2009.01)
(Continued)

(52) U.S. Cl.
CPC .......... *H04W 24/04* (2013.01); *H04L 1/0003* (2013.01); *H04W 16/24* (2013.01); *H04W 36/16* (2013.01); *H04W 64/006* (2013.01); *H04W 92/18* (2013.01)

(58) Field of Classification Search
CPC .... H04L 1/0003; H04W 16/24; H04W 24/04; H04W 36/16; H04W 64/006; H04W 92/18
See application file for complete search history.

(56) References Cited

U.S. PATENT DOCUMENTS 6,728,226 B1 4/2004 Naito
7,574,221 B2 8/2009 Guvenc et al.
(Continued)

FOREIGN PATENT DOCUMENTS

CN 103379576 A * 10/2013
CN 103379576 A 10/2013
(Continued)

OTHER PUBLICATIONS

Huawei et al., V2X sidelink channel model, 3GPP TSG RAN WG1 Meeting #93, Busan, Korea, May 21 May 25, 2018, R1-1807672, 29 pages.
(Continued)

*Primary Examiner* — Eric Nowlin

(57) ABSTRACT

A method and User Equipment (UE) for estimating locations of obstacles to signal transmission in a wireless communication network is disclosed. The method involves at the UE in communication with the network, in response to receiving a reference signal from a neighboring node via a non-line-of-sight (NLoS) transmission, transmitting an identification of the neighboring node to network equipment implementing the wireless communications network to facilitate estimating locations of the obstacles to signal transmission based on estimates of the location of the UE and the neighboring node.

20 Claims, 24 Drawing Sheets

(51) Int. Cl.
*H04L 1/00* (2006.01)
*H04W 36/16* (2009.01)
*H04W 16/24* (2009.01)
*H04W 92/18* (2009.01)

(56) References Cited

U.S. PATENT DOCUMENTS

| | | | |
|---|---|---|---|
| 7,577,445 B2 | 8/2009 | Guvenc et al. | |
| 7,577,446 B2 | 8/2009 | Guvenc et al. | |
| 9,363,645 B2 | 6/2016 | Lavery | |
| 9,801,148 B2 | 10/2017 | Yu et al. | |
| 10,091,709 B2 | 10/2018 | Yang et al. | |
| 10,091,754 B2 | 10/2018 | Miller et al. | |
| 10,098,014 B1 | 10/2018 | Shimizu et al. | |
| 10,257,647 B2 | 4/2019 | Kordybach et al. | |
| 10,284,316 B2 | 5/2019 | Zhihua et al. | |
| 10,333,638 B2 | 6/2019 | Zhihua et al. | |
| 10,469,619 B2 | 11/2019 | Shimizu et al. | |
| 10,506,545 B2* | 12/2019 | Choi | H04W 76/10 |
| 10,536,924 B2* | 1/2020 | Hwang | G01S 5/0295 |
| 10,624,023 B2 | 4/2020 | Kahtava et al. | |
| 10,932,221 B2 | 2/2021 | Grossmann et al. | |
| 11,075,929 B1 | 7/2021 | Li et al. | |
| 11,239,941 B2* | 2/2022 | Nguyen | H04L 1/189 |
| 11,329,780 B2* | 5/2022 | Soriaga | H04W 56/001 |
| 11,350,293 B2* | 5/2022 | Tadayon | H04W 36/16 |
| 2005/0281363 A1 | 12/2005 | Qi et al. | |
| 2008/0032708 A1 | 2/2008 | Guvenc et al. | |
| 2008/0032709 A1 | 2/2008 | Guvenc et al. | |
| 2008/0032710 A1 | 2/2008 | Guvenc et al. | |
| 2011/0077013 A1 | 3/2011 | Cho et al. | |
| 2012/0075987 A1 | 3/2012 | Yoneyama et al. | |
| 2013/0310044 A1 | 11/2013 | Rakos et al. | |
| 2015/0111597 A1 | 4/2015 | Lavery | |
| 2015/0327193 A1 | 11/2015 | Yu et al. | |
| 2015/0338522 A1 | 11/2015 | Miller et al. | |
| 2015/0341886 A1 | 11/2015 | Miller et al. | |
| 2015/0382318 A1* | 12/2015 | Kim | G01S 5/0054 455/456.5 |
| 2016/0037466 A1 | 2/2016 | Yang et al. | |
| 2016/0134402 A1 | 5/2016 | Park et al. | |
| 2016/0295366 A1 | 10/2016 | Priyanto et al. | |
| 2017/0108579 A1 | 4/2017 | Irvine et al. | |
| 2017/0289953 A1 | 10/2017 | Chae | |
| 2017/0338901 A1 | 11/2017 | Zhihua et al. | |
| 2017/0366244 A1 | 12/2017 | Lee et al. | |
| 2017/0367067 A1* | 12/2017 | Hwang | H04W 56/007 |
| 2018/0035255 A1 | 2/2018 | Kordybach et al. | |
| 2018/0234913 A1 | 8/2018 | Kahtava et al. | |
| 2018/0278349 A1 | 9/2018 | Zhihua et al. | |
| 2019/0094196 A1 | 3/2019 | Park et al. | |
| 2019/0181920 A1 | 6/2019 | Rofougaran et al. | |
| 2019/0223140 A1 | 7/2019 | Grossman et al. | |
| 2019/0238658 A1 | 8/2019 | Shimizu et al. | |
| 2019/0369201 A1 | 12/2019 | Akkarakaran et al. | |
| 2019/0372688 A1 | 12/2019 | Sadiq et al. | |
| 2020/0068044 A1 | 2/2020 | Shimizu et al. | |
| 2020/0228272 A1* | 7/2020 | Soriaga | H04W 56/001 |
| 2020/0229010 A1 | 7/2020 | Soriaga et al. | |
| 2020/0235848 A1* | 7/2020 | Nguyen | H04W 28/26 |
| 2020/0249339 A1 | 8/2020 | Li et al. | |
| 2020/0317339 A1 | 10/2020 | Ju et al. | |
| 2020/0393532 A1 | 12/2020 | Chae et al. | |
| 2021/0041522 A1 | 2/2021 | Manolakos et al. | |
| 2021/0136527 A1 | 5/2021 | Tadayon et al. | |
| 2021/0160712 A1 | 5/2021 | Tadayon et al. | |
| 2022/0236396 A1* | 7/2022 | Choi | G01S 13/86 |
| 2022/0272551 A1* | 8/2022 | Tadayon | H04W 64/006 |
| 2022/0312153 A1* | 9/2022 | Manolakos | H04W 64/00 |
| 2023/0034336 A1* | 2/2023 | Shin | G01S 5/0284 |
| 2023/0266425 A1* | 8/2023 | Sandgren | G01S 5/0218 342/451 |
| 2023/0276402 A1* | 8/2023 | Wu | G01S 13/931 455/456.1 |
| 2023/0300568 A1* | 9/2023 | Zhao | G01S 19/45 455/456.1 |
| 2023/0314547 A1* | 10/2023 | Alawieh | G01S 5/021 455/456.1 |

FOREIGN PATENT DOCUMENTS

| | | | |
|---|---|---|---|
| CN | 104242996 A | 12/2014 | |
| CN | 108418645 A | 8/2018 | |
| CN | 108446547 A * | 8/2018 | |
| CN | 108418645 B | 11/2020 | |
| CN | 113287344 A * | 8/2021 | H04B 17/24 |
| CN | 116710795 A * | 9/2023 | G01S 13/42 |
| EP | 3354069 A1 | 8/2018 | |
| EP | 3707943 A1 | 9/2020 | |
| EP | 3707943 A4 | 11/2020 | |
| EP | 3354069 B1 | 12/2020 | |
| KR | 20170141471 A * | 12/2017 | |
| KR | 20210114947 A * | 9/2021 | |
| TW | 202034716 A * | 9/2020 | H04B 17/24 |
| WO | 2017050869 A1 | 3/2017 | |
| WO | 2019084946 A1 | 5/2019 | |
| WO | 2019160340 A1 | 8/2019 | |
| WO | WO-2019160340 A1 * | 8/2019 | H04B 17/0082 |
| WO | 2019232456 A1 | 12/2019 | |
| WO | WO-2019232456 A1 * | 12/2019 | G01S 1/0428 |
| WO | WO-2020150172 A1 * | 7/2020 | H04B 17/24 |
| WO | 2021030685 A1 | 2/2021 | |
| WO | WO-2021089003 A1 * | 5/2021 | H04L 5/0048 |
| WO | WO-2021253018 A2 * | 12/2021 | G01S 11/02 |
| WO | WO-2022033695 A1 * | 2/2022 | G01S 5/0218 |
| WO | WO-2022133416 A1 * | 6/2022 | G01S 5/0218 |
| WO | WO-2022164506 A1 * | 8/2022 | G01S 13/42 |

OTHER PUBLICATIONS

J. Borras, P. Hatrack and N. Mandayam, "Decision Theoretic Framework for NLOS Identification," IEEE VTC 1998, May 1998, pp. 1583-1587.

C. Wu, Z. Yang, Z. Zhou, K. Qian, Y. Liu and M. Liu, "PhaseU: Real-time LOS Identification with WiFi," 2015 IEEE Conference on Computer Communications (INFOCOM), Kowloon, 2015, pp. 2038-2046.

I. Guvenc, C. Chong, F. Watanabe and H. Inamura, "NLOS Identification and Weighted Least-Squares Localization for UWB Systems Using Multipath Channel Statistics," EURASIP Journal on Advances in Signal Processing, vol. 2008, 2008, pp. 1-14.

H. Wymeersch, S. Marano, W. Gifford and M. Win, "Machine Learning Approach to Ranging Error Mitigation for UWB Localization," IEEE Transactions on Communications, vol. 60, No. 6, 2012, pp. 1719-1728.

S. Marano, W. M. Gifford, H. Wymeersch and M. Win, "NLOS Identification and Mitigation for Localization Based on UWB Experimental Data," IEEE Journal on Selected Areas in Communications, vol. 28, No. 7, 2010, pp. 1026-1035.

I. Guvenc, C. Chong, and F. Watanabe, "NLOS Identification and Mitigation for UWB Localization Systems, " 2007 IEEE Wireless Communications and Networking Conference, Kowloon, China, Mar. 11-15, 2007, pp. 1573-1578.

J. Wilson, and N. Patwari, Radio Tomographic Imaging with Wireless Networks, IEEE Transactions on Mobile Computing, vol. 9, No. 5, May 2010, pp. 621-632.

J. Wilson, and N. Patwari, "See-Through Walls: Motion Tracking Using Variance-Based Radio Tomography Networks", IEEE Transactions on Mobile Computing, vol. 10, No. 5, May 2011, pp. 612-621.

Francois et al, A correlated shadowing model for urban wireless networks, Apr. 2015, IEEE INFOCOM 2015—IEEE Conference on Computer Communications, Kowloon, Hong Kong (Hong Kong), DOI: 10.1109/INFOCOM.2015.7218450 (Year: 2015).

* cited by examiner

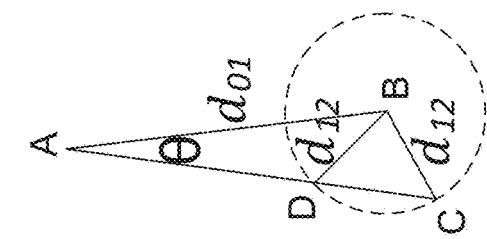
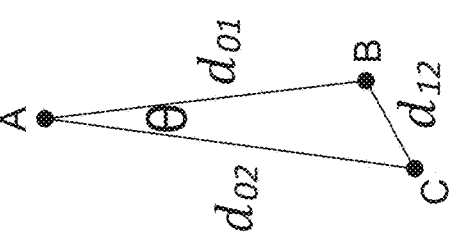
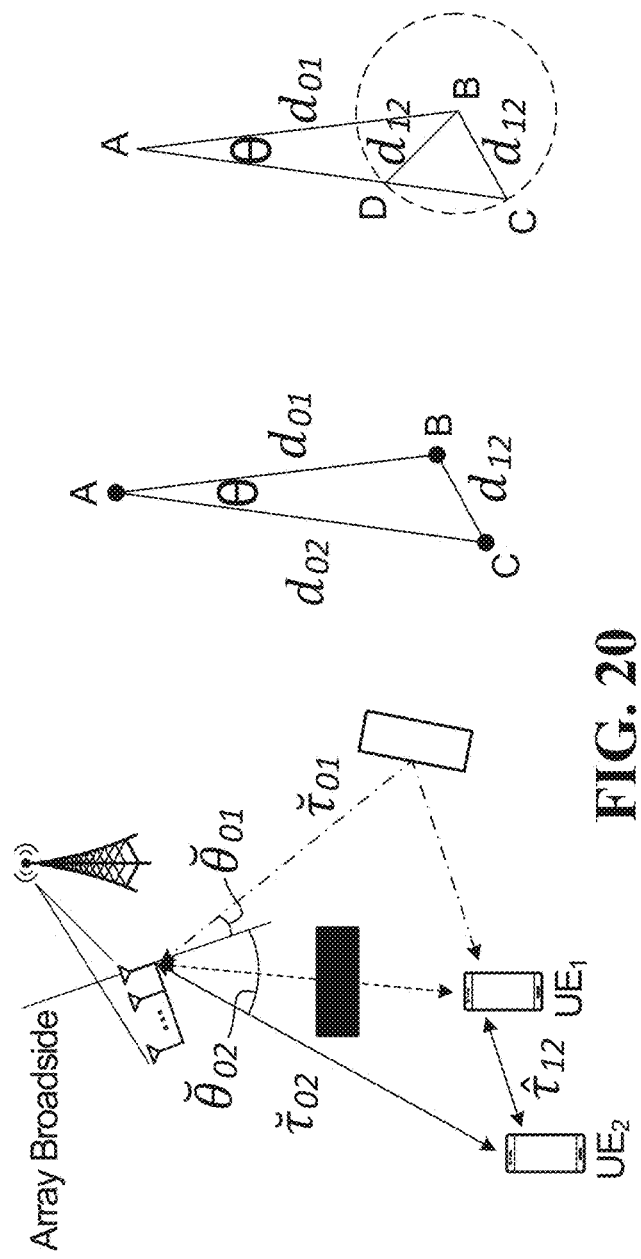
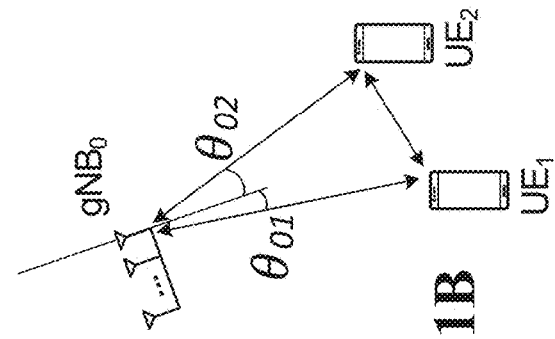
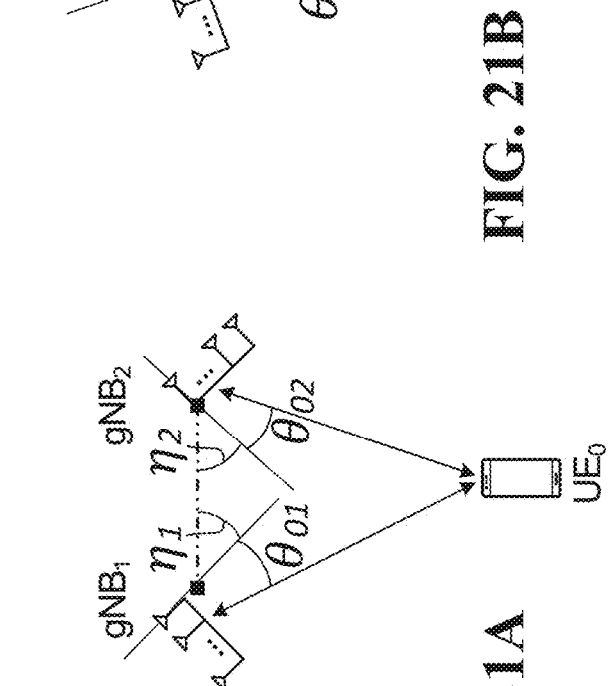
FIG. 20
FIG. 21A
FIG. 21B

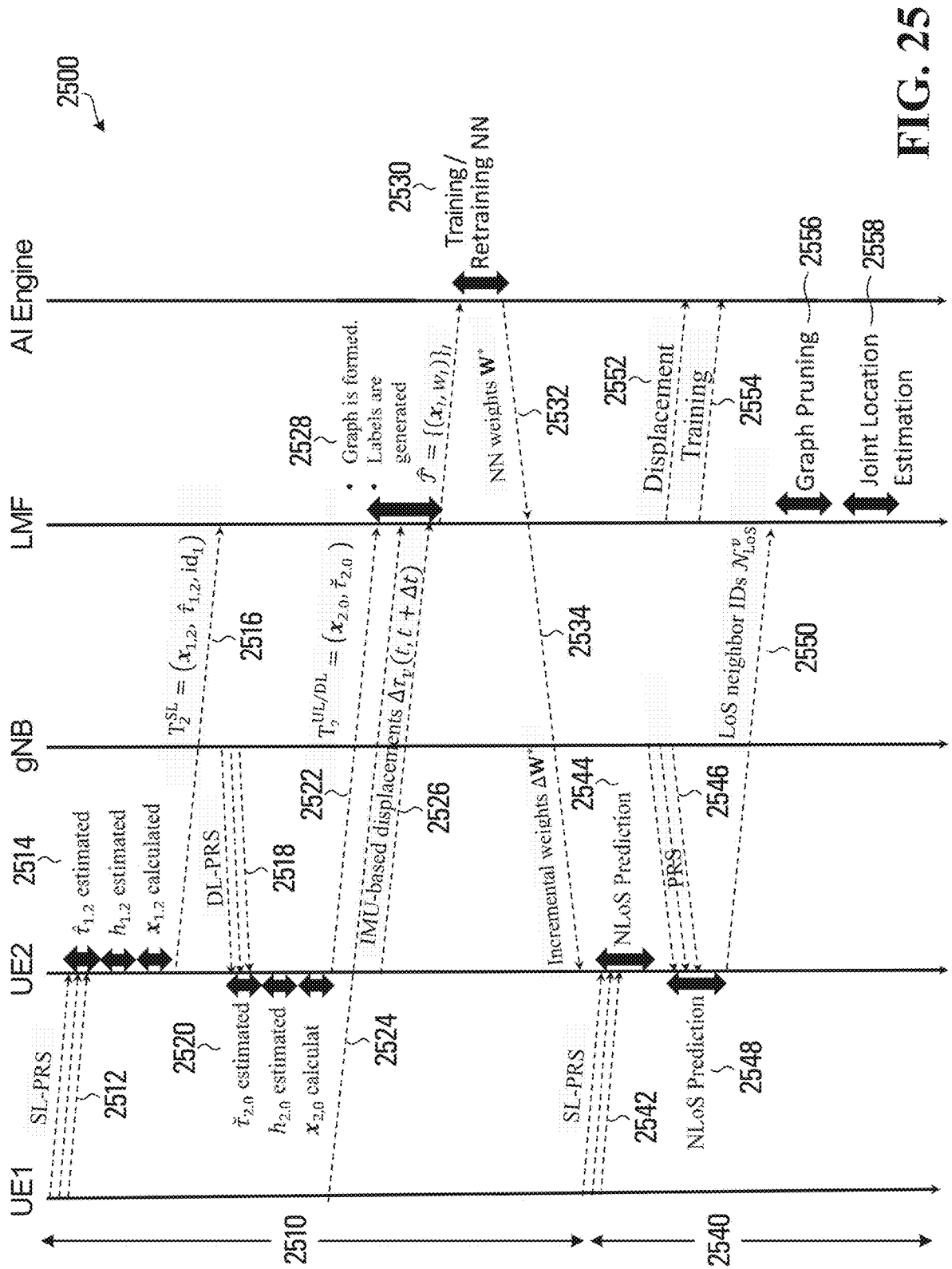

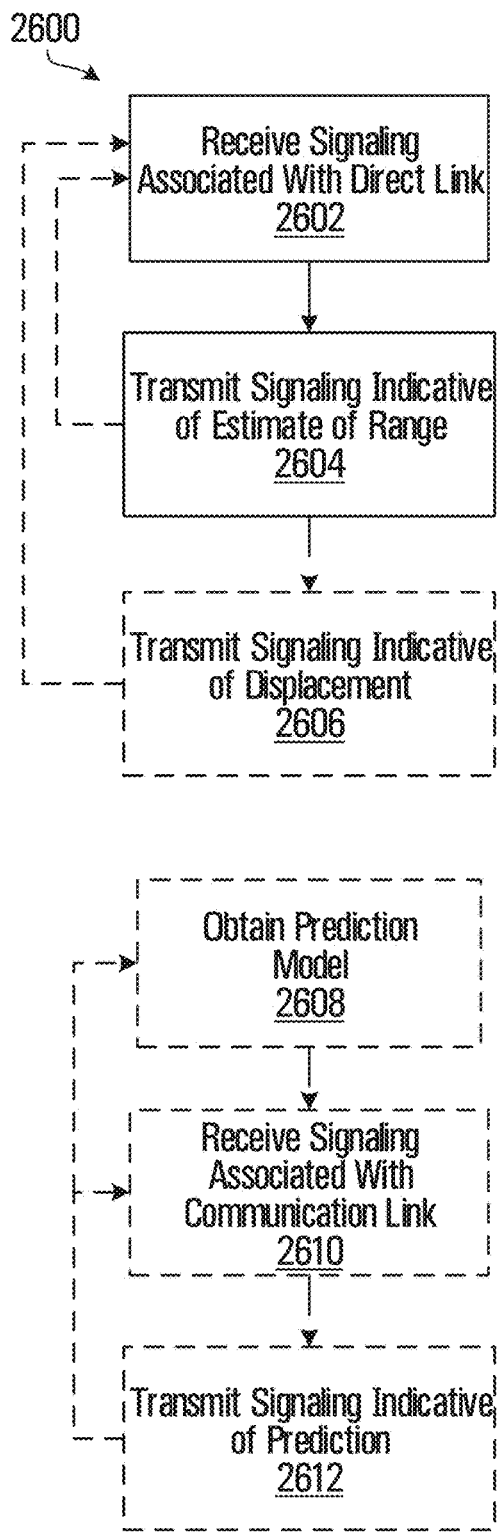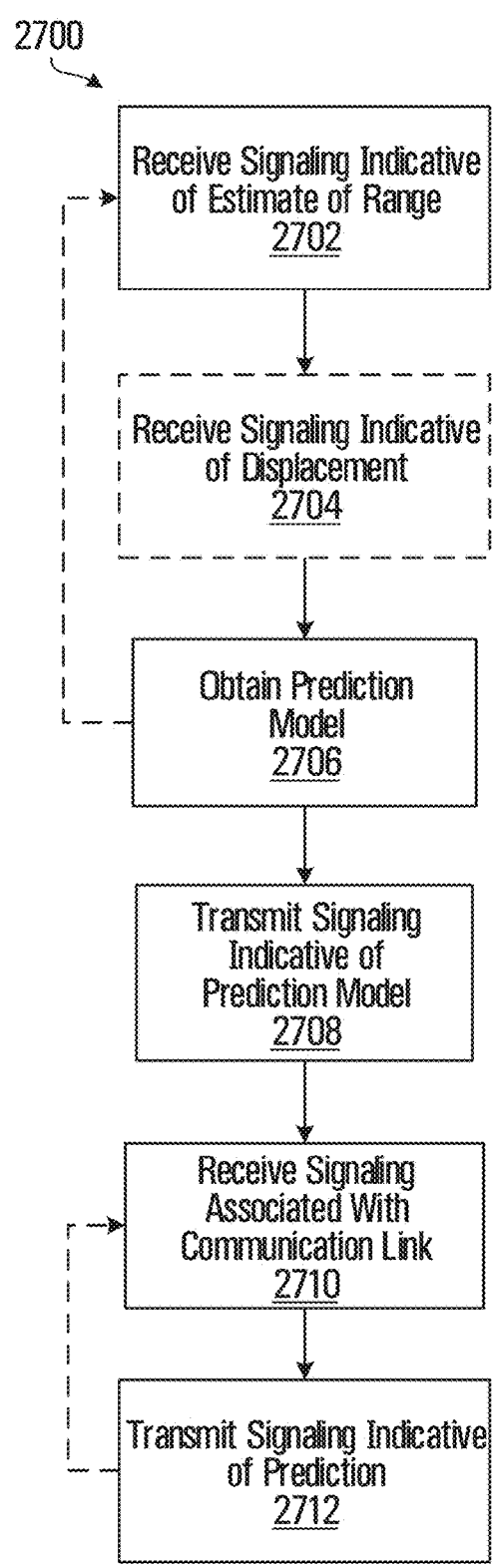
FIG. 26                    FIG. 27 ns network. The handoff

SYSTEMS AND METHODS FOR ESTIMATING LOCATIONS OF SIGNAL SHADOWING OBSTRUCTIONS AND SIGNAL REFLECTORS IN A WIRELESS COMMUNICATIONS NETWORK

CROSS REFERENCE TO RELATED APPLICATIONS

The present application is a continuation of U.S. patent application Ser. No. 16/695,909, filed Nov. 26, 2019, the contents of which are hereby incorporated herein by reference.

FIELD

The present disclosure relates generally to wireless communications, and in particular embodiments, to systems and methods for estimating locations of signal shadowing obstructions and signal reflectors in a wireless communications network

BACKGROUND

In wireless communication networks such as cellular networks, obstructions such as buildings and natural geographic features may reflect, scatter, or shadow signals propagating between transmitters and receivers in the network. These obstructions may be considered to be passive in the sense that the signals neither originate from nor terminate at these obstructions. In current cellular networks that implement beamforming to direct beams and configure transmission parameters, a lack of knowledge of the location and extent of obstructions makes beamforming an essentially blind process that can only react when weak transmissions or complete transmission failures occur.

Transmission beamforming is currently implemented as an analog beam-steering process where beams of fixed beam width are steered through the environment by adjustment of antenna phases at the transmitting antennas. Beam-steering is essentially a time-sharing process where the transmitter dwells at each angular segment for a time period to transmit to user equipment (UE) within the segment before moving on to the next segment. When a beam is obstructed, the signal-to-noise ratio (SNR) for received signals generally drops significantly, resulting in increased bit error rates (BER). The transmitter may compensate after the BER increase occurs by increasing the transmitted power, however this only addresses the problem after the fact. As a result, data packets may be dropped or delayed, a problem that is currently remedied by imposing a feedback overhead on the network to cause the transmitted power to be reactively increased.

Cellular networks often operate in regions that have numerous obstructions that contribute toward a highly multipath transmission environment. The obstructions not only reflect the propagating signals between transmitters and receivers, but can also attenuate or completely block the signals. The RF signal attenuation due to obstructions can be greater than path loss effects due to the propagation distance of the signal.

To increase spectral efficiency and have better control on interference patterns in the transmission environment, the cell size in cellular networks has been reduced. Additionally, for highly mobile UEs, it is necessary to hand off communications between base stations more frequently to ensure that the UEs connectivity is not interrupted. The handoff process is typically managed at network equipment remote from the transmitter, which causes additional delays and burdens the network because the UEs are supposed to remain unaware of the detachment/re-attachment processes.

Although both being caused by interaction of electromagnetic waves with atoms and molecules, shadowing and reflection are two independent propagation phenomena that deteriorate the quality of communication in wireless communication systems. Shadowing impacts communications through intermittent power budget loss due to communication links being attenuated by large and small obstructions. Reflection impacts communications by causing multipath interference between signals propagating over more than one path between transmitter and receiver.

Locations of some shadowing and reflecting obstructions may be established by employing sensing techniques such as satellite images, video image scanning, infrared imaging, RADAR, LIDAR, etc. However, implementation of these techniques would be costly and also un-scalable. Additionally, simply determining physical locations of obstructions may not provide the information necessary for communication at cellular radio frequencies. Obstructions will vary considerably depending on their composition, such as the amount of steel reinforcing in a concrete building vs. a wood building, for example. The signal transmission effects of obstructions on microwave and mmWave communications might be difficult to determine based on only the physical location of the obstructions established by light, ultrasound, terahertz waves, etc. used in the above sensing techniques.

SUMMARY

In accordance with one disclosed aspect there is provided a method for estimating locations of signal shadowing obstructions in a wireless communication network. The method involves at a network equipment, receiving from User Equipments (UEs), an identification of neighboring UEs from which the UEs have received a reference signal via a non-line-of-sight (NLoS) sidelink transmission. The method also involves estimating locations of signal shadowing obstructions based on location information of UEs associated with the NLoS sidelink transmissions, and configuring communications between the network equipment and at least one UE based on an estimated location of at least one signal shadowing obstruction.

The method may involve receiving from a UE an indication that a reference signal transmitted by the network equipment to the UE was received via a NLoS propagation path, and estimating locations of signal shadowing obstructions may involve estimating locations of signal shadowing obstructions based on a location of the network equipment and the location information of the UE.

The method may involve determining that a reference signal transmitted by the UE to the network equipment was received via a NLoS propagation path and estimating locations of signal shadowing obstructions may involve estimating locations of signal shadowing obstructions based on a location of the network equipment and the location information of the UE.

Configuring communications between the network equipment and the at least one UE may involve increasing a transmission power for a transmission based on the estimated location of the at least one signal shadowing obstruction.

Configuring communications between the network equipment and the at least one UE may involve selecting a robust modulation and coding scheme (MCS) for a transmission affected by the at least one signal shadowing obstruction.

Configuring communications between the network equipment and the at least one UE may involve selectively avoiding directing a transmission beam in a direction of a signal shadowing obstruction.

Configuring communications between the network equipment and the at least one UE may involve providing an estimated location of the least one signal shadowing obstruction to a base station disposed to communicate with the at least one UE, the base station being operable to configure communications with the at least one UE.

Configuring communications may involve for a UE that is shadowed by a signal shadowing obstruction, causing handoff of the shadowed UE from the base station to another base station.

Configuring communications may involve causing the base station to configure transmissions to another UE that is not shadowed by the signal shadowing obstruction to use generally the same non-orthogonal spectrum being used by another base station for transmissions to the shadowed UE.

The method may involve generating location information for at least some of the identified UEs by generating range estimates for uplink or downlink transmissions between the network equipment and at least some of the UEs.

The method may involve generating location information for at least some of the identified UEs by receiving range estimates for line-of-sight (LoS) sidelink transmissions between pairs of UEs.

The method may involve generating location information for at least some of the identified UEs by receiving Global Positioning System (GPS) information identifying locations of at least some of the UEs.

The method may involve generating location information for at least some of the identified UEs by using known location information associated with the network equipment or UEs.

Estimating locations of signal shadowing obstructions may involve centering a shadowing contribution associated with a NLoS sidelink transmission mid-way between the respective locations of the UEs associated with the NLoS sidelink transmission, orienting the shadowing contribution in a direction extending between respective locations of the UEs, estimating an extent of the shadowing contribution based on an estimated path loss for the transmission, and combining shadowing contributions for NLoS sidelink transmissions to generate a shadowing map representing spatial locations of signal shadowing obstructions.

The method may involve updating the shadowing map in response to receiving identifications of neighboring UEs and more recently received identifications of neighboring UEs may be assigned a greater weight than previously received identifications of neighboring UEs.

Combining shadowing contributions may involve combining shadowing contributions using a kernel density estimation to generate a probability density function of shadowing locations.

Combining shadowing contributions may involve combining shadowing contributions using one of a Gaussian kernel and a break-wall kernel.

The method may involve initiating an update to the shadowing map in response to receiving a notification from a base station of a transmission failure between the base station and UEs in communication with the network via the base station.

Receiving the identification of neighboring UEs may involve receiving an anonymized identifier included in the reference signal received by the UE from the neighboring UE.

At least one of the UEs associated with identified NLoS sidelink transmissions may have a location that changes with time and estimating locations of signal shadowing obstructions may involve estimating locations of signal shadowing obstructions based on successive location information for the at least one UE.

In accordance with another disclosed aspect there is provided network equipment for a wireless communication network including a base station including a transmitter and a receiver, a processor in communication with the base station, and a processor-readable memory in communication with the processor and storing processor-executable instructions which, when executed by the processor, cause the processor to perform a method. The method involves receiving by the receiver of the base station from User Equipments (UEs), an identification of neighboring UEs from which the UEs have received a reference signal via a non-line-of-sight (NLoS) sidelink transmission, causing the processor to estimate locations of signal shadowing obstructions based on location information of UEs associated with the NLoS sidelink transmissions, and configuring communications between the base station and at least one UE based on an estimated location of at least one signal shadowing obstruction.

In accordance with another disclosed aspect there is provided a method for estimating locations of signal reflectors in a wireless communication network. The method involves at network equipment, receiving from User Equipments (UEs) in communication with the network, sidelink transmission information including range estimates indicative of a range associated with a reference signal received from a neighboring UE via the sidelink transmission over an indirect propagation path, a received power associated with each received reference signal, and an identification of the neighboring UE. The method also involves estimating locations of signal reflectors based on location information for UEs associated with the sidelink transmissions, the received range estimates, and the received power, The method further involves configuring communications between the network equipment and at least one UE based on an estimated location of at least one signal reflector.

The method may involve receiving from a UE range estimates for reference signals received at the UE over an indirect propagation path from the base station, a received power for each received reference signal, and estimating locations of signal reflectors may further involve estimating locations of signal reflectors based on location information of the UE, a location of the base station, the received range estimates, and the received powers.

The method may involve receiving reference signals transmitted by a UE at the base station and generating range estimates for reference signals received at the base station over indirect propagation paths from the UE, a received power for each reference signal received over indirect propagation paths, and estimating locations of signal reflectors may further involve estimating locations of signal reflectors based on the location of the base station, a location information of the UE, the received range estimates, and the received powers.

Causing the base station to configure transmissions may involve at least one of directing a transmission beam toward a signal reflector to cause the beam to be redirected by the signal reflector to a UE experiencing weak reception of transmitted signals, in response to a determination that one or more UEs are located in an area subject to interference from a transmission beam directed toward a receiving UE, directing the beam toward a signal reflector to cause the beam to be redirected by the signal reflector to the receiving UE, and in response to a determination that a transmission to a UE via a strong line-of-sight (LoS) transmission beam is causing a reduction in the number of data streams that can be spatially multiplexed over the transmission beam, directing at least one additional transmission beam toward a signal reflector to cause the at least one additional transmission beam to be redirected by the signal reflector to the receiving UE and multiplexing the transmission over the direct beam and the at least one additional transmission beam.

The method may involve generating location information for at least some of the identified UEs by one or more of generating range estimates for uplink or downlink transmissions between the network equipment and at least some of the UEs, receiving range estimates for line-of-sight (LoS) sidelink transmissions between UEs, receiving Global Positioning System (GPS) information identifying locations of at least some of the UEs, and using known location information associated with the base station or UEs.

Determining locations of signal reflectors may involve generating a connectivity graph having nodes corresponding to network equipment in the network and nodes corresponding to UEs for which location information is available, for each indirect reference signal transmission in the connectivity graph, establishing a locus representing a probable location of the reflector, and combining the loci for the indirect reference signal transmissions in the connectivity graph to generate a reflector map representing locations of reflecting obstructions in the wireless communication network.

The method may involve updating the reflector map in response to receiving sidelink transmission information, more recently received sidelink transmission information being assigned a greater weight than previously received sidelink transmission information.

Combining the loci may involve using a kernel density estimation to generate a probability density function of reflector locations.

The method may involve initiating an update to the reflector map in response to receiving a notification from the network equipment of a transmission failure between the network equipment and UEs.

At least one of the UEs may have a location that changes with time and estimating locations of signal reflectors may involve estimating locations of signal reflectors based on successively received sidelink transmission information for the UEs associated with the sidelink transmissions.

The method may involve selecting most significant reflector locations from the reflector map for transmissions between the base station and UE nodes in the connectivity graph, using the locations of the base station and UE as inputs to a neural network and training the neural network to output the most significant reflector locations, and using the trained neural network to generate a beam direction for an indirect transmission between the base station and one of the UEs in the network.

In accordance with another disclosed aspect there is provided network equipment for a wireless communication network, including a base station including a transmitter and a receiver, a processor in communication with the base station, and a processor-readable memory in communication with the processor and storing processor-executable instructions which, when executed by the processor, cause the processor to perform a method. The method involves receiving at the receiver of the base station from User Equipments (UEs) in communication with the network, sidelink transmission information including range estimates indicative of a range associated with a reference signal received from a neighboring UE via the sidelink transmission over an indirect propagation path, a received power associated with each received reference signal, and an identification of the neighboring UE. The method also involves causing the processor to estimate locations of signal reflectors based on location information for UEs associated with the sidelink transmissions, the received range estimates, and the received powers. The method further involves configuring communications between the base station and at least one UE based on an estimated location of at least one signal reflector.

Other aspects and features will become apparent to those ordinarily skilled in the art upon review of the following description of specific disclosed embodiments in conjunction with the accompanying figures.

BRIEF DESCRIPTION OF THE DRAWINGS

Embodiments of the disclosure will now be described with reference to the attached drawings in which:

FIG. 20 includes block diagrams illustrating estimation of range and angle between a BS and two UEs;

FIG. 21A includes a block diagram illustrating one type of triangular connectivity path that may be found in a connectivity graph;

FIG. 21B includes a block diagram illustrating another type of triangular connectivity path that may be found in a connectivity graph;

FIG. 25 is a signal flow diagram illustrating signaling according to an embodiment;

FIG. 26 is a flow chart illustrating an example of a method performed by a UE in an embodiment; and FIG. 27 is a flow chart illustrating an example of a method performed by network equipment in an embodiment.

DETAILED DESCRIPTION

Figure 1A:
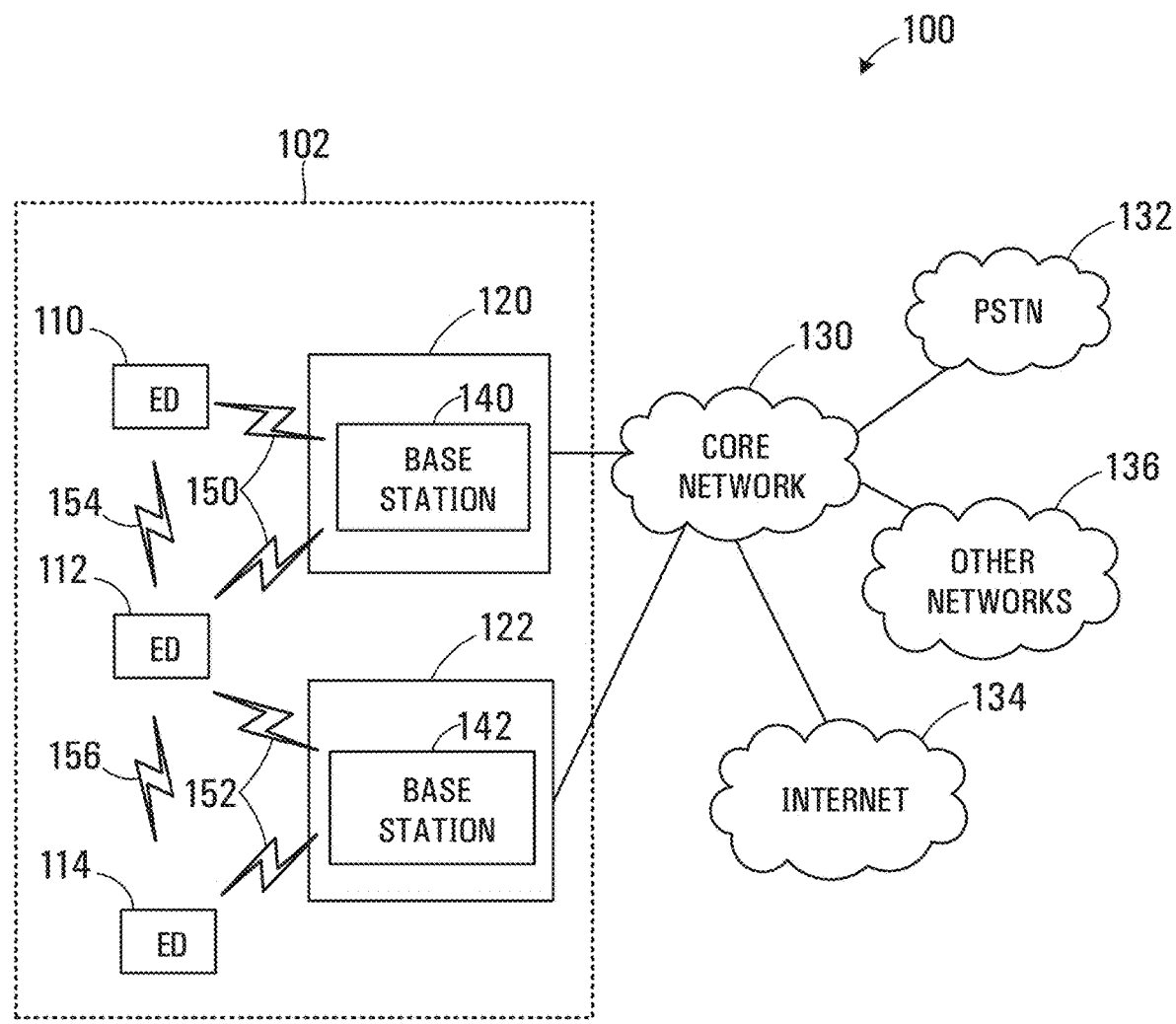
FIG. 1A is a block diagram of an example communication system in accordance with one disclosed embodiment.

FIG. 1A illustrates an example communication system 100 in which embodiments of the present disclosure could be implemented. In general, the system 100 enables multiple wireless or wired elements to communicate data and other content. The purpose of the system 100 may be to provide content (voice, data, video, text) via broadcast, narrowcast, user device to user device, etc. The system 100 may operate efficiently by sharing resources such as bandwidth.

In this example, the communication system 100 includes a wireless communications network 102 including electronic devices (ED) 110-114 and radio access networks (RANs) 120, 122. The system 100 also includes a core network 130, a public switched telephone network (PSTN) 132, the Internet 134, and other networks 136. Although certain numbers of these components or elements are shown in FIG. 1, any reasonable number of these components or elements may be included in the system 100.

The EDs 110-114 are configured to operate, communicate, or both, in the system 100. For example, the EDs 110-114 are configured to transmit, receive, or both via wireless communication channels. Each ED 110-114 represents any suitable end user device for wireless operation and may include such devices (or may be referred to) as a user equipment/device (UE), wireless transmit/receive unit (WTRU), mobile station, mobile subscriber unit, cellular telephone, station (STA), machine type communication device (MTC), personal digital assistant (PDA), smartphone, laptop, computer, touchpad, wireless sensor, or consumer electronics device.

In FIGS. 1A, the RANs 120 and 122 include base stations 140 and 142, respectively. Each base station 140, 142 is configured to wirelessly interface with one or more of the EDs 110-114 to enable access to any other base station, the core network 130, the PSTN 132, the Internet 134, and/or the other networks 136. For example, the base stations 140-142 may include (or be) one or more of several well-known devices, such as a base transceiver station (BTS), a Node-B (NodeB), an evolved NodeB (eNodeB), a Home eNodeB, a gNodeB (sometimes called a "gigabit" NodeB), a transmission point (TP), a transmit/receive point (TRP), a site controller, an access point (AP), or a wireless router. Any ED 110-114 may be alternatively or jointly configured to interface, access, or communicate with any other base station 140-142, the internet 134, the core network 130, the PSTN 132, the other networks 136, or any combination of the preceding. Optionally, the system may include RANs, such as RAN 120, wherein the corresponding base station 140 accesses the core network 130 via the internet 134.

The EDs 110-114 and base stations 140-142 are examples of communication equipment that can be configured to implement some or all of the functionality and/or embodiments described herein. In the embodiment shown in FIG. 1A, the base station 140 forms part of the RAN 120, which may include other base stations, base station controller(s) (BSC), radio network controller(s) (RNC), relay nodes, elements, and/or devices. Any base station 140 or 142 may be a single element, as shown, or multiple elements, distributed in the corresponding RAN, or otherwise. Also, the base station 140 forms part of the RAN 120, which may include other base stations, elements, and/or devices. Each base station 140-142 may be configured to operate to transmit and/or receive wireless signals within a particular geographic region or area, sometimes referred to as a coverage area. A cell may be further divided into cell sectors, and a base station 140-142 may, for example, employ multiple transceivers to provide service to multiple sectors. In some embodiments a base station 140-142 may be implemented as pico or femto nodes where the radio access technology supports such. In some embodiments, multiple-input multiple-output (MIMO) technology may be employed having multiple transceivers for each coverage area. The number of RAN 120, 122 shown in FIG. 1A is exemplary only. Any number of RAN may be contemplated when devising the system 100.

The base stations 140-142 communicate with one or more of the EDs 110-114 over one or more air interfaces 150 and 152 using wireless communication links e.g. RF, µWave, IR, etc. The air interfaces 150 and 152 may utilize any suitable radio access technology. For example, the system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA) in the air interfaces 150 and 152. In some embodiments the EDs 110-114 include EDs that are able to communicate directly with each other via sidelinks 154 and 156.

A base station 140-142 may implement Universal Mobile Telecommunication System (UMTS) Terrestrial Radio Access (UTRA) to establish an air interface 150 using wideband CDMA (WCDMA). In doing so, the base station 140-142 may implement protocols such as HSPA, HSPA+ optionally including HSDPA, HSUPA or both. Alternatively, a base station 140-142 may establish an air interface 150 with Evolved UTMS Terrestrial Radio Access (E-UTRA) using LTE, LTE-A, and/or LTE-B. It is contemplated that the system 100 may use multiple channel access functionality, including such schemes as described above. Other radio technologies for implementing air interfaces include IEEE 802.11, 802.15, 802.16, CDMA2000, CDMA2000 1X, CDMA2000 EV-DO, IS-2000, IS-95, IS-856, GSM, EDGE, and GERAN. Of course, other multiple access schemes and wireless protocols may be utilized.

The RANs 120 and 122 are in communication with the core network 130 to provide the EDs 110-114 with various services such as voice, data, and other services. Understandably, the RANs 120 and 122 and/or the core network 130 may be in direct or indirect communication with one or more other RANs (not shown), which may or may not be directly served by core network 130, and may or may not employ the same radio access technology as RAN 120, RAN 122 or both. The core network 130 may also serve as a gateway access between (i) the RANs 120 and 122 or EDs 110-114 or both, and (ii) other networks (such as the PSTN 132, the Internet 134, and the other networks 136). In addition, some or all of the EDs 110-114 may include functionality for communicating with different wireless networks over different wireless links using different wireless technologies and/or protocols. PSTN 132 may include circuit switched telephone networks for providing plain old telephone service (POTS). Internet 134 may include a network of computers and subnets (intranets) or both, and incorporate protocols, such as IP, TCP, UDP. EDs 110-114 may be multimode devices capable of operation according to multiple radio access technologies, and incorporate multiple transceivers necessary to support such.

The RANs 120, 122, base stations 140, 142, and the core network 130 together may be referred to as "network equipment". The network equipment elements may be physically distributed within a coverage area. The core network 130 generally includes computer processor hardware that interfaces between the PSTN 132, Internet 134, and other networks 136 and the RANs 120, 122 to provide services to the EDs 110-114.

Figure 1B:
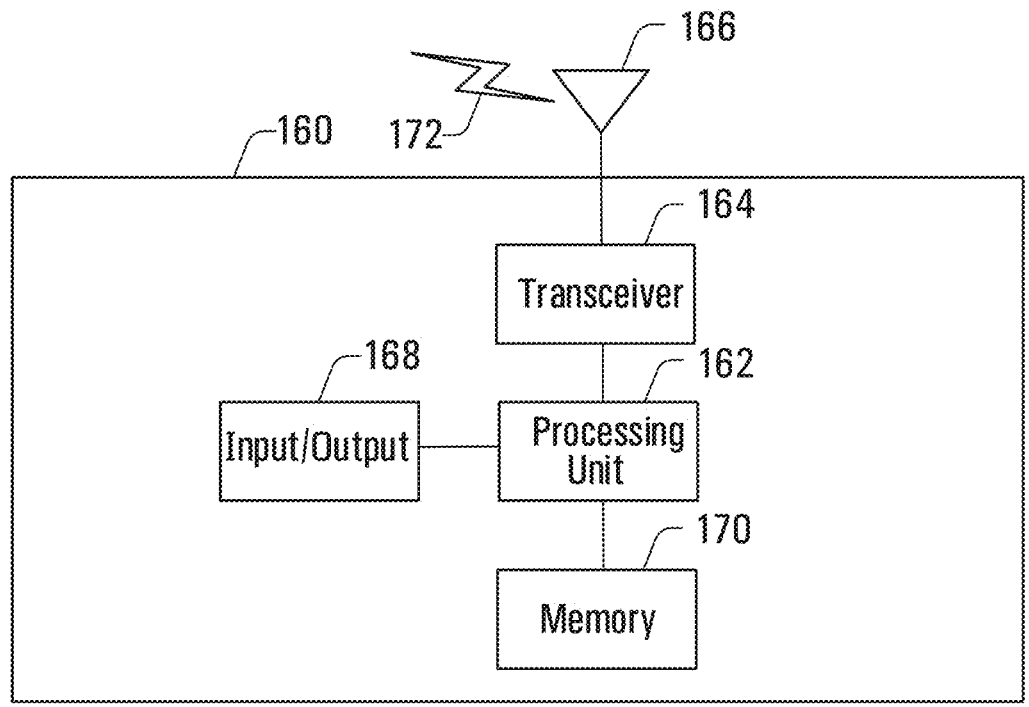
FIG. 1B is a block diagram of an example of an electronic device in accordance with one disclosed embodiment.
Figure 1C:
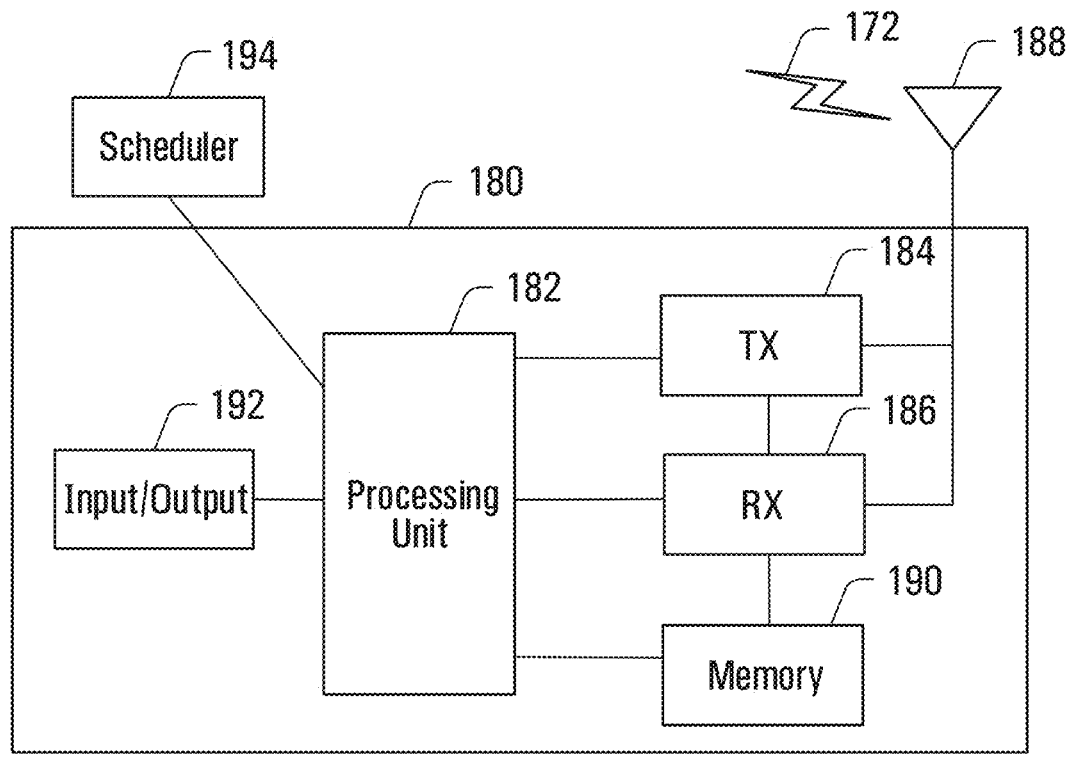
FIG. 1C is a block diagram of an example of a base station in accordance with one disclosed embodiment.

FIGS. 1B and 1C illustrate example devices that may be used in implementing the network 102 shown in FIG. 1A. In particular, FIG. 1B illustrates an example of an ED 160, and FIG. 1C illustrates an example base station 180. These components could be used in the communication system 100 or in any other suitable system.

As shown in FIG. 1B, the ED 160 includes at least one processing unit 162. The processing unit 162 implements various processing operations of the ED 160. For example, the processing unit 162 could perform signal coding, data processing, power control, input/output processing, or any other functionality enabling the ED 160 to operate in the communication system 100. The processing unit 162 may also be configured to implement some or all of the functionality and/or embodiments described in more detail elsewhere herein. Each processing unit 162 includes any suitable processing or computing device configured to perform one or more operations. Each processing unit 162 could, for example, include a microprocessor, microcontroller, digital signal processor, field programmable gate array, or application specific integrated circuit.

The ED 160 also includes at least one transceiver 164. The transceiver 164 is configured to modulate data or other content for transmission by at least one antenna or Network Interface Controller (NIC) 166. The transceiver 164 is also configured to demodulate data or other content received by the at least one antenna 166. Each transceiver 164 includes any suitable structure for generating signals for wireless or wired transmission and/or processing signals received wirelessly or by wire at the antenna 166. Each antenna 166 includes any suitable structure for transmitting and/or receiving wireless or wired signals 172. One or multiple transceivers 164 could be used in the ED 160. One or multiple antennas 166 could be used in the ED 160. Although shown as a single functional unit, a transceiver 164 could also be implemented using at least one transmitter and at least one separate receiver.

The ED 160 further includes one or more input/output devices 168 or interfaces (such as a wired interface to the internet 134 in FIG. 1A). The input/output devices 168 permit interaction with a user or other devices in the network. Each input/output device 168 includes any suitable structure for providing information to or receiving information from a user, such as a speaker, microphone, keypad, keyboard, display, or touch screen, including network interface communications.

In addition, the ED 160 includes at least one memory 170. The memory 170 stores instructions and data used, generated, or collected by the ED 160. For example, the memory 170 could store software instructions or modules configured to implement some or all of the functionality and/or embodiments described herein and that are executed by the processing unit(s) 162. Each memory 170 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 1C, the base station 180 includes at least one processing unit 182, at least one transmitter 184, at least one receiver 186, one or more antennas 188, at least one memory 190, and one or more input/output devices or interfaces 192. A transceiver, not shown, may be used instead of the transmitter 184 and receiver 186. A scheduler 194 may be coupled to the processing unit 182. The scheduler 194 may be included within or operated separately from the base station 180. The processing unit 182 implements various processing operations of the base station 180, such as signal coding, data processing, power control, input/output processing, or any other functionality. The processing unit 182 can also be configured to implement some or all of the functionality and/or embodiments described in more detail herein. Each processing unit 182 includes any suitable processing or computing device configured to perform one or more operations. Each processing unit 182 could, for example, include a microprocessor, microcontroller, digital signal processor, field programmable gate array, or application specific integrated circuit.

Each transmitter 184 includes any suitable structure for generating signals for wireless or wired transmission to one or more EDs or other devices. Each receiver 186 includes any suitable structure for processing signals received wirelessly or by wire from one or more EDs or other devices. Although shown as separate components, at least one transmitter 184 and at least one receiver 186 could be combined into a transceiver. Each antenna 188 includes any suitable structure for transmitting and/or receiving wireless or wired signals 172. Although a common antenna 188 is shown here as being coupled to both the transmitter 184 and the receiver 186, one or more antennas 188 could be coupled to the transmitter(s) 184, and one or more separate antennas 188 could be coupled to the receiver(s) 186. Each memory 190 includes any suitable volatile and/or non-volatile storage and retrieval device(s) such as those described above in connection to the ED 160 in FIG. 1B. The memory 190 stores instructions and data used, generated, or collected by the base station 180. For example, the memory 190 could store software instructions or modules configured to implement some or all of the functionality and/or embodiments described herein and that are executed by the processing unit(s) 182.

Each input/output device 192 permits interaction with a user or other devices in the network. Each input/output device 192 includes any suitable structure for providing information to or receiving/providing information from a user, including network interface communications.

It should be appreciated that one or more steps of the embodiment methods provided herein may be performed by corresponding units or modules, according to FIGS. 1A-1C. For example, a signal may be transmitted by a transmitting unit or a transmitting module. A signal may be received by a receiving unit or a receiving module. A signal may be processed by a processing unit or a processing module. Other steps may be performed by a machine learning (ML) module. The respective units/modules may be implemented using hardware, one or more components or devices that execute software, or a combination thereof. For instance, one or more of the units/modules may be an integrated circuit, such as field programmable gate arrays (FPGAs) or application-specific integrated circuits (ASICs). It will be appreciated that where the modules are implemented using software for execution by a processor unit for example, they may be retrieved by a processor, in whole or part as needed, individually or together for processing, in single or multiple instances, and that the modules themselves may include instructions for further deployment and instantiation. Additional details regarding the EDs such as the ED 160 and the base stations such as 180 are known to those of skill in the art. As such, these details are omitted here.

Figure 2:
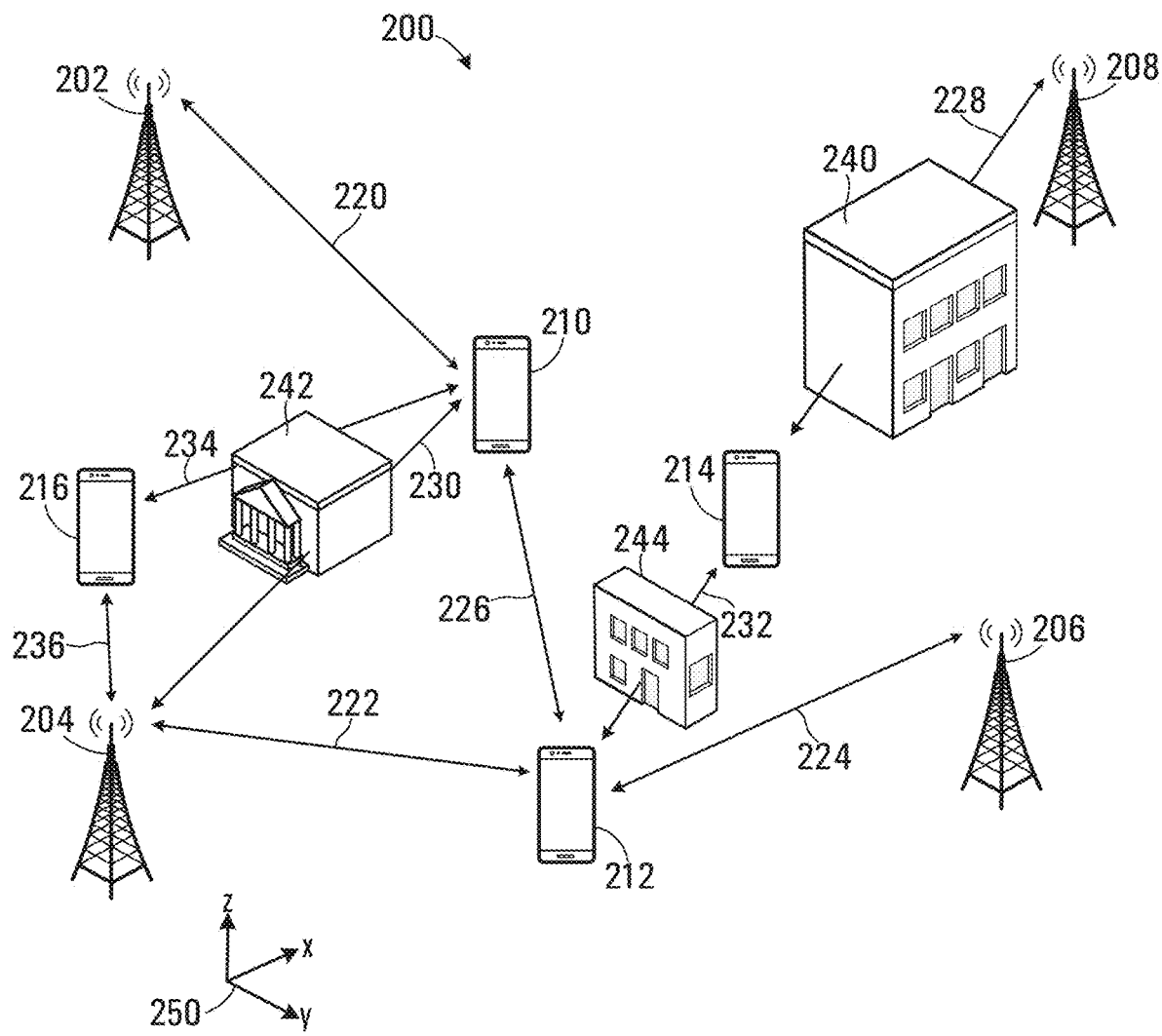
FIG. 2 is a schematic view of a physical layout of a portion of a wireless communications network in accordance with a disclosed embodiment.

A physical layout of a portion of a wireless communications network in accordance with a shadow map generation embodiment is shown schematically at 200 in FIG. 2. Referring to FIG. 2, the wireless communications network 200 includes base stations 202, 204, 206, and 208 configured generally as described above in connection with the base stations 140, 142. UEs 210, 212, 214, 216 are in wireless communication with one or more of the base stations 202-208. In FIG. 2 the UEs 210, 212, 214, 216 are shown as cellular handset devices but may be any of EDs 110-114 shown in FIG. 1A and as described above.

A line-of-sight (LoS) propagation path 220 is associated with transmissions between the base station 204 and the UE 210. Another LoS propagation path 222 exists between the base station 204 and the UE 212, and a LoS propagation path 224 exists between the base station 206 and the UE 212. A LoS sidelink propagation path 226 also exists between the UE 212 and the UE 210. A sidelink connection, transmission, or communication link, is associated with a direct transmission between two UEs that is not routed through one of the base stations 202-208.

A building 240 is located between the base station 208 and the UE 214, and a resulting propagation path 228 is thus a non-line-of-sight (NLoS) path. The building 240 acts as a signal shadowing obstruction that attenuates signals propagating through the building. Another shadowing obstruction 242 is located between the base station 204 and the UE 210 such that a NLoS propagation path 230 exists between this base station and the UE. A sidelink propagation path 232 passes through a shadowing obstruction 244 located between the UE 212 and UE 214. The UE 216 has a NLoS sdelink connection 234 with the UE 210 and a LoS connection 236 with the base station 204. Although only a few UEs are shown in FIG. 2, network environments will usually have many more UEs within region and in practice a network would have many more sidelink, uplink and downlink connections than shown in FIG. 2.

The obstructions 240, 242, and 244 cause received signal power attenuation and/or fluctuation for a direct propagation path between transmitters and receivers. In the embodiment shown, the obstructions 238, 240, and 242 are represented as buildings, but in other embodiments obstructions may be a natural feature such as a hill. Although the buildings 238, 240 would have a fixed location within a geographical coordinate system 250, in other embodiments signal shadowing obstructions may be mobile, such as a large truck or train.

Figure 3A:
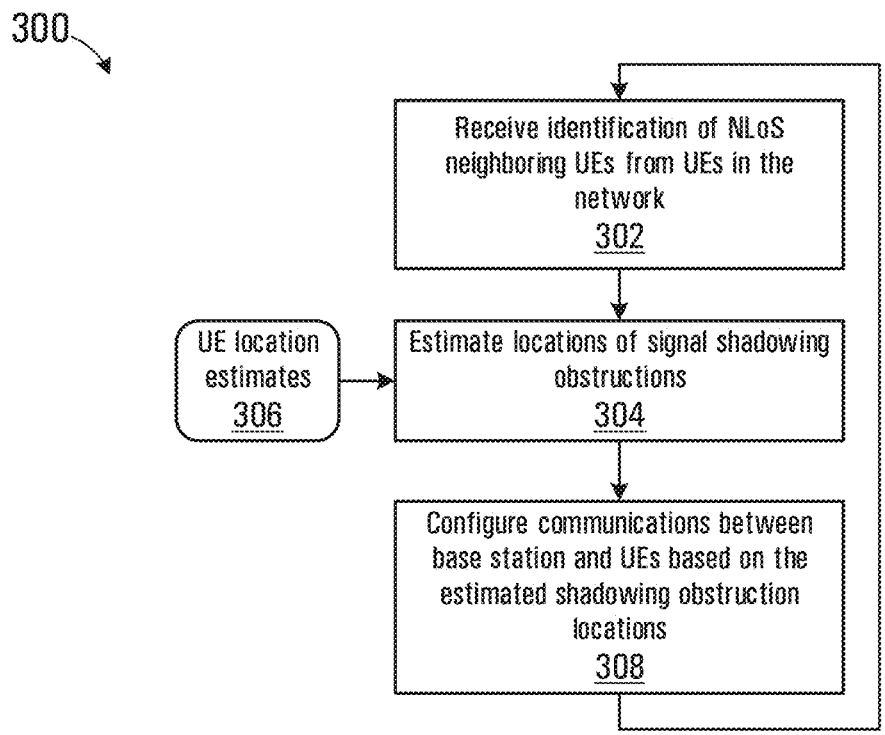
FIG. 3A is a flowchart depicting blocks of codes for directing network equipment to perform a process for estimating locations of signal shadowing obstructions within the wireless communication network shown in FIG. 2.

Referring to FIG. 3A, a process implemented on network equipment for estimating locations of signal shadowing obstructions within the wireless communication network 200 is shown generally at 300. The blocks generally represent computer instructions or codes that may be executed to cause various computer processor units making up the network equipment to perform functions for estimating the locations of signal shadowing obstructions.

Block 302 directs the network equipment of the wireless communications network 200 to receive, from UEs in the network, an identification of neighboring UEs from which the UE receives a reference signal via a non-line-of-sight (NLoS) sidelink transmission. The reference signal may be similar to reference signals commonly transmitted between base stations and UEs, which facilitate calculation of UE ranges, channel coefficients, etc. In this embodiment, the reference signal transmitted by a neighboring UE includes an identification of the UE transmitting the signal, such as an IMSI (International mobile subscriber identity) or other unique identifier associated with the UE. The UE identifier may be anonymized for security reasons to prevent the receiving UE from being able to determine identifiers of neighboring UEs. In one embodiment, data ambiguation may be used to anonymize the identifier.

Referring back to FIG. 2, for the wireless communication network 200 the base station 204 may thus receive signaling from the UE 216 identifying the UE 210 as having the NLoS sidelink connection 234 with the UE 216. Similarly, the base stations 204 and 206 may each receive respective signaling from the UE 212 identifying the UE 214 as having an NLoS sidelink connection 232 with the UE 212. For a dense network of UEs, there will be a large number of potential NLoS sidelink connections between UEs, at least some of which would be communicated to one or more of the base stations 202-208.

Block 304 of the process 300 then directs the network equipment to estimate locations of signal shadowing obstructions. The locations of signal shadowing obstruction are based on UE location estimates 306 for the pair of UEs identified at block 302 as having the NLoS sidelink connection. In wireless communication networks, UE location estimates 306 are generated and maintained in a network equipment database for UEs in communication with the network. The UE location estimates may be generated based on a variety of different data sets, including uplink or downlink transmissions between the base station and UEs, receiving Global Positioning System (GPS) information from some of the UEs, and/or using other known location information. For a base station or a UE having a fixed location, an accurate ground truth location may be established, which acts as an anchor location in the wireless communications network 200.

Referring back to FIG. 2, the NLoS connection 234 between the UEs 216 and 210 is indicative of a signal shadowing obstruction such as the building 240 being located between the identified pairs of UEs. The identification of the NLoS sidelink connection 234 thus facilitates an inference about the location of the obstruction 242 based on the respective locations of the pair of UEs. If the network equipment of the wireless communications network 200 has location estimates for both the UE 210 and the UE 216, then the network equipment may infer that there is an obstruction located in-between the two UEs.

Block 308 then directs the network equipment to cause the base stations 202-206 to configure communications with UEs based on the estimated locations of the signal shadowing obstructions. In one embodiment, the blocks 302, 304 and 308 may be executed repeatedly to determine locations of signal shadowing obstruction contributions based on the NLoS sidelink connections between multiple pairs of neighboring UEs within the wireless communication network 200. These identified signal shadowing contributions may be combined to generate a shadowing map representing spatial locations of signal shadowing obstructions within the geographical coordinate system 250. The shadowing map may be provided to the base stations 202-206 to facilitate proactively configuring communication parameters to reduce the frequency of transmission failures.

As an example, the base station 204 in FIG. 2, having received the shadowing map, would be able to determine that the building 242 would potentially shadow communications between the base station and the UE 210. The base station 204 may thus proactively increase a transmission power when transmitted beams dwell on angular segments that include an obstruction to compensate for signal shadowing. Although conventional wireless communications networks may increase transmission power when signals are shadowed, this increase only occurs reactively after a transmission failure has been encountered. Proactively increasing power would thus potentially avoid the transmission failure and thus reduce transmission delays associated with reactively increasing transmission power. The base station 204 may additionally or alternatively proactively select a more robust modulation and coding scheme (MCS) for transmissions to the UE 210 which is known to be located behind the building 242.

Figure 4A:
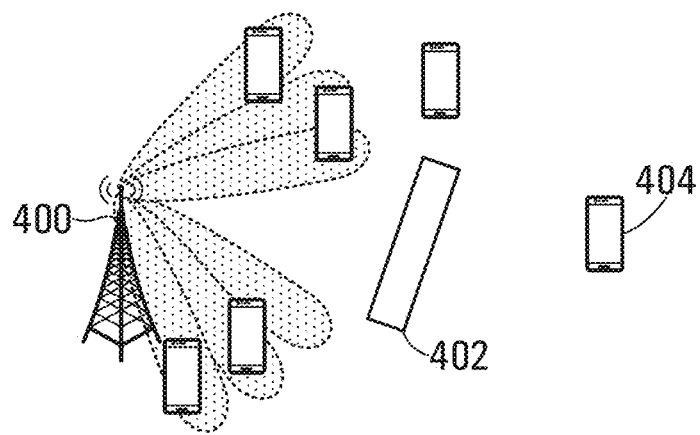
FIG. 4A is a first example of a base station configuration for selectively avoiding directing a transmission beam in a direction of a signal shadowing obstruction.

In other embodiments, a base station 400 may be operably configured to selectively avoid directing a transmission beam in a direction of a signal shadowing obstruction 402 as shown in FIG. 4A. In this case a UE 404 may be left to be serviced by another base station (not shown). If locations of UEs in a network are known, the base station 400 may also cause beams to dwell in angular segments that are known to include UEs while avoiding spending time dwelling in angular segments that do not currently include any UEs.

Figure 4B:
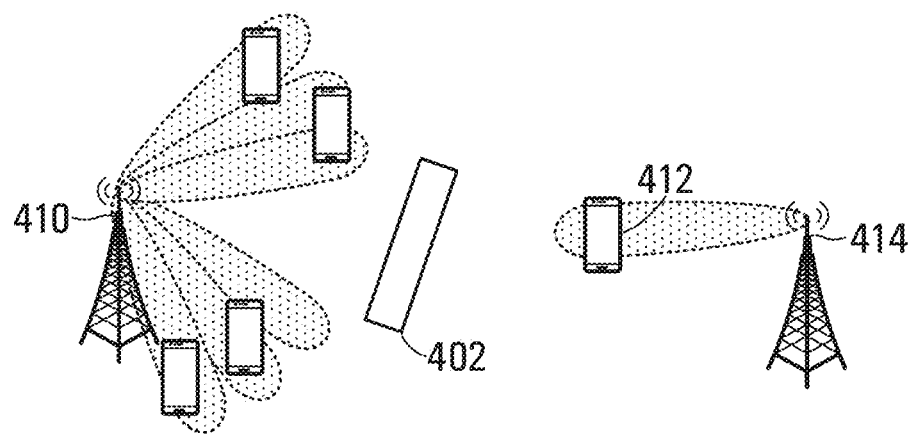
FIG. 4B is a second example of a base station configuration for selectively avoiding directing a transmission beam in a direction of a signal shadowing obstruction.

In another embodiment shown in FIG. 4B, a base station 410 may initiate handoff of a shadowed UE 412 to another base station 414, for which signal transmissions are not affected by the signal shadowing obstruction 402. Additionally, knowledge of locations of the signal shadowing obstruction 402 may facilitate reuse of the same non-orthogonal spectrum being used by the other base station for signal transmissions to a shadowed UE 412 when it is known that the obstruction should reduce interference between respective signal transmissions from the two base stations 410 and 414.

As disclosed above, for a dense network of UEs there will be a large number of potential NLoS sidelink connections between UEs that may be leveraged to determine shadowing locations. Additionally, the base stations 202-208 would generally also receive reference signals from the UEs 210-216 as part of uplink transmissions from the UEs to the base stations. The base stations 202-208 on receiving the reference signals may make a determination that the reference signal transmitted was received via a NLoS propagation path. Similarly, for downlink transmissions between the base stations 202-208 and the UEs 210-216, a UE may make a determination that a reference signal transmitted by a base station was received via a NLoS propagation path. The identifications of NLoS downlink and uplink transmissions may advantageously be combined with the identification of NLoS sidelink transmissions between neighboring UEs for generating the shadowing map. One advantage of including uplink and downlink transmissions is that the location of the base stations 202-208 may be accurately established. Anchor locations when used in the generation of shadowing locations may improve the spatial accuracy of the resulting shadowing map.

Block 302 of the process 300 requires an identification of NLoS communications between neighboring UEs 210-216 and optionally NLoS uplink and downlink communications between the UEs and the base stations 202-208. A method for distinguishing between LoS links and NLoS links is disclosed in Applicant's commonly owned U.S. patent application Ser. No. 16/675,597, filed on Nov. 6, 2019 and entitled "CONNECTIVITY-BASED POSITIONING DETERMINATION IN WIRELESS COMMUNICATION NETWORKS", which is incorporated herein by reference in its entirety. In the disclosed method, LoS link identification based on label generation and neural network training is used to configure a LoS identification model by (i) generating LoS/NLoS labels based on two different geometric discrepancy analyses and (ii) training a neural network to generalize to unseen locations within the geographical coordinate system 250. The trained LoS identification model is then transferred to UEs, which are configured to infer the LoS/NLoS status of their sidelink communications with neighboring UEs. In the U.S. Ser. No. 16/675,597 application, an identification of LoS communications is transmitted to network equipment, where it can be used for the purpose of more accurately estimating the locations of UEs within the network. In this disclosure, an identification of NLoS communications is transmitted to network equipment (i.e. communications that are determined not to be via LoS propagation paths). In other embodiments, alternative methods of identifying communications as being via LoS or NLoS propagation paths may be implemented to make the NLoS determination at the UEs 210-216 and the base stations 202-208.

Figure 3B:
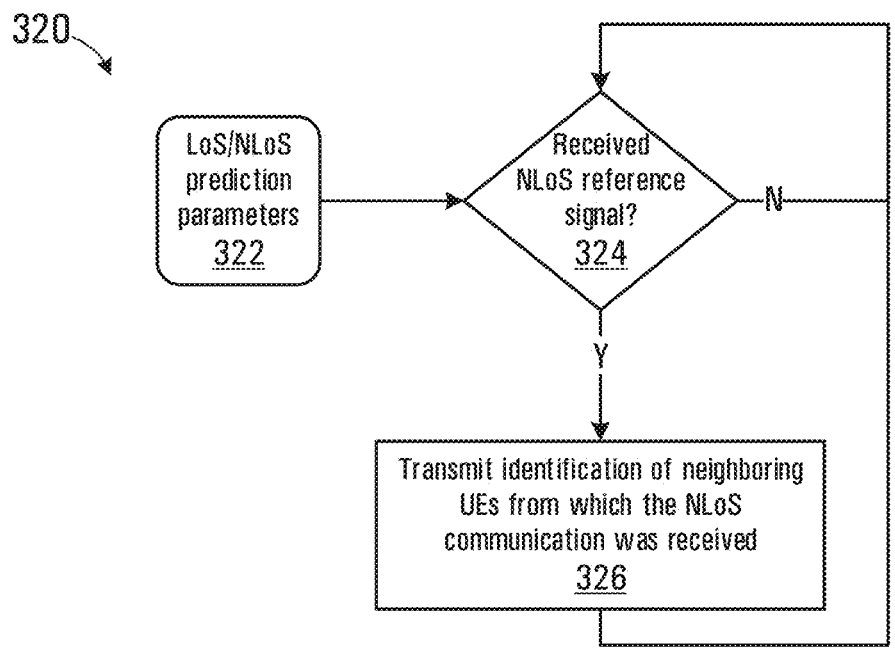
FIG. 3B is a flowchart depicting blocks of codes for directing a UE or base station to perform a NLoS transmission determination.

Referring to FIG. 3B, a method for directing a UE or base station to perform the NLoS transmission determination implemented on one of the UEs (for the example the UE 216 shown in FIG. 2) is shown generally at 320. The UE 216 will previously have received LoS/NLoS prediction parameters 322 from the network equipment (i.e. via the base station 204). The LoS/NLoS prediction parameters 322 are periodically provided by the network equipment to UEs and are used to implement a LoS/NLoS prediction model on the UE 216. Block 324 directs the UE 216 to use the model to infer whether a received sidelink communication from the neighboring UE 210 was received via an NLoS propagation path. If the sidelink communication is determined to have been received via an NLoS propagation path, block 326 transmits the anonymized UE identifier of the neighboring UE 210 to the base station 204. If the sidelink communication is determined to be a LoS communication, no identification is required to be transmitted to the base station 204 for establishing the shadowing obstruction locations. However, the LoS identification may be used for generating UE location estimates as described below and may still be transmitted to the base station 204. In the U.S. Ser. No. 16/675,597 application, UE location estimates are further generated based on the receiving range estimates for line-of-sight (LoS) sidelink transmissions between pairs of UEs. These UE location estimates may be used as a source of the UE location estimates shown at 306 in FIG. 3.

Figure 5:
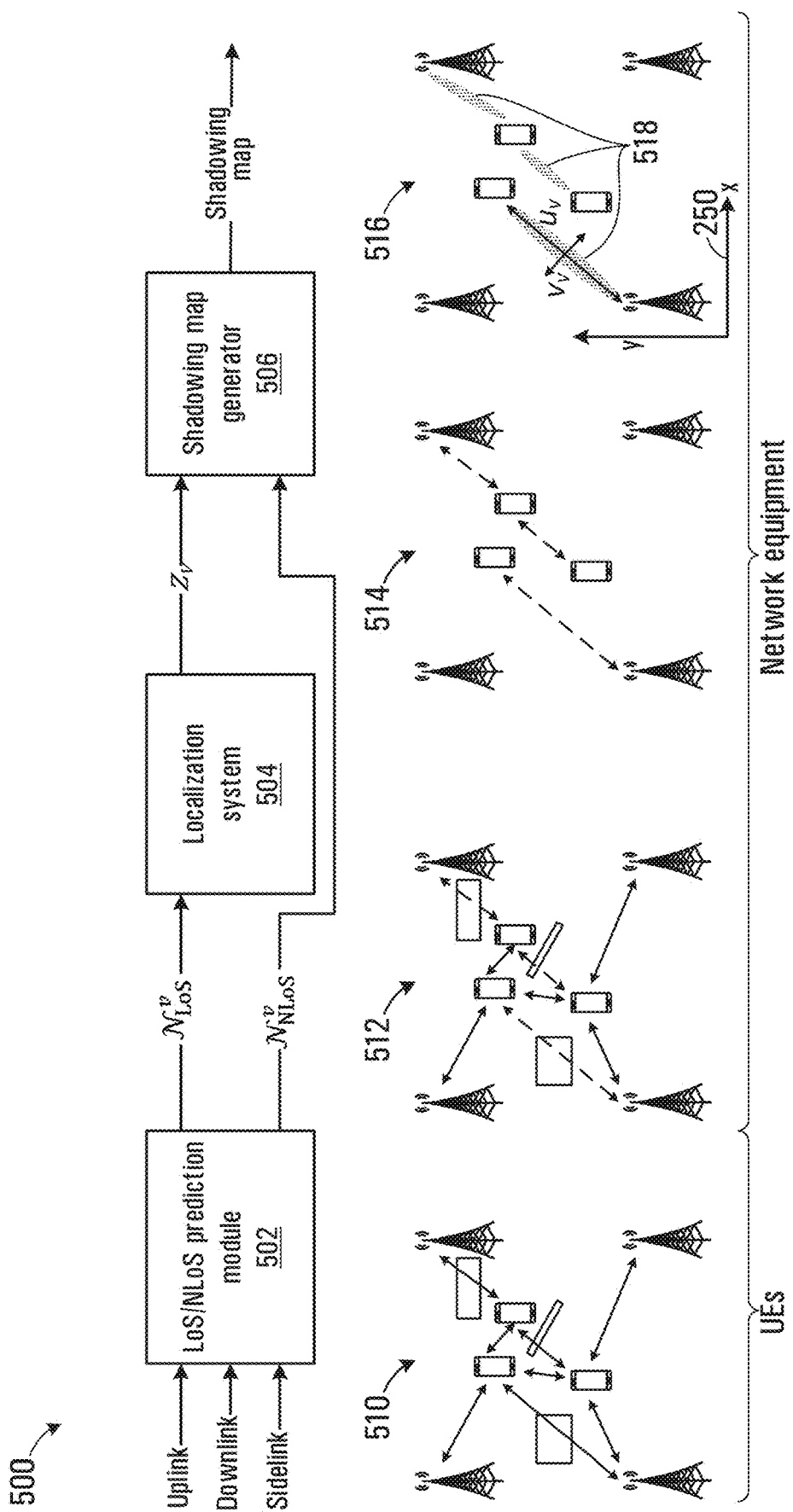
FIG. 5 is a block diagram of system components for generating a shadowing map.

Referring to FIG. 5, a block diagram of system components for generating a shadowing map is shown generally at 500. The system 500 includes a LoS/NLoS prediction module 502 on each of the UEs 210-216 shown in FIG. 2. The LoS/NLos prediction module 502 implements the LoS/NLos identification model using the LoS/NLoS prediction parameters 322 that are provided to UEs by the network equipment as described later herein. The UEs and base stations in the network and communication links between these elements are depicted at 510, which shows both LoS and NLoS connections. The signal shadowing obstructions are represented at 510 by rectangular blocks.

The UEs and base stations may be represented as a set of nodes $\mathcal{N}^v$ in a network graph with connections between the nodes v being depicted at 510. The LoS/NLoS prediction module 502 executes the blocks 302-308 shown in FIG. 3A and generates inference pairs ($\mathcal{N}_{LoS}^v$, $\mathcal{N}_{NLoS}^v$). Each inference pair includes a set of inferences $\mathcal{N}_{LoS}^v$ that identify UEs and/or base stations v' with which a UE v has a LoS connection and a set of inferences $\mathcal{N}_{NLoS}^v$ that identify UEs and/or base stations v' with which the UE v has an NLoS connection. The NLoS connections are represented at 512 using broken lines and the LoS connections are represented using solid lines. For generation of the shadowing map, the network equipment receives signaling from the UEs including the $\mathcal{N}_{NLoS}^v$ inferences and processes the inferences to generate the following sets:

$\mathcal{N}_{NLoS\text{-}UE}^v = \{v': f_w^*(x_{v,v'}) \approx 1 \wedge v' \in \mathcal{N}_{UE}^v\}$ $\mathcal{N}_{NLoS\text{-}BS}^v = \{v': f_w^*(x_{v,v'}) \approx 1 \wedge v' \in \mathcal{N}_{BS}^v\}$ $\mathcal{N}_{NLoS}^v = \{v': f_w^*(x_{v,v'}) \approx 1 \wedge v' \in \mathcal{N}^v\}$     1 where $\mathcal{N}_{NLoS\text{-}UE}^v$ represents a set of identifications of nodes v having NLoS sidelink connections with UEs v', $\mathcal{N}_{NLoS\text{-}BS}^v$ represents a set of identifications of nodes v having NLoS downlink connections with base stations v', and $\mathcal{N}_{NLoS}^v$ is the union of the sets $\mathcal{N}_{NLoS\text{-}UE}^v$ and $\mathcal{N}_{NLoS\text{-}BS}^v$.

The LoS/NLos prediction module 502 in this embodiment also generates LoS identifications for the uplink, downlink, and sidelink connections, and transmits signaling identifying these connections back to the network equipment. In this embodiment, the network equipment includes a localization system 504, which receives the LoS identifications from the LoS/NLoS prediction module 502 and uses these identifications for establishing UE location estimates 306, as detailed in the U.S. Ser. No. 16/675,597 application. In other embodiments the UE location estimates may be otherwise generated without the use of LoS sidelink connection information.

The network equipment portion of the system 500 also includes a shadowing map generator 506, which receives the UE location estimates 306 from the localization system 504. The shadowing map generator 506 also receives the sets of NLoS identifications in equation 1 and combines the UE location estimates 306 and the NLoS identifications. The set of nodes $\mathcal{N}_{LoS}^v$ is thus provided to the localization system 504 to estimate locations $z_v$ of the nodes v, which in turn is provided to the shadowing map generator 506. It is not necessary to establish location estimates for all of the UE nodes in the network 200. The shadowing map generator 506 uses this information to generate a labelled graph G"=(V", E") is formed with the following vertices:

$V" = \{(v, z_v): v \in V \wedge \mathbb{1}_{z_v} = 1\}$,     2 and the following edge set:

$E" = \{(v, v'): v, v' \in V" \wedge (v' \in \mathcal{N}_{NLoS}^v \vee v \in \mathcal{N}_{NLoS}^{v'})\}$     3 with V" being the vertex set including all UEs with each node v being labelled with its location estimate $z_v$. The graph V" is depicted at 514 in FIG. 5 and is updated iteratively as additional inference pairs ($\mathcal{N}_{LoS}^v$, $\mathcal{N}_{NLoS}^v$) are received and edges and vertices are added.

To generate the shadowing map, the shadowing map generator 506 applies kernel density estimation (KDE) to the graph G" by updating the following shadowing map function:

$$\mathcal{L}(z, t) = \frac{1}{T} \sum_{l=t-T}^{t} \frac{\alpha_l}{|E"|} \sum_{(v,v') \in E_1"} \mathbb{K}(z; \mu_{v,v'}^l, \Sigma_{v,v'}^l), z \in \mathbb{R}^2$$

where $\mathbb{K}(z; \mu_{v,v'}^l, \Sigma_{v,v'}^l)$ is a kernel density function that is centered at a location $\mu_{v,v'}^l \in \mathbb{R}^2$ for each (v,v') link edge in the graph and where $\Sigma_{v,v'}^l \in \mathbb{R}^{2\times 2}$ is the covariance matrix for that link. Equation 4 also includes a time-dependent factor $\alpha_l \in [0,1]$, which together with the time-span term T implements a discounting factor. When periodically updating the shadowing map in response to receiving ongoing identifications of neighboring UEs, the time-dependent factor $\alpha_l$ causes more recently received identifications of neighboring UEs to be assigned a greater weight than previously received identifications of neighboring UEs. The discounting factor $\alpha_l$ ensures that the model remains agile and adaptive in a wireless communications network 200 where shadowing obstructions may themselves be mobile.

Each edge or NLoS link in the graph G" thus includes the estimated locations $z_v$ of the nodes at its two ends. The location $\mu_{v,v'}^l$ and covariance matrix $\Sigma_{v,v'}^l$ for each link may be defined as follows:

$\mu_{v,v'}^l = (z_v + z_{v'})/2$     5

$$\Sigma_{v,v'}^l = U \begin{bmatrix} \sigma_{v,v'} & 0 \\ 0 & \sigma_{v,v'} \end{bmatrix} U^T \text{ where} \quad 6$$

$$U = [|z_v - z_{v'}|, \text{ null } (|z_v - z_{v'}|)].$$

The signal shadowing obstruction associated with the NLoS communication link between nodes (v,v') is thus assumed to be centered at a location $\mu_{v,v'}^l$ halfway between the two nodes v. The signal shadowing obstruction is further assumed to be physically spread out along a vector $u_v = z_v - z_{v'}$ aligned with a direct path between the nodes. The obstruction is further assumed to have an extent or span defined by the null-space vector $v_v = \text{null}(u_v)$, which is orthogonal to the direct path. Examples of these vectors $u_v$ and $v_v$ are shown in FIG. 5 at 516 for one of the depicted communication links. The extent of the shadowing obstruction along the direct path and in the direction of the vector $v_v$ is defined by $\sigma_{v,v'}$, which may be based on an estimated path loss for the signal transmission. Eigenvalue decomposition, using eigenvalues σ that are proportional to a shadow fading coefficient, is used to generate the covariance matrix $\Sigma_{v,v'}^l$. A larger shadow fading coefficient is most likely associated with a larger shadowing obstruction, and results in a wider kernel being used in equation 4 when evaluating shadowing contributions associated with identified NLoS communication links. In some wireless communications networks, the shadow fading coefficient σ(z) may be available as a function of location throughout the network based on extensive experimentation. However, if the shadow fading coefficient is unavailable, the Friis path loss formula may be used to obtain σ from a received power $p_{v'}^r$ at the receiving node, the transmit power $p_v^t$ at the transmitting node, the receiver gain $g_{v'}$ at the receiving node:

$$\sigma_{v,v'} \approx \frac{p_v^t \cdot g_{v'}}{p_{v'}^r \cdot R_{v,v'}^2} \quad 7$$

where $R_{v,v'} = |z_v - z_{v'}|$ is the distance between the transmitting and receive nodes. The communication parameters $p_v^t$, $g_{v'}$, and $p_{v'}^r$ are commonly available within the wireless communications network 200 as these parameters are monitored by UEs and base stations and may be routinely collected by the network equipment. In other embodiments, measures of shadow fading other than equation 7 may be used. The estimated shadow fading coefficient $\sigma_{v,v'}$ is then used in equation 6 to determine the covariance matrix $\Sigma_{v,v'}^l$. The covariance matrix is in turn used in equation 4 to generate probable locations 518 for the signal shadowing obstruction within the geographical coordinate system 250.

The choice of kernel function $\mathcal{N}(z; \mu_{v,v'}^l, \Sigma_{v,v'}^l)$ in equation 4 may be made based on the level of detail desired for the shadowing map. In one embodiment a Gaussian kernel may be defined as follows:

$$\mathbb{K}(z; \mu_{v,v'}^l, \Sigma_{v,v'}^l) = \frac{1}{\sqrt{|\Sigma_{v,v'}^l|(2\pi)^2}} \exp\left(-\frac{1}{2}(z - \mu_{v,v'}^l)^T \Sigma_{v,v'}^{l-1}(z - \mu_{v,v'}^l)\right). \quad 8$$

The wings of the above Gaussian kernel extend from −∞ to ∞ and the kernel has smooth transitions, leading to a shadowing map function $\mathcal{L}(z, t)$ that is generally free of spurious fluctuations and sudden jumps. For this kernel, smaller shadowing obstructions may be buried under the wings of larger obstructions. In an alternative embodiment, a more local kernel such as a break-wall kernel may be used and provides the ability to reveal smaller obstructions at the expense of a possibly more jittery spectrum:

$$\mathbb{K}(z; \mu_{v,v'}^l, \Sigma_{v,v'}^l) = \begin{cases} 1 & |z - \mu_{v,v'}^l| \le \det(\Sigma_{v,v'}^l) \\ 0 & |z - \mu_{v,v'}^l| > \det(\Sigma_{v,v'}^l) \end{cases}. \quad 9$$

Provided that obstructions within the network environment have sharp physical edges, the break-wall kernel in equation 9 may provide a more accurate representation of shadowing obstructions.

Figure 6:
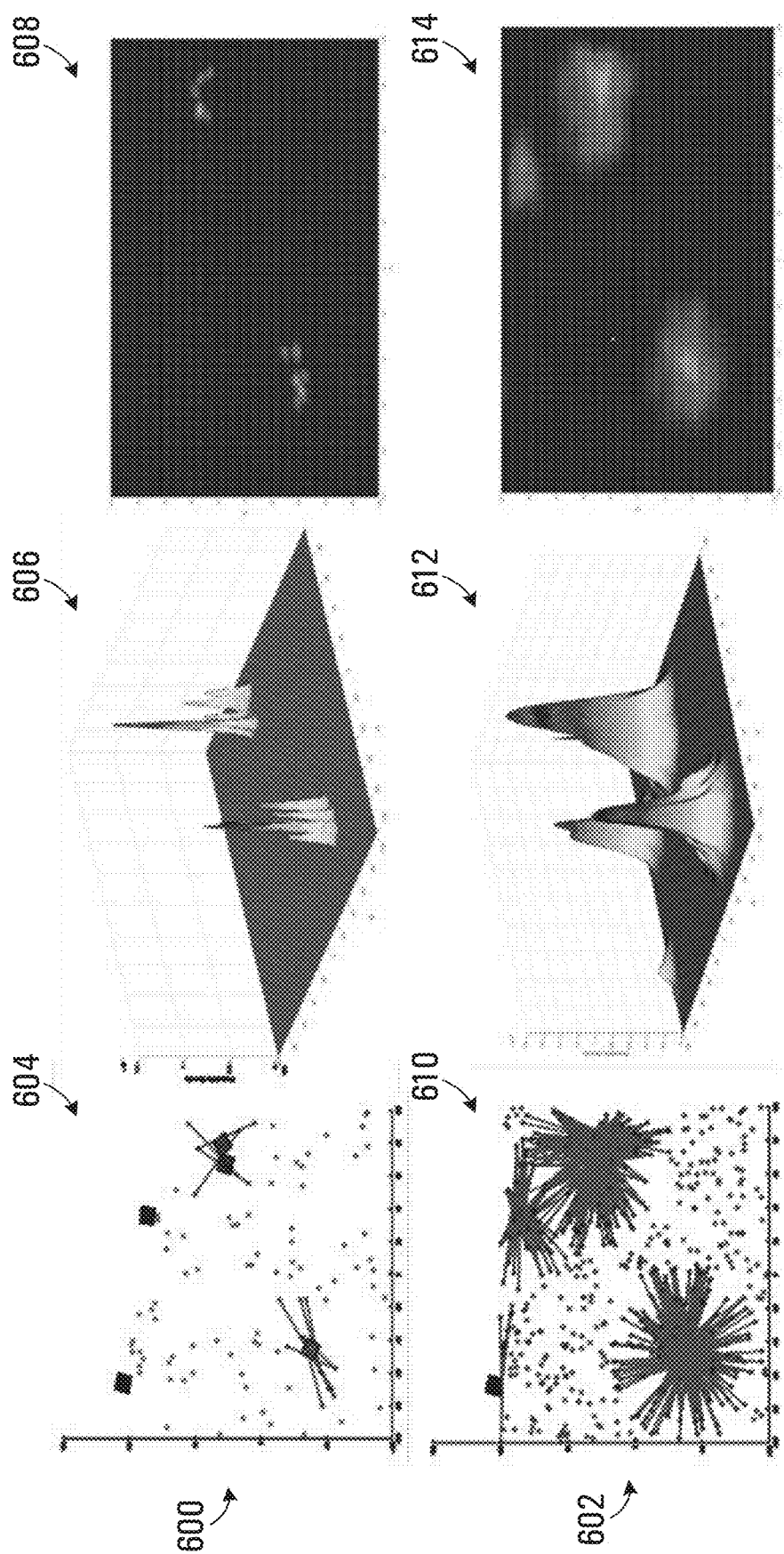
FIG. 6 is a graphical depiction of a set of simulated results for the generation of a shadowing map.

Referring to FIG. 6, simulated results for generation of a shadowing map are shown at 600 and 602. The graph 604 on the left shows a 2D view of five shadowing objects represented as block within a network environment at a time when only a few NLoS communication links surround three of the obstructions. The center graph 606 shows a 3D graphical depiction of the estimated shadowing obstruction locations determined by KDE estimation for the scenario shown in the graph 604. The graph 608 on the right is a 2D slice taken horizontally through the graph 606 at a height dependent on the desired resolution. Horizontal slices taken at different heights will yield different extents for the estimates of signal shadowing obstruction locations. The second set of graphs 610-614 are taken at a later time when a larger number of UEs and thus NLoS communication links surround each of the obstructions. As more UEs communicate with each other, obstructions are intercepted by a larger number of communication links, improving the resolution of the shadow map function $\mathcal{L}(z, t)$. Additionally, one or both of the UEs associated with any identified NLoS sidelink communication may be in motion, and would thus have a UE location that changes with time. In this case the UE and its neighboring UE or base station would be able to provide successive NLoS identifications for estimating locations of signal shadowing obstructions, further improving the resolution of the KDE spectrum $\mathcal{L}(z, t)$.

Each communication link between the set of nodes $\mathcal{N}^v$ in the wireless communications network 200 thus provides a shadowing contribution which are combined using the function $\mathcal{L}(z, t)$ in equation 4 to generate an overall map of signal shadowing locations. Combining shadowing contributions in a network having a large number of UEs and thus a large number of identified NLoS communication links results in a more representative shadowing map.

In general, the accuracy of shadowing map may also depend on factors other than the concentration of NLoS communication links identified for each obstruction. Inaccuracies caused by the LoS/NLoS prediction module 502 may cause a LoS link to be inferred as a NLoS link or vice versa. Inaccuracies in the UE location estimates 306 may cause the location of nodes to be displaced from their actual locations, thus also displacing the center location $\mu_{v,v'}^l$ assumed for the shadowing obstruction. The probability of misdetection would generally have a negligible effect of creating a small bias in the resulting signal shadowing map.

Figure 7:
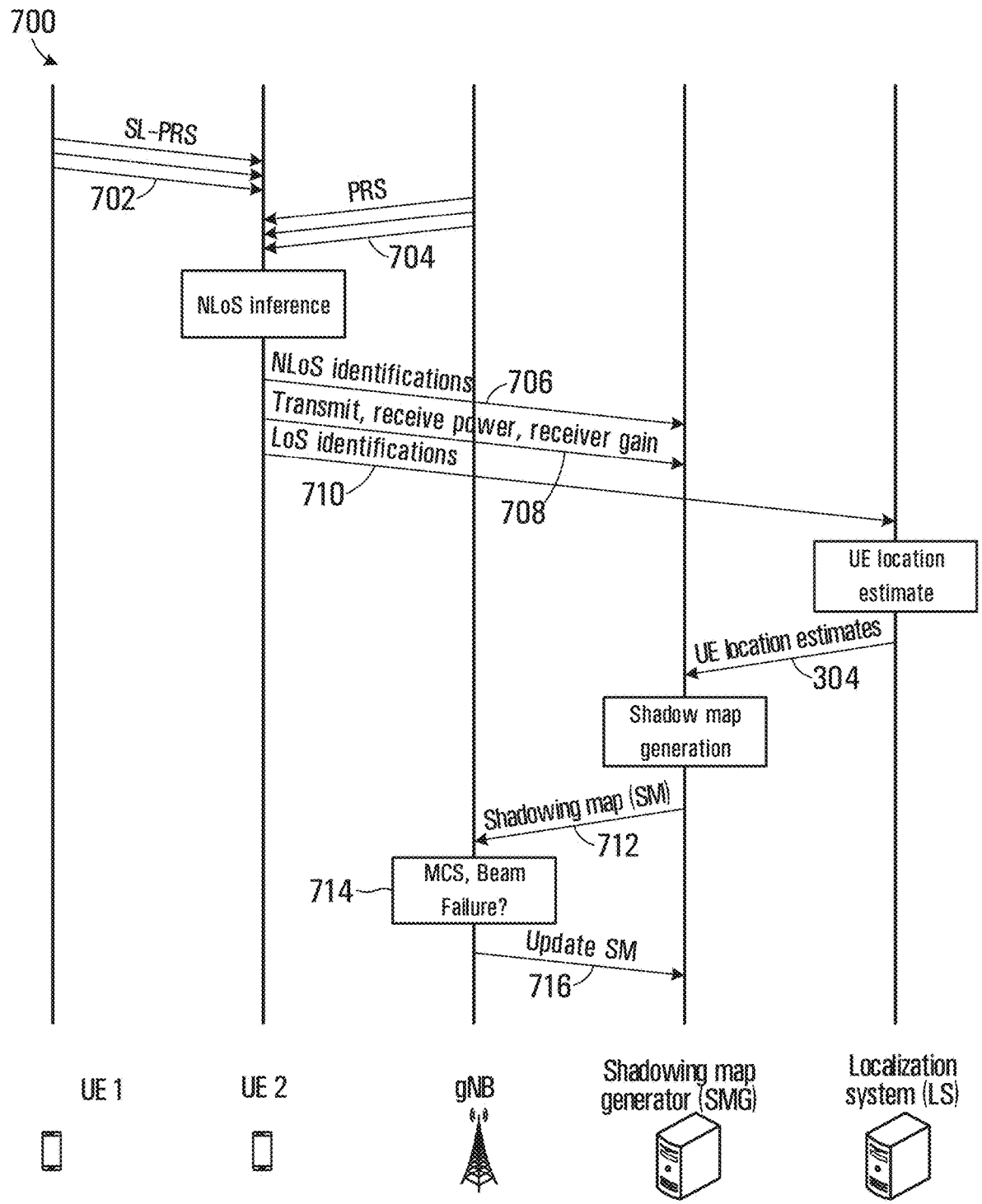
FIG. 7 is a signal flow diagram illustrating signaling between nodes for generation of the shadowing map shown in FIG. 6.

Referring to FIG. 7, a signal flow diagram illustrating signaling between nodes for generation of the shadowing map by the shadowing map generator 506 in accordance with one disclosed embodiment is shown generally at 700. The signaling involves two UEs, including UE1 and UE2, and network equipment. In the embodiment shown the network equipment includes a gNodeB (gNB) base station, the localization system (LS) 504, and the shadowing map generator (SMG) 506. The signal flow diagram 700 illustrates signaling between UE1 and UE2, and signaling between UE2 and the network equipment. The signal flow diagram 700 also illustrates signaling between the gNB, LS, and SMG on the network equipment side. The UE1 transmits a sidelink positioning reference signal (SL-PRS) 702 to the UE2 including the anonymized identifier of the UE1. The gNB also transmits a positioning reference signal (PRS) 704, which is received at the UE2. Each of the signals 702 and 704 are processed by the LoS/NLoS prediction module (502 in FIG. 5) on UE2 to generate NLoS inferences for the received reference signals. If the SL-PRS 702 is determined to be received via an NLoS propagation path, the UE2 generates signaling 706 to transmit the NLoS identification including the UE1 anonymized identifier, via the gNB, to the SMG. The UE2 further transmits signaling 708 including information derived from the received reference signals such as transmit power, received power, and receiver gain that facilitate determination of signal shadow fading coefficients for estimating the extent of shadowing contributions associated with the signals 702 and 704.

In this embodiment where LoS sidelink information is used for generating UE location estimates, if either the SL-PRS 702 and/or PRS 704 is determined to be via a LoS propagation path, the UE2 transmits signaling 710 including respective identifications for the UE1 and/or gNB to the location system (LS). The UE2 would also need to determine range estimate information for the reference signals 702 and 704. The range estimates are transmitted to the LS via the gNB to enable the use of the LoS sidelink information in generating the UE location estimates. In other embodiments where the UE location estimates are otherwise determined, the signaling 710 may be omitted.

The LS implements the localization system 504 shown in FIG. 5, which receives the LoS identifications and range estimates and generates UE location estimates 306 as described earlier herein. The UE location estimates 306 are provided to the SMG, which uses the estimates along with the received NLoS identification signaling 706 and transmit power, received power, and receiver gain signaling 708 as inputs for the shadowing map generator 506 shown in FIG. 5. The SMG generates the shadowing map and transmits shadowing map data 712 to the gNB and to other gNBs in the network for use in configuring communications with UEs in the wireless communications network 200.

Additional signaling not depicted in FIG. 7 may be required from the network equipment, such as assigning and reporting an anonymized and unique identifier to each UE. The list of anonymized UE identifiers enables a UE to identify neighboring UEs from which it receives the SL-PRS in order to report NLoS communication links back to the network equipment.

The gNB implements ongoing channel estimation and continually monitors for beam failure and/or increased bit error rates (BER) for transmissions. In one embodiment the gNB implements a beam failure monitoring function 714, which monitors unsuccessful attempts to adapt the modulation and coding scheme (MCS) or the incidence of high BER for transmissions by the gNB. An increasing level of transmission failures may indicate that the signal shadowing map has become outdated. When these beam failures reach a threshold, the beam failure monitoring function 714 may produce a signal 716 that initiates an update of the shadowing map by the SMG. The shadowing map generator 506 responds to receiving the signal 716 from the gNB of such transmission failures by generating updated shadowing map data 712, which is provided to the gNB and other gNBs in the wireless communications network 200.

Figure 8:
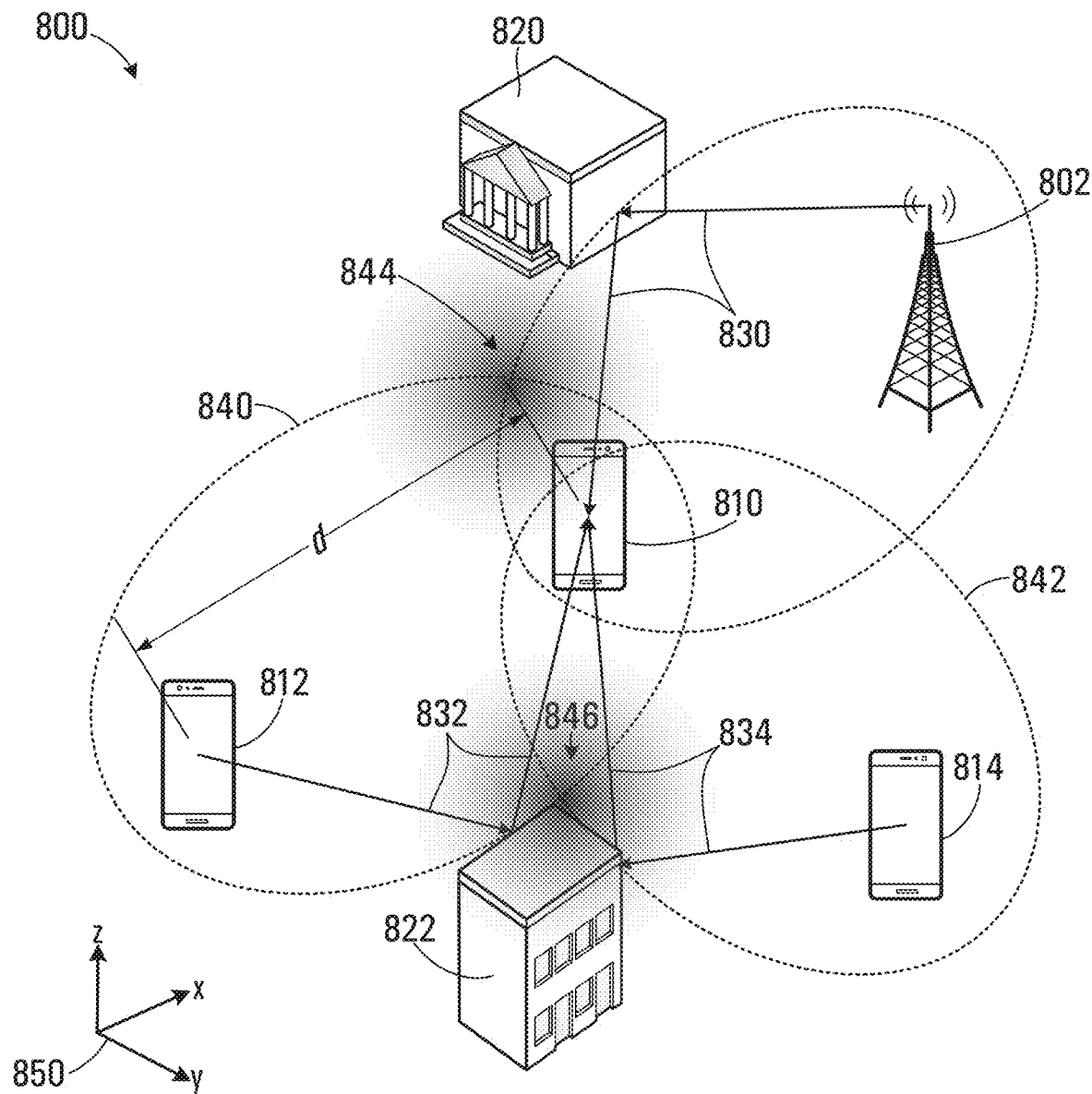
FIG. 8 is a schematic view of a physical layout of a portion of a wireless communications network in accordance with another disclosed embodiment.

A physical layout of a portion of a wireless communications network in accordance with reflection map generation embodiment is shown schematically at 800 in FIG. 8. Referring to FIG. 8, the wireless communications network 800 includes a base station 802 and UEs 810, 812, and 814. In this embodiment, buildings 820 and 822 within the wireless communications network 800 act as signal reflectors. A signal transmitted from the base station 802 to the UE 810 is reflected by the building 820, resulting in an indirect propagation path 830. Similarly, a signal transmitted from the UE 810 to the UE 812 is reflected by a portion of the building 822, resulting in an indirect propagation path 832; and a signal transmitted from the UE 814 to the UE 810 is reflected by a portion of the building 822, resulting in an indirect propagation path 834. The base station 802 forms part of network equipment implementing the wireless communications network 800, as described in more detail later herein.

Figure 9A:
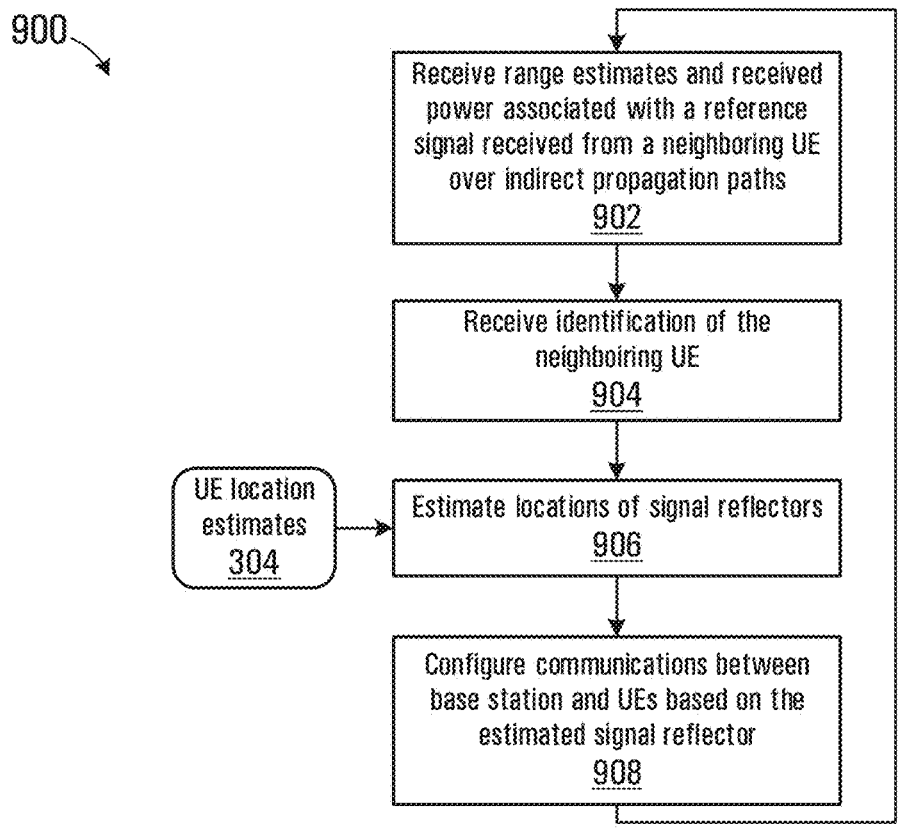
FIG. 9A is a flowchart depicting blocks of codes for directing network equipment to perform a process implemented on network equipment for estimating locations of signal reflectors within the wireless communication network shown in FIG. 8.

Referring to FIG. 9A, a process implemented on network equipment for estimating locations of signal reflectors within the wireless communication network 800 is shown generally at 900. The blocks generally represent computer instructions or codes that may be executed to cause various computer processor units making up the network equipment to perform functions for estimating the locations of signal reflectors.

Block 902 directs the network equipment of the wireless communications network 800 to receive, from UEs in the network 200, sidelink transmission information including range estimates indicative of a range associated with a reference signal received from a neighboring UE via the sidelink transmission over indirect propagation paths. For example, in FIG. 8 the UEs 812 and 814 each transmit reference signals via indirect propagation paths 832 and 834 respectively, and the UE 810 receives and processes these signals to extract range estimates. The range estimates are transmitted by the UE 810 via the base station 802 to the network equipment. The UE 810 also generates a received power measurement for each reference signal and transmits the received power via the base station 802 to the network equipment. Block 904 directs the network equipment to receive an identification of the neighbouring UEs (812 and 814) as anonymized identifiers transmitted by the UE 810, generally as described above in connection with the signal shadowing embodiment.

Block 906 of the process 900 then directs the network equipment to estimate locations of signal reflectors within a geographical coordinate system 850. The network equipment uses the UE location estimates 306 for the UEs 810-814, the received range estimates, and the received power to generate signal reflector location estimates.

Block 908 then directs the network equipment to cause the base station 802 to configure communications with UEs based on the estimated locations of the signal shadowing obstructions. In one embodiment the blocks 902-908 may be executed continuously to determine locations of signal reflector contributions within the wireless communications network 800. These identified signal reflector contributions may be combined to generate a reflector map representing spatial locations of signal reflectors within the geographical coordinate system 850. The reflector map may be provided to the base stations 202-208 to facilitate proactively configuring communication parameters to reduce the frequency of transmission failures.

Figure 10A:
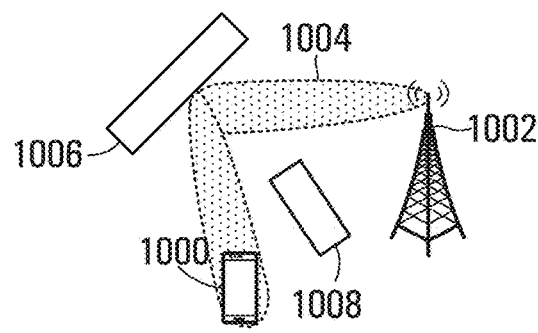
FIG. 10A is a first example of a base station configuration for proactively directing a transmission beam toward a known signal reflector.
Figure 10B:
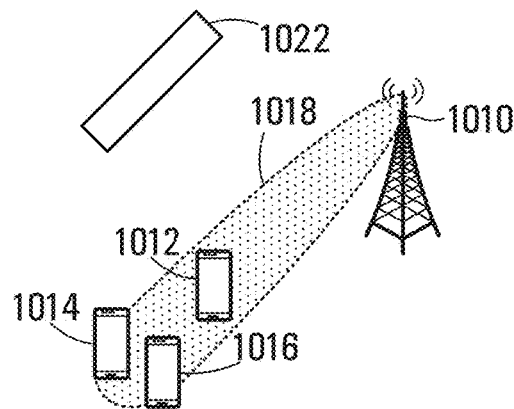
FIG. 10B is an example of a base station configuration that may cause interferences at UEs.
Figure 10C:
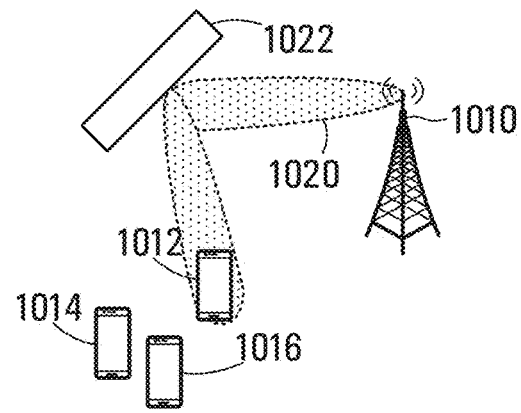
FIG. 10C is an example of a base station configuration for proactively avoids interference between UEs by directing a transmission beam toward a known signal reflector.

The reflector map for the wireless communications network 800 may be used to significantly increase a capacity of the network by facilitating proactive beamforming. If the network equipment has knowledge of locations of reflectors that can act to reflect and re-direct transmission beams, the base station can be directed to select a particular beam that points in the direction of a reflector in order to increase signal to noise ratio and reduce interference. As shown in FIG. 10A, if a UE 1000 would experience weak reception of signals from a base station 1002, the base station may proactively direct a transmission beam 1004 toward a known signal reflector 1006 to cause the beam to be redirected by the signal reflector to the UE. In this example, a direct propagation path between the base station 1002 and the UE 1000 is shadowed by an obstruction 1008. In another example shown in FIG. 10B, several UEs 1012-1016 are located within an area served by a transmission beam 1018 from a base station 1010, which may cause interference at the UEs. For example, transmissions intended for the UE 1012 may interfere with other transmissions directed to the UEs 1014 and 1016 from other base stations. As shown in FIG. 10C, the network equipment may be configured to detect this situation and respond by proactively directing a beam 1020 toward a signal reflector 1022 to cause the beam to be redirected by the signal reflector to the UE 1012 such that the potential interference to UEs 1014 and 10916 is reduced or eliminated.

Figure 10D:
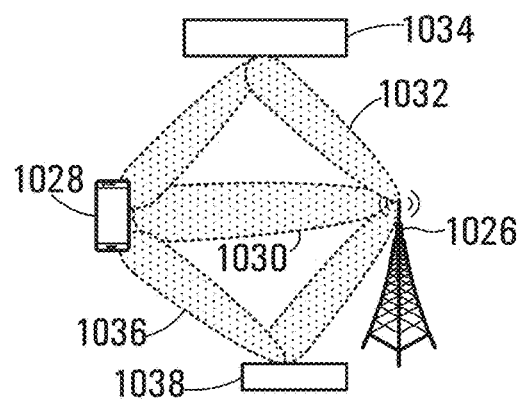
FIG. 10D is an example of a base station configuration in which a transmission is multiplexed over a direct beam and additional beams to improve a MIMO matrix rank for the transmission.

In another example shown in FIG. 10D, the network equipment may make a determination that a very strong LoS communication beam 1030 directed toward a UE 1028 from a base station 1026 is causing a reduction in MIMO channel matrix rank. The rank of the MIMO channel matrix is an indicator of how many data streams can be spatially multiplexed on the MIMO channel. The base station in FIG. 10D may respond by proactively directing one or more additional transmission beams 1032 and 1036 toward signal reflectors 1034 and 1038 that cause the additional beams to be redirected to the receiving UE. The transmission from the base station to the UE may then be multiplexed over the direct beam 1030 and the additional beams 1032 and 1036 to improve a MIMO matrix rank for the signal transmission.

Figure 9B:
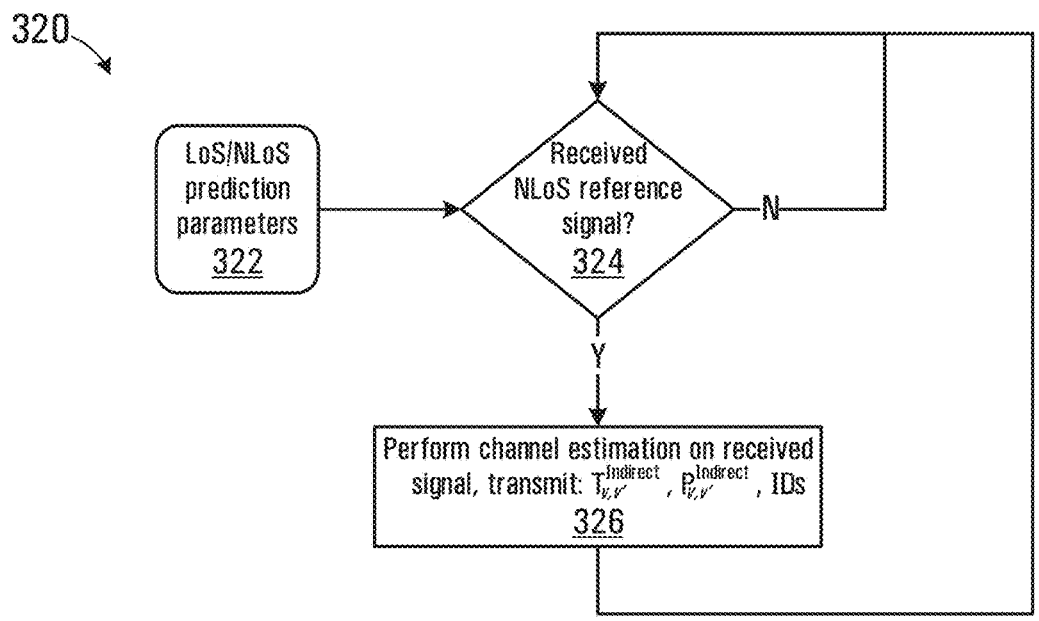
FIG. 9B is a flowchart depicting blocks of codes for directing a UE or base station to establish nLoS range estimates.

Referring to FIG. 9B, a method implemented on the UE 810 for generating the NLoS range estimates received at block 902 of the user equipment implemented process 900 is shown generally at 920. The UE 216 will previously have received parameters 322 for configuring a LoS/NLos identification model from the network equipment (e.g. via the base station 802). Block 324 directs the UE 810 to use the model to infer whether a received sidelink reference signal from the neighboring UE 210 was received via an NLoS propagation path (i.e. an indirect propagation path). If this is the case, block 326 directs the network equipment to process the reference signal to determine range estimates for the indirect propagation path. The range estimates are then transmitted to the network equipment via the base station 802 along with an identification of the UE from which the communication was received. If the sidelink communication is determined to be a LoS communication, no range estimates are generated for this purpose.

As in the case of the shadowing embodiment disclosed above, for a dense network of UEs there will be a large number of potential sidelink connections between UEs that may be leveraged to determine reflector locations. Additionally, the base station 802 would generally also receive reference signals from the UEs in the network as part of uplink transmissions from the UEs to the base stations. The base station 802, on receiving the reference signals, may make a determination that the reference signal transmitted was received via an indirect propagation path as described above. Similarly, for downlink transmissions between the base station 802 and the UEs 810-814, a UE may make a determination that a reference signal transmitted by a base station was received via an indirect propagation path. The range estimates for indirect uplink and downlink propagation paths may advantageously be combined with the identification of indirect sidelink transmissions between neighboring UEs for generating the reflector map. One advantage of including uplink and downlink transmissions is that the location of the base station 802 provides an anchor location, which may improve the spatial accuracy of the resulting shadowing map.

Figure 11:
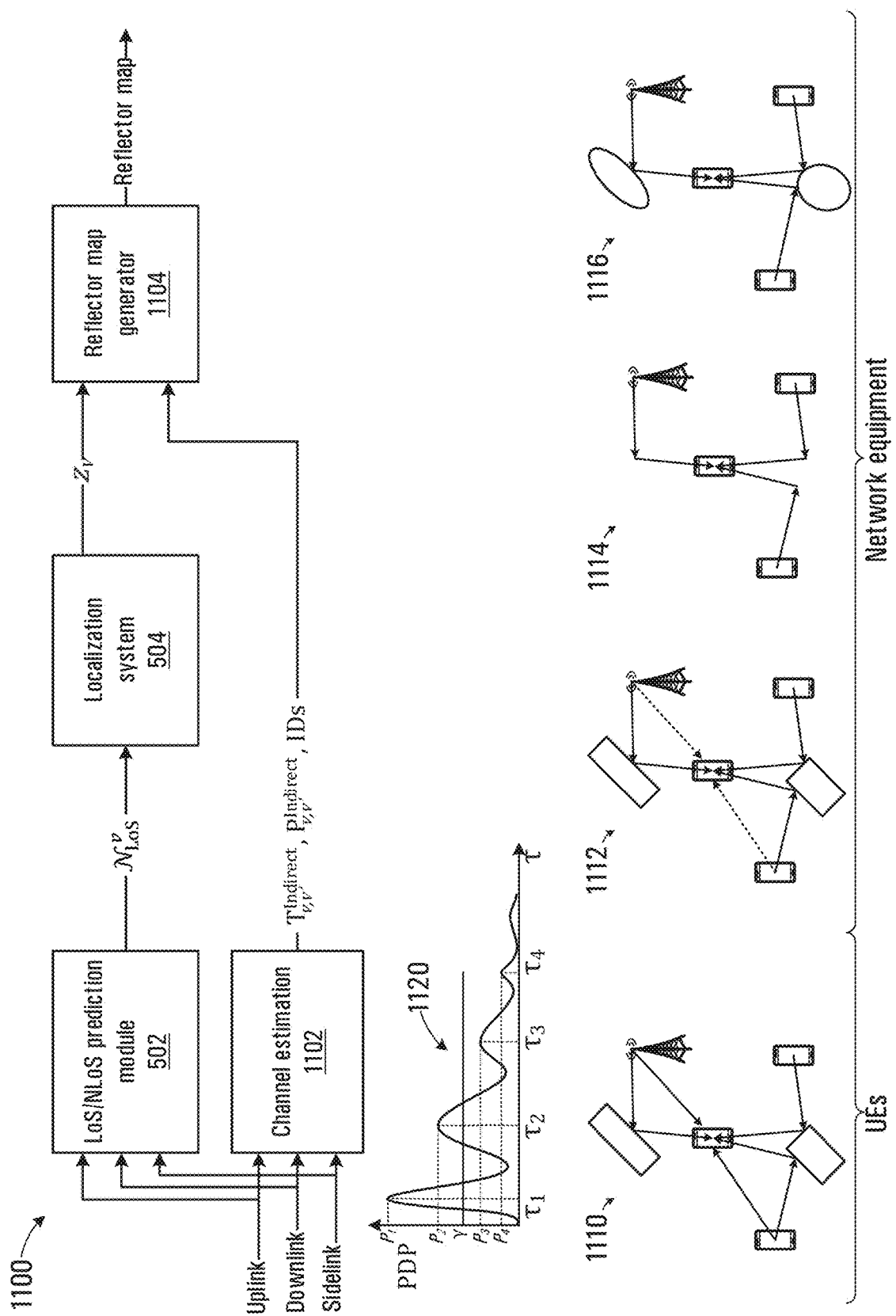
FIG. 11 is a block diagram of a system for generating a reflector map.

Referring to FIG. 11, a block diagram of a system for generating a reflector map is shown generally at 1100 in which the UEs implement a channel estimation function 1102. The channel estimation function 1102 receives reference signals via uplink, downlink, and sidelink transmissions and determines signal propagation parameters for the received reference signal. An example of a received PDP reference signal is shown at 1120 in the form of a power delay profile (PDP). The PDP plots an intensity of a reference signal received via a multipath channel as a function of time delay (i.e. the difference in travel time between multipath signal arrivals). In a multipath environment, reference signals may be received via a direct propagation path or via an indirect propagation path after one or more reflections at signal reflection obstructions in the network. In this case, the PDP has a first power peak $P_1$, which would correspond to a reference signal received directly via a LoS propagation path. Second, third, and fourth power peaks $P_2$, $P_3$ and $P_4$ correspond to reference signals received indirectly after one or more reflections at reflecting surfaces within the network environment. For each received reference signal, the channel estimation function 1102 determines distances $\tau$ corresponding to the power peaks $P_1$, $P_2$, $P_3$ and $P_4$ (i.e. distance $\tau_1$ for the direct propagation path, and distances $\tau_2 \ldots \tau_{N_{mp}}$ for the indirect propagation paths.

In practice, there may be more indirect propagation paths than the number of propagation paths $N_{mp}$ detected by the UE due to limited resolvability of the UE receiver, shadowing, the noise floor, etc. In this disclosed embodiment, indirect propagation paths that involve multiple signal reflectors, and thus more than one signal reflection, are removed from consideration by applying a minimum power threshold $\gamma$. Accordingly, only single-reflection indirect propagation paths are considered, which reduces complexity. Indirect signal propagation paths $(\tau_3, \tau_4 \ldots )$ that involve multiple reflections will generally be weaker than signals that only undergo a single reflection $(\tau_2)$. The channel estimation function 1102 thus generates a propagation distance subset $T_{v,v'}^{Indirect}$ and corresponding power subset $P_{v,v'}^{Indirect}$ defined by:

$$T_{v,v'}^{Indirect} = \{\tau_j^{v,v'}: j=2 \ldots N_{mp} / PS(\tau_j^{v,v'}) \geq \gamma\} \qquad 10$$

$$P_{v,v'}^{Indirect} = \{PS(\tau_j^{v,v'}) \geq \gamma: j=2 \ldots N_{mp}\}, \qquad 11$$

where $PS(\tau_j^{v,v'})$ is the magnitude of the delay spectrum which may be determined from a power delay profile (PDP) on a channel between the UE v and UE v', the correlator, or any other super-resolution pseudospectrum. The power threshold $\gamma$ is selected such that the set of distances $\tau \in T_{v,v'}^{Indirect}$ are constrained to distances traversed by $N'_{mp}$ for single-reflection propagation paths between the UEs. The propagation distance and power sets $T_{v,v'}^{Indirect}$ and $P_{v,v'}^{Indirect}$ are transmitted by UEs in the wireless communications network 800 via the base station (802 in FIG. 8) to a reflector map generator 1104, which forms part of the network equipment. In this embodiment, the UE performs the thresholding function and only transmits distances $\tau \in T_{v,v'}^{Indirect}$ for single reflection paths. In other embodiments, all distances $\tau \in T_{v,v'}^{Indirect}$ may be transmitted by the UE to the base station, which may perform the thresholding function.

The system 1100 also includes the LoS/NLoS prediction module 502, which implements the LoS/NLoS prediction model generated and trained by the network equipment for determining whether communication links with other UEs or base stations are via LoS or NLoS propagation paths. As in the case of the shadowing map generation system 500 shown in FIG. 5, the system 1100 also includes the localization system 504 which receives the LoS identifications from the LoS/NLoS prediction modules 502 associated with the nodes v. The localization system 504 uses these identifications in establishing UE location estimates $z_v$ for the nodes v, which are provided to the reflector map generator 1104.

Referring back to FIG. 8, for the example of the single reflection propagation path 832 between the UE 812 and the UE 810, the distance $\tau_1$ associated with the indirect propagation path 832 establishes that the signal reflector 822 is located somewhere on the locus of a 3D ellipsoid surface having a focal distance d and whose foci coincide with the locations of the UE 812 and UE 810. The 3D ellipsoid surface is shown in FIG. 8 represented by a 2D ellipse 840 for sake of illustration. The ellipse 840 thus represents possible locations of the reflector 822, but it remains uncertain as to where on the ellipsoid surface the reflector is actually located. As the number of UEs in the wireless communications network 800 having sidelink, uplink, or downlink signals reflected by the building 822 increases, the uncertainty about the location of the reflector is reduced to facilitate producing an estimate of the location of the reflector. For example, the sidelink between the UE 814 and the UE 810 establishes another ellipsoid surface locus 842, which reduces the uncertainty of the reflector location at the building 822 to an uncertainty cloud 846 located at the intersections between the ellipsoid surfaces 840 and 842. Similarly the link between the UE 814 and the base station 802 establishes another ellipsoid surface locus 844, which reduces the uncertainty of the reflector location at the building 820 to an uncertainty cloud 844. For a dense network where UEs are spatially dispersed, locations of significant reflecting obstructions within the geographical coordinate system 850 may be estimated. Further observations based on sidelinks between the UEs and uplinks/downlinks between UEs and the base station would further reduce the size of the uncertainty clouds 844 and 846.

By making an assumption that the UEs are in the same 2D plane, the problem can be simplified such that the reflector contribution corresponding to each $\tau \in T_{v,v'}^{Indirect}$ is located on an ellipse of focal length d at which the foci of the UE 812 and UE 810 are located. Mathematically, this can be written as:

$$\tau_{n_{mp}}^{v,v'} = \sqrt{(z_1-z_1^v)^2+(z_2-z_2^v)^2} + \sqrt{(z_1-z_1^{v'})^2+(z_2-z_2^{v'})^2}, \quad n_{mp}=2\ldots N'_{mp} \quad 12$$

where $(z_1, z_2)$ is the locus of $n_{mp}$ th reflector, $z_v=(z_1^v, z_2^v)$, and $z_{v'}=(z_1^{v'}, z_2^{v'})$ are the locations of communicating nodes v and v' respectively. The locations may be taken from the UE location estimates 306 generated by the localization system 504. Alternatively, in some cases locations may be available as ground-truth locations for nodes such as a base station. Practically, even where a ground-truth location $(z^\circ_1, z^\circ_2)$ is available, equation 12 is not satisfied due to several reasons:

i. Estimations of the distances $\tau_{n_{mp}}$, $n_{mp}=2\ldots N'_{mp}$ are contaminated with the estimation noise, which has a variance lower bounded by the Cramér-Rao lower bound (CRLB);

ii. If the nodes v and v' are mobile users, their locations $z_v$ and/or $z_{v'}$ are also contaminated with two independent estimation noises of some limited variances due to the fact that $z_v$ and $z_{v'}$ are estimated from unknown direct path distances; and iii. Nodes v and v' are not perfectly time synchronized because they are driven by clock signals having differing bias and skew.

The imperfections (i) and (ii) can be taken into account in equation 12 by introducing an additive noise term as follows:

$$\hat{\tau}_{n_{mp}}^{v,v'}(z) = \tau_{n_{mp}}^{v,v'} + n_{n_{mp}}^{v,v'}, \quad n_{mp}=2\ldots N'_{mp} \quad 13$$

where $n_{n_{mp}}^{v,v'} \sim \mathcal{N}(0, \sigma_{n_{mp}}^{v,v'^2})$ is an additive noise term that can be modelled by a Gaussian distribution with good accuracy. It may be assumed that the CRLB of range estimation is inversely proportional to the received signal to noise ratio, $\sigma_{n_{mp}}^{v,v'}$, which leads to:

$$\sigma_{n_{mp}}^{v,v'} \propto \frac{1}{p_{n_{mp}}^{v,v'}}, \quad p_{n_{mp}}^{v,v'} \in P_{v,v'}^{Indirect} \quad 14$$

where $p_{n_{mp}}^{v,v'}$ is the measured and recorded power of the $n_{mp}^{th}$ indirect propagation path.

Because the clock generators of the UEs and base stations are not generally synchronized, there will be clock skew and bias between nodes in the wireless communications network 800. The clock skew and bias cause an unknown circular shift in the power delay profile (PDP) for a channel between nodes v and v'. It may be assumed that each node in the network has an independent clock generator, which means that the PDP for links between nodes in the network would be subjected to an independent time shift. The assumption that the shifts are independent might not be made in cases where the network implements a clock synchronization protocol.

Figure 12:
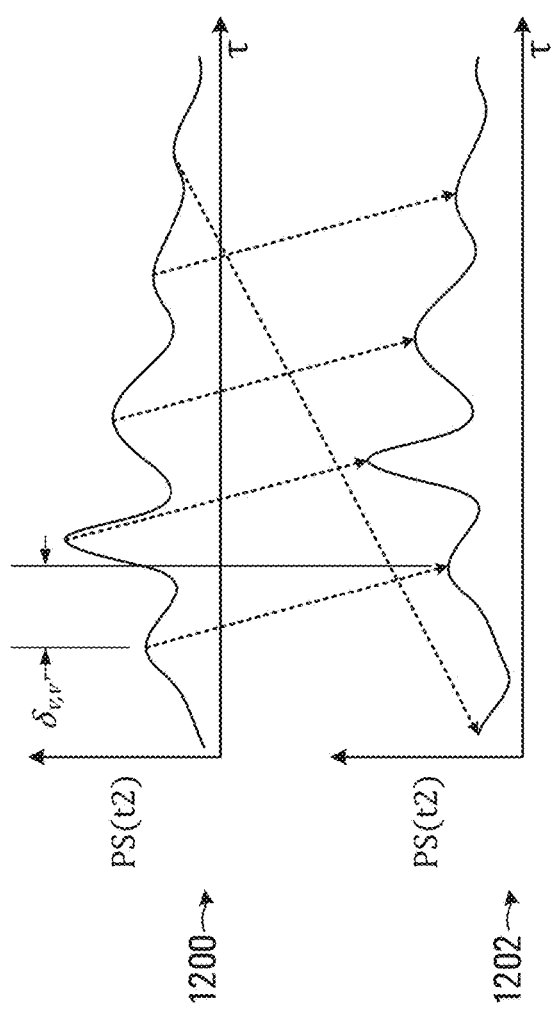
FIG. 12 is a graphical depiction of two power delay profiles at two different nodes.

Referring to FIG. 12, an example of two PDP profiles 1200 and 1202 at two nodes are shown with such an independent time shift. The fact that PDP 1202 is shifted with respect to the PDP 1200 by a time $\delta_{v,v'}$ for the link implies that all the PDP peaks are shifted by the same time, i.e. $T_{v,v'} = \{\tau_j^{v,v'} + \delta_{v,v'}: j=1\ldots N_{mp}\}$. This time shift causes the estimated locations of reflectors in the network 800 to become biased. To address this problem, the following procedure may be implemented:

i. Estimate an unbiased location estimate $z_v$ using a Time Difference Of Arrival (TDoA) technique based on known anchor locations: $(z_v, \tau_1^{v,v'})$, $v' \in \mathcal{N}_{BS}^v$, where $\mathcal{N}_{BS}^v$ is the set of base stations in the network with range measurements to node v. This step relies on time-synchronization between base stations, which is available in currently implemented cellular networks;

ii. Estimate synchronization errors using: $\hat{\delta}_{v,v'} = \tau_1^{v,v'} - \|z_v - z_{v'}\|_2$, $v' \in \mathcal{N}_{BS}^v$;

iii. Average the synchronization error:

$$\hat{\delta}_v = \frac{1}{|\mathcal{N}_{BS}^v|} \cdot \sum_{\nu' \in \mathcal{N}_{BS}^v} \hat{\delta}_{v,v'};$$

and iv. Form an indirect path delay set: $T_{v,v'}^{Indirect} = \{\tau_j^{v,v'} - \hat{\delta}_v: j=2 \ldots N_{mp} \wedge PS(\tau_j^{v,v'}) \geq \gamma\}$.

With the above formulation, a likelihood of the locus of the reflector corresponding to $\hat{\tau}_{n_{mp}}(z)$ is given by:

$$\mathcal{P}\left(\hat{\tau}_{n_{mp}}^{v,v'} \mid z, \left(z_v, z_{v'}, \sigma_{n_{mp}}^{v,v'2}\right)\right) = \frac{1}{2\pi\sigma_{n_{mp}}^{v,v'2}} \exp\left(-\frac{1}{2\pi\sigma_{n_{mp}}^{v,v'2}} \left(\frac{\hat{\tau}_{n_{mp}}^{v,v'} - \sqrt{(z_1 - z_1^v)^2 + (z_2 - z_2^v)^2} +}{\sqrt{(z_1 - z_1^{v'})^2 + (z_2 - z_2^{v'})^2}}\right)^2\right)$$

Equation 15 is the likelihood of the locus of the reflector corresponding to $\hat{\tau}_{n_{mp}}(z)$. In order to find the posterior PDF of z (which is needed for passive location learning in later stages) from this likelihood, the Bayes theorem is applied as follows:

$$\mathcal{P}\left(z \mid \hat{\tau}_{n_{mp}}^{v,v'}, \left(z_v, z_{v'}, \sigma_{n_{mp}}^{v,v'2}\right)\right) = \frac{\mathcal{P}\left(\hat{\tau}_{n_{mp}}^{v,v'} \mid z, \left(z_v, z_{v'}, \sigma_{n_{mp}}^{v,v'2}\right)\right)\mathcal{P}(z)}{\int_{z'} \mathcal{P}\left(\hat{\tau}_{n_{mp}}^{v,v'} \mid z', \left(z_v, z_{v'}, \sigma_{n_{mp}}^{v,v'2}\right)\right)\mathcal{P}(z')dz'} \quad 16$$

The PDF $\mathcal{P}(z)$ represents the prior knowledge about the location of the reflector to be incorporated into the model. When no such prior knowledge is available, a uniform prior that has maximum entropy may be selected, which yields:

$$\mathcal{P}\left(z \mid \hat{\tau}_{n_{mp}}^{v,v'}, \left(z_v, z_{v'}, \sigma_{n_{mp}}^{v,v'2}\right)\right) = \frac{\mathcal{P}\left(\hat{\tau}_{n_{mp}}^{v,v'} \mid z, \left(z_v, z_{v'}, \sigma_{n_{mp}}^{v,v'2}\right)\right)}{\int_{z'} \mathcal{P}\left(\hat{\tau}_{n_{mp}}^{v,v'} \mid z', \left(z_v, z_{v'}, \sigma_{n_{mp}}^{v,v'2}\right)\right)dz'} \quad 17$$

The propagation distance and power sets $T_{v,v'}^{Indirect}$ and $P_{v,v'}^{Indirect}$ received from the UE channel estimation function 1102 may be used to generate a labelled connectivity graph $G=(V,E)$ having labelled range measurements for each edge including sidelink communication links between neighboring UEs an uplink/downlink connection links between UEs and base stations. Denoting by $\mathcal{N}$ the set of all nodes (UEs and bases stations) in the network 800, and by $\mathcal{N}^v \subset \mathcal{N}$ the set of nodes that (i) are connected to UE v (ii) for which propagation distance and power sets $T_{v,v'}^{Indirect}$ and $P_{v,v'}^{Indirect}$ have been received from the UE v at the reflector map generator 1104, the connectivity graph G is defined as:

$$V = \mathcal{N} \quad E = \{(v,v'): v,v' \in V \wedge (v \in \mathcal{N}^{v'} \vee v' \in \mathcal{N}^v)\}. \quad 18$$

Adding location estimates 304 determined by the localization system 504, the connectivity graph in equation 18 is converted to labelled graph $G''=(V'', E'', L'')$ defined by:

$$V'' = \{(v,z_v): v \in V \wedge \mathbb{1}_{z_v} = 1\}$$

$$E'' = \{(v,v'): v,v' \in V'' \wedge (v \in \mathcal{N}^{v'} \vee v' \in \mathcal{N}^v)\}$$

$$L'' = \{(T_{v,v'}^{Indirect}, P_{v,v'}^{Indirect}): (v,v') \in E''\} \quad 19$$

In equation 19, V", E" and L" are respectively the vertex, edge, and label sets of the graph G" and the operator $\mathbb{1}_{z_v}$ is the identity function to retain only vertices v in the connectivity graph for which a UE location could be estimated. $\mathcal{N}^v$ is the set of UEs in the neighborhood of UE v that (i) are connected to node v, and (ii) performed range measurements with v. The sets $T_{v,v'}^{Indirect}$ and $P_{v,v'}^{Indirect}$ are the propagation distance and power sets defined in equations 10 and 11 that are associated with an edge (v,v') of G". Although the base stations are able to make observations of $T_{v,v'}^{Indirect}$ and $P_{v,v'}^{Indirect}$ for communications received at the base station from a UE, for sidelink communications between UEs this information cannot directly or indirectly be inferred by the base station as such. The observations thus need to be transmitted from UEs to the base station. Although in this described embodiment only indirect single reflection signal propagation paths are considered, in some embodiments the transmitted sets $T_{v,v'}^{Indirect}$ and $P_{v,v'}^{Indirect}$ may include information for all resolved indirect-path signal components. Additionally, because the required UE location estimates 306 may be based in part on LoS sidelink connections between neighboring UEs, in some embodiments sets $T_{v,v'}^{Direct/Indirect}$, $P_{v,v'}^{Direct/Indirect}$ including all direct and indirect signal components may be transmitted by UEs. If any of the UEs are moving within the wireless communications network 800, successive sets $T_{v,v'}^{Direct/Indirect}$, $P_{v,v'}^{Direct/Indirect}$ may be transmitted, thus providing temporal data in addition to the spatial data.

The reflector map generator 1104 implements a kernel density estimation (KDE) algorithm on the graph G" to generate the reflection map by updating the following metric:

$$\mathcal{L}(z, t) = \sum_{l=t-T}^{t} \sum_{\substack{(v,v') \in E'' \\ (\hat{\tau}_{n_{mp}}^{v,v'}, p_{n_{mp}}^{v,v'}) \in L''}} \alpha_l \mathcal{P}\left(z \mid \hat{\tau}_{n_{mp}}^{v,v'}, \left(z_v, z_{v'}, \left(p_{n_{mp}}^{v,v'}\right)^{-1}\right)\right), z \in \mathbb{R}^2 \quad 20$$

where $\mathcal{P}(z \mid \hat{\tau}_{n_{mp}}^{v,v'}, (z_v, z_{v'}, 1/p_{n_{mp}}^{v,v'}))$ from equation 16 or 17 acts as the kernel density function for producing the reflector map represented as an oval at 1116 in FIG. 11. The time-dependent factor $\alpha_l \in [0,1]$ and time-span term T implement a discounting factor such that when periodically updating the reflector map in response to receiving ongoing observation sets $T_{v,v'}^{Indirect}$, $P_{v,v'}^{Indirect}$ more recently received observations are assigned a greater weight than previously received observations. This helps to keep the model agile and adaptive in wireless environments where the obstructions that reflect signals may be mobile.

Figure 13:
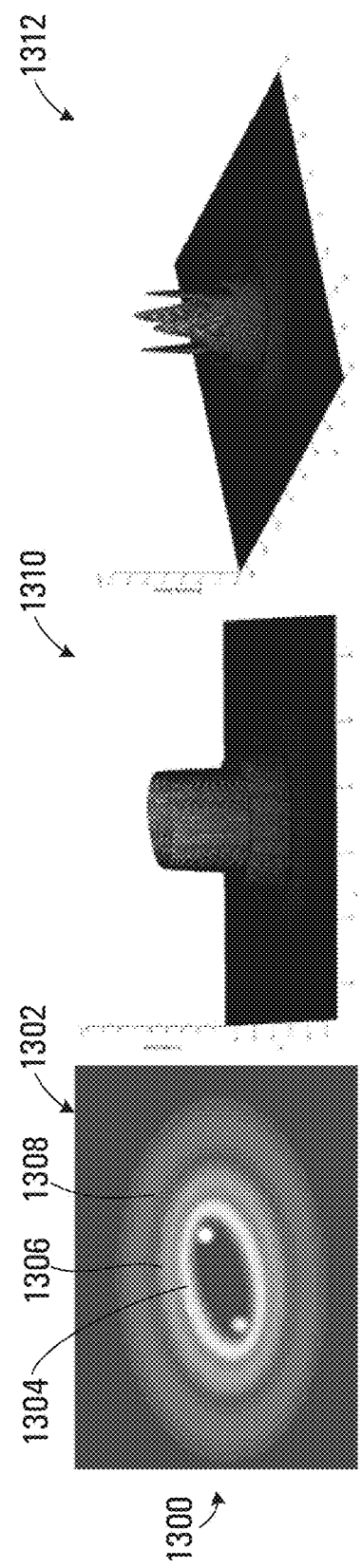
FIG. 13 is a graphical depiction of a set of simulated results for the generation of a reflector map.

Referring to FIG. 13, simulated results for generation of a reflector map are shown at 1300. The graph 1302 on the left depicts the nodes v and v' as dots with the ellipsoid 1304 representing the strongest indirect propagation path between the nodes, the ellipsoid 1306 representing the $2^{nd}$ strongest indirect propagation path, and the ellipsoid 1308 representing the $3^{rd}$ strongest indirect propagation path. The reflector map $\mathcal{L}(z, t)$ at 1310 has the appearance of a ring probability density function, and is centered at $(z_v + z_{v'})/2$, and has spreading $\sigma_{n_{mp}}^{v,v'}$. The spreading $\sigma_{n_{mp}}^{v,v'}$ is selected to be inversely proportional to the magnitude of received power for $n_{mp}^{th}$ power at a graph edge (v,v'). The reflector map $\mathcal{L}(z, t)$ at 1312 has been updated to include additional indirect link inferences and the locational posterior yields a PDF with lower uncertainty.

Figure 14:
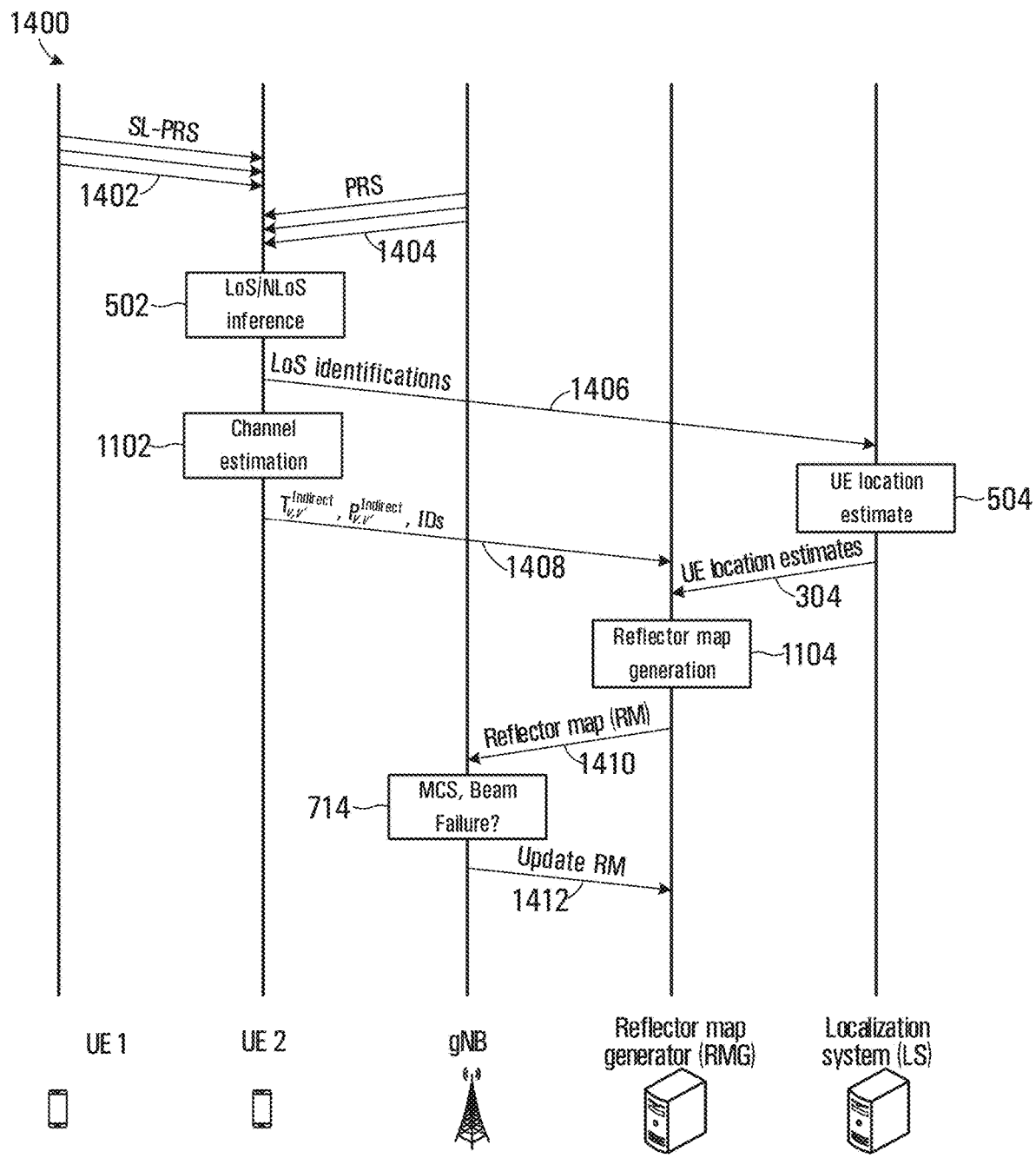
FIG. 14 is a signal flow diagram illustrating signaling between nodes for generation of a reflector map.

Referring to FIG. 14, a signal flow diagram illustrating signaling between nodes for generation of the reflector map by the reflector map generator 1104 in accordance with one disclosed embodiment is shown generally at 1400. The signaling involves two UEs, including UE1 and UE2, and network equipment. In the embodiment shown the network equipment includes a gNodeB (gNB) base station, the localization system (LS) 504, and the reflector map generator (RMG) 1104. The signal flow diagram 1400 illustrates signaling between UE1 and UE2, and signaling between UE2 and the network equipment. The signal flow diagram 1400 also illustrates signaling between the gNB, LS, and RMG on the network equipment side. The RMG may be implemented on a processor unit in communication with a processor-readable memory that stores processor-executable instructions that cause the processor to perform the functions disclosed above.

The UE1 transmits a sidelink positioning reference signal 1402 including the anonymized identifier (SL-PRS) of the UE1 to the UE2. The gNB also transmits a positioning reference signal (PRS) 1404, which is received at the UE2. Each of the signals 1402 and 1404 are processed by the LoS/NLos prediction module 502, and if determined to be received via a LoS propagation path, the UE2 transmits signaling 1406 including respective identifications for the UE1 and/or gNB to the LS for generating UE location estimates. The UE2 also determines range estimate information for the reference signals 1402 and 1404 for transmission to the RMG. The LS receives the LoS identifications and range estimates and generates UE location estimates 306 as described earlier herein. In other embodiments where the UE location estimates are otherwise determined, the signaling 1406 may be omitted.

The channel estimation function 1102 on the UE2 further processes the SL-PRS and PRS signals 1402 and 1404 to generate signaling 1408 including propagation distance and power sets $T_{v,v'}^{Indirect}$ and $P_{v,v'}^{Indirect}$ as described above. Because the reflection map construction algorithm works by associating indirect propagation path delays with estimated UE locations for nodes (v,v') associated with the link, the signaling 1408 is accompanied with anonymized IDs of the neighboring UEs to enable determination of the locations of the nodes, as described above in connection with the shadowing map generation.

The RMG generates reflector map data 1410 as described above and transmits the data to the gNB and other gNBs in the network for use in configuring communications with UEs. In this embodiment, the gNB implements the beam failure monitoring function 714 as described above in connection with the shadowing map generation embodiment. Beam failures for signal transmissions within the gNB cell cause the beam failure monitoring function 714 to produce a signal 1412 that causes the RMG to update the reflector map.

Figure 15:
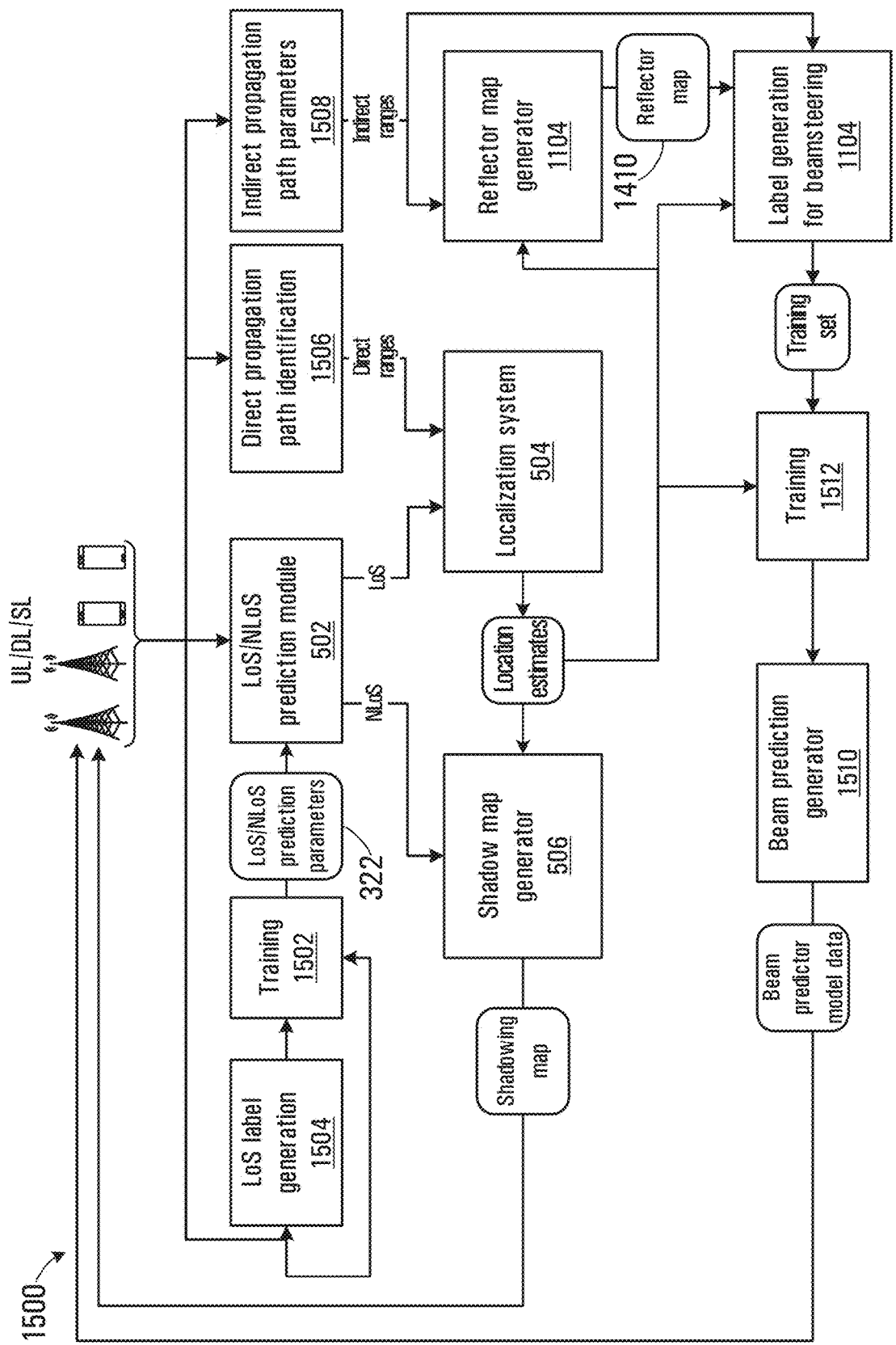
FIG. 15 is a block diagram showing a pipeline of information flows between modules making up network equipment in a network.

Referring to FIG. 15, a block diagram showing a pipeline of information flows between modules making up the network equipment in the networks 200 and 800 is shown generally at 1500. The pipeline 1500 incorporates elements described above in connection with the shadowing map generation system 500, the reflector map generation system 1100, and additional elements involved in a implementing these functions in the network.

One or more base stations and a plurality of UEs transmit and receive reference signals during routine communications. As disclosed above, the LoS/NLoS prediction module 502 is implemented on each base station and UE node. The LoS/NLoS prediction module 502 processes reference signals received at the node and is configured for operation by receiving LOS/NLOS prediction parameters 322. The parameters 322 are generated by a training module 1502, which is implemented on the network equipment. The training module 1502 receives labeled LoS training data generated by a LoS label generation module 1504, which processes uplink, downlink and sidelink communications. The parameters 322 may be continuously generated by the LoS label generation module 1504 and training module 1502, and are periodically communicated to base stations and UEs to update the LoS/NLoS prediction module 502 for current network conditions. The LoS/NLoS prediction module 502 thus processes reference signals received at each base station and UE and identifies the received signals as having been received via either a LoS or an NLoS propagation path.

A direct propagation path identification module 1506 estimates the range parameters of the direct propagation path. The selected direct path range estimates are then fed by to the localization system 504. The localization system 504 estimates the UE locations in a collaborative (parallel) or non-collaborative (sequential) manner. The generation of accurate and unbiased UE location estimates by the localization system 504 is effective in reducing spatial location errors. Spatial location errors would propagate through the pipeline 1500 and manifest in the shadowing and reflection data produced. Reducing the incidence of UE location estimates being determined based at least in part on indirect NLoS communications reduces location bias in the reflector map.

The shadowing map generator 506 generates the shadowing map based on NLoS identifications and location estimates provided by the localization system 504, as described above in detail. The shadowing map generator 506 produces shadowing map data, which is provided to the communication subsystems of the base stations for use in configuring communications with UEs.

In parallel with the direct propagation path identification module 1506, an indirect propagation path identification module 1508 estimates range parameters for $2^{nd}$ or subsequent indirect path distances between nodes. The indirect path range estimates are fed to the reflector map generator 1104. As disclosed above, in some embodiments only indirect propagation paths that undergo a single reflection may be selected and range estimates for multiple reflection paths may be discarded by the module 1508.

As described in more detail above, the reflector map generator 1104 receives the location estimates from the localization system 504 and the indirect range estimates from the module 1508 and generates the reflector map including locations of signal reflectors. The reflector map on its own does not provide information as to which signal reflectors could be of use in communications between base stations and UEs.

In this embodiment the pipeline 1500 further includes a beam prediction generator module 1510, which is implemented to facilitate location aware beam steering by the base station. Once the locations of significant reflectors in the wireless communications network 800 are known, a base station may be configured to make use of these known reflectors to make beam selection and beam steering decisions for uplink and downlink communications with a particular UE.

The beam prediction generator module 1510 operates on the reflector map data 1410 that includes locations $z_{v,v'}^{refl} \in \mathbb{R}^2$ of possible reflectors that could be used by a base station station v to redirect a transmission beam to a UE v'. The beam predictor 1510 also receives location estimates $z_v$, $z_{v'} \in \mathbb{R}^2$ for the base station station v and the UE v'. The base station v has a determined location $z_v = (z_1^v, z_2^v)$ and the UE v' an estimated location $z_{v'} = (z_1^{v'}, z_2^{v'})$.

Figure 16:
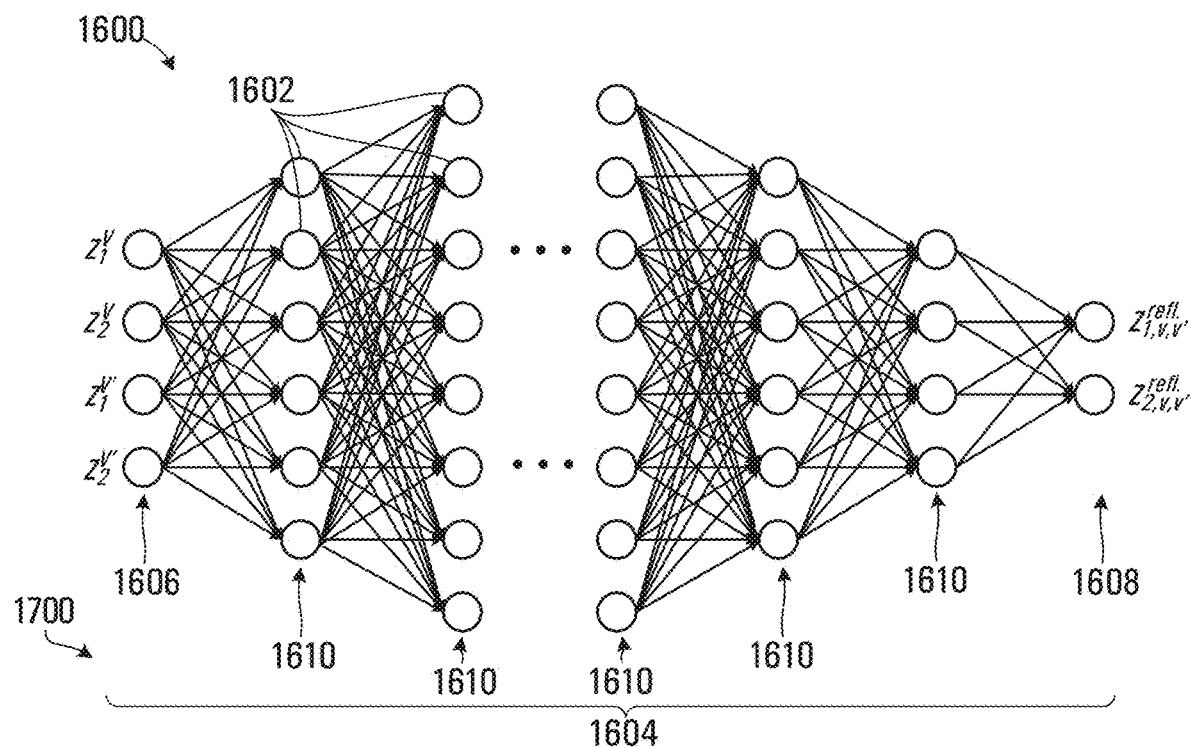
FIG. 16 is a schematic representation of a neural network configuration for implementing a beam prediction generator shown in FIG. 15.

Referring to FIG. 16, a neural network implemented on the beam prediction generator module 1510 is shown generally at 1600. The neural network includes sets of fully connected nodes 1602 in multiple layers 1604 including an input layer 1606, an output layer 1608, and multiple hidden layers 1610. The input layer 1606 includes nodes that receive the transmitter location $z_v$ and the receiver location $z_{v'}$. The output layer 1608 includes output nodes that provide a reflector location $z_{v,v'}^{refl.} = (z_{1,v,v'}^{refl.}, z_{2,v,v'}^{refl.})$. Each arrow connecting between the nodes may have an associated weighting factor $w_i$, which is determined in a training exercise 1512 performed for a set of labeled training data, as described below.

A set of labelled training data $z_{v,v'}^{refl}$ are generated for locations $z_v$, $z_{v'}$ using the reflector map $\mathcal{L}(z, t)$ of equation 20 by:

i. Multiplying every posterior $\mathcal{P}(z|\hat{\tau}_{n_{mp}}^{v,v'}, (z_v, z_{v'}, 1/1/p_{n_{mp}}^{v,v'}))$ for uplink and downlink communications that contributed to the generation of the reflector map $\mathcal{L}(z, t)$ as described above; and ii. Determining a most probable reflector location for the reflectors associated with the uplink and downlink for the uplink and downlink communications.

The above steps i and ii may be merged in the following expression:

$$\left[z_{v,v',n_{mp}}^{refl.}, \mathcal{R}_{v,v',n_{mp}}\right] = \max_z \mathcal{L}(z, t) \cdot \mathcal{P}\left(z \mid \hat{\tau}_{n_{mp}}, z_v, z_{v'}, \frac{1}{p_{n_{mp}}^{v,v'}}\right), \quad 21$$

$$n_{mp} \in \{1 \ldots N'_{mp}\}$$

where $\mathcal{R}_{v,v',n_{mp}}$ is the maximum value of the objective function which is achieved at $z_{v,v',n_{mp}}^{refl.}$. Among available reflectors for the link (v,v'), a reflector having the largest magnitude is selected and its location is output as follows:

$$z_{v,v'}^{refl.} = \underset{n_{mp}}{\text{argmax2}}\left[z_{v,v',n_{mp}}^{refl.}, \mathcal{R}_{v,v',n_{mp}}\right],$$

Where the operator $$\underset{n_{mp}}{\text{argmax2}}\left[z_{v,v',n_{mp}}^{refl.}, \mathcal{R}_{v,v',n_{mp}}\right]$$

finds duplet $[z_{v,v',n_{mp}}^{refl.}, \mathcal{R}_{v,v',n_{mp}}]$ whose $2^{nd}$ argument $\mathcal{R}_{v,v',n_{mp}}$ is the largest and returns the corresponding first argument $z_{v,v',n_{mp}}^{refl.}$. In equations 21 and 22, only uplink and downlink communications between a base station and UE are considered (i.e. $v' \in \mathcal{N}_{BS}^v$) for the reason that beamforming is typically more practical at base stations than at UEs. A base station has an antenna array that has a fixed physical orientation, whereas a mobile UE may have a constantly changing physical orientation of its antenna. Additionally, whereas a UE's antenna dimensions are constrained by the size of the UE, the base station antenna can be made larger, thereby facilitating generation of narrower transmission beams that can be more precisely directed toward a selected reflector.

The reflector location labels $Z_{v,v'}^{refl.} \in \mathbb{R}^2$ are then paired with the locations $z_v$, $z_{v'} \in \mathbb{R}^2$ of the link (v,v') to generate a training set $\mathcal{T} = \{((z_v, z_{v'}), z_{v,v'}^{refl.})\}_{v,v'}$. In this embodiment only the most significant reflector location $z_{v,v',n_{mp}}^{refl.}$ is selected by equation 22. In other embodiments, this restriction could be lifted and the first few significant reflector locations, denoted by $\{z_{v,v'}^{refl.}\}$, could be output for the training data set $\mathcal{T}$. The training set $\mathcal{T}$ is used in a training exercise to determine the weights $w_i$ for the neural network 1600 to generate a mapping from the transmitter to receiver locations via an effective reflector. The use of the trained neural network 1600 produces a mapping that can generalize to unseen reflector examples and also may alleviate the consequences of training using noisy labels. Because the neural network 1600 has a low dimensional input layer 1604 and output layer 1606, the width and depth of the neural network is relatively modest but should have sufficient layer depth to generalize well. In this embodiment, the neural network 1600 is shown as fully connected with hidden layers 1610 sized to gradually increase and then decrease. In other embodiments, the neural network 1600 may be differently configured. The neural network configuration and the trained weights w, may be subsequently passed to the base stations, where the trained network is used as a model for making proactive beam steering decisions.

The above features and/or others disclosed herein may be provided, in any of various combinations, set out in the examples below.

According to an example 1, a method for estimating locations of signal reflectors in a wireless communication network involves: at network equipment, receiving from User Equipments (UEs) in communication with the network, sidelink transmission information including: range estimates indicative of a range associated with a reference signal received from a neighboring UE via the sidelink transmission over an indirect propagation path; a received power associated with each received reference signal; and an identification of the neighboring UE; estimating locations of signal reflectors based on location information for UEs associated with the sidelink transmissions, the received range estimates, and the received power; and configuring communications between the network equipment and at least one UE based on an estimated location of at least one signal reflector.

According to an example 2, the method of example 1 may further involve receiving from a UE: range estimates for reference signals received at the UE over an indirect propagation path from the base station; a received power for each received reference signal; and estimating locations of signal reflectors further involves estimating locations of signal reflectors based on location information of the UE, a location of the base station, the received range estimates, and the received powers.

According to an example 3, the method of example 1 may further involve receiving reference signals transmitted by a UE at the base station and generating: range estimates for reference signals received at the base station over indirect propagation paths from the UE; a received power for each reference signal received over indirect propagation paths; and estimating locations of signal reflectors further involves estimating locations of signal reflectors based on the location of the base station, a location information of the UE, the received range estimates, and the received powers.

According to an example 4, in any of the above examples, causing the base station to configure transmissions may involve at least one of: directing a transmission beam toward a signal reflector to cause the beam to be redirected by the signal reflector to a UE experiencing weak reception of transmitted signals; in response to a determination that one or more UEs are located in an area subject to interference from a transmission beam directed toward a receiving UE, directing the beam toward a signal reflector to cause the beam to be redirected by the signal reflector to the receiving UE; and in response to a determination that a transmission to a UE via a strong line-of-sight (LoS) transmission beam is causing a reduction in the number of data streams that can be spatially multiplexed over the transmission beam, directing at least one additional transmission beam toward a signal reflector to cause the at least one additional transmission beam to be redirected by the signal reflector to the receiving UE, and further multiplexing the transmission over the direct beam and the at least one additional transmission beam.

According to an example 5, in any of the above examples, the method may further involve generating location information for at least some of the identified UEs by one or more of: generating range estimates for uplink or downlink transmissions between the network equipment and at least some of the UEs; receiving range estimates for line-of-sight (LoS) sidelink transmissions between UEs; receiving Global Positioning System (GPS) information identifying locations of at least some of the UEs; and using known location information associated with the base station or UEs.

According to an example 6, in any of the above examples, determining locations of signal reflectors may involve: generating a connectivity graph having nodes corresponding to network equipment in the network and nodes corresponding to UEs for which location information is available; for each indirect reference signal transmission in the connectivity graph, establishing a locus representing a probable location of the reflector; and combining the loci for the indirect reference signal transmissions in the connectivity graph to generate a reflector map representing locations of reflecting obstructions in the wireless communication network.

According to an example 7, the method of example 6 may further involve updating the reflector map in response to receiving sidelink transmission information, more recently received sidelink transmission information being assigned a greater weight than previously received sidelink transmission information.

According to an example 8, in the method of example 6, combining the loci may involve using a kernel density estimation to generate a probability density function of reflector locations.

According to an example 11, the method of example 6 may further involve initiating an update to the reflector map in response to receiving a notification from the network equipment of a transmission failure between the network equipment and UEs.

According to an example 12, in any of the above examples, at least one of the UEs may have a location that changes with time and estimating locations of signal reflectors involves estimating locations of signal reflectors based on successively received sidelink transmission information for the UEs associated with the sidelink transmissions.

According to an example 13, the method of example 6 may further involve: selecting most significant reflector locations from the reflector map for transmissions between the base station and UE nodes in the connectivity graph; using the locations of the base station and UE as inputs to a neural network and training the neural network to output the most significant reflector locations; and using the trained neural network to generate a beam direction for an indirect transmission between the base station and one of the UEs in the network.

According to an example 14, network equipment for a wireless communication network includes: a base station including a transmitter and a receiver; a processor in communication with the base station; and a processor-readable memory in communication with the processor and storing processor-executable instructions which, when executed by the processor, cause the processor to perform a method involving: receiving at the receiver of the base station from User Equipments (UEs) in communication with the network, sidelink transmission information including: range estimates indicative of a range associated with a reference signal received from a neighboring UE via the sidelink transmission over an indirect propagation path; a received power associated with each received reference signal; and an identification of the neighboring UE.

The example further involves causing the processor to estimate locations of signal reflectors based on location information for UEs associated with the sidelink transmissions, the received range estimates, and the received powers; and configuring communications between the base station and at least one UE based on an estimated location of at least one signal reflector.

Figure 17:
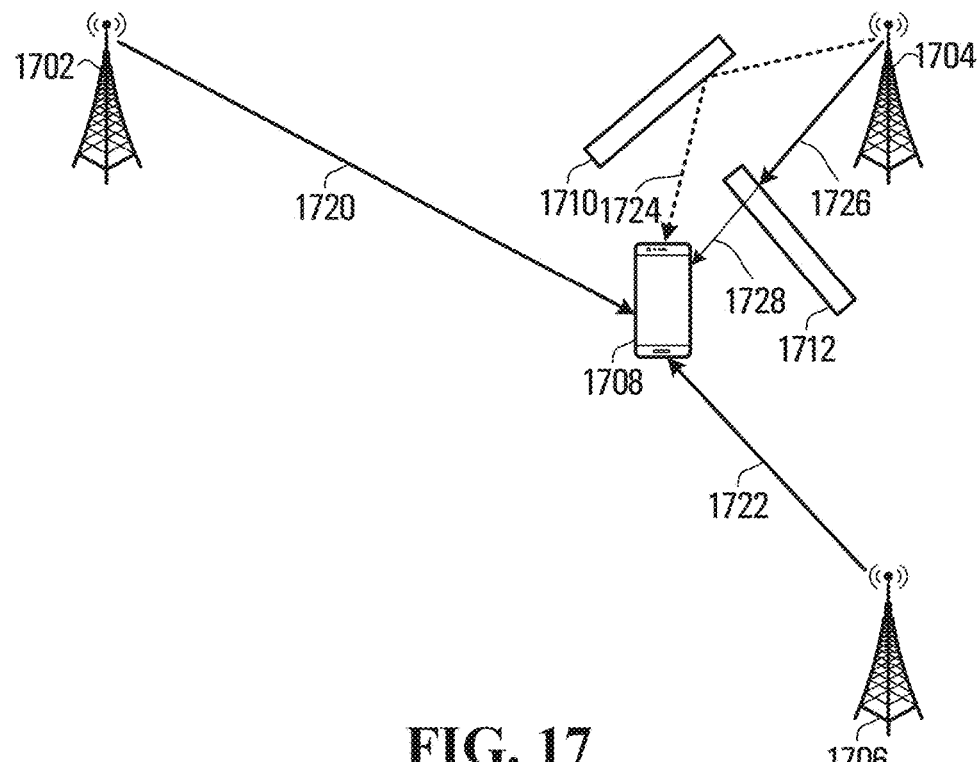
FIG. 17 is a block diagram illustrating a wireless communication network and an NLoS scenario.

The LoS/NLoS prediction module 502 and localization system 504 shown in FIG. 5 and FIG. 11 is described further with reference to FIGS. 17 to 27 below. FIG. 17 is a block diagram illustrating a wireless communication network and an NLoS scenario that can be problematic for UE positioning determination. In the example shown, the wireless communication network 1700 includes BSs 1702, 1704, 1706 and a UE 1708, and the operating environment of the UE includes two obstacles 1710, 1712. LoS paths are shown at 1720, 1722, and an NLoS path is shown at 1724. A further LoS path 1726 between the UE 1708 and the base station (BS) 1704 is blocked by the obstacle 1712, and therefore a "weak" LoS path is shown at 1728. In this scenario, a ray propagating along NLoS path 1724 may be stronger than the ray propagating along the weak LoS path 1728 and therefore it is not possible to distinguish these LoS and NLoS rays from each other at the UE 1708 based only on received signal power.

Although geometric-based approaches to UE positioning determination may be simple and cost-effective, such approaches tend to work well in a LoS scenario and when certain assumptions on signal, noise, channel, and array models are satisfied. However, NLoS scenarios are more common and realistic in wireless communication networks.

As noted above, efforts on addressing the issue of NLoS include LoS identification and LoS mitigation. There may be a limited number of BSs that can communicate with a UE at any time, and therefore LoS identification might leave too few BSs as positioning anchors to localize UE position. For example, in order to localize a UE in three dimensional (3D) space using triangulation, at least four BSs are needed. This can be a problem especially in cellular systems for urban areas where the probability of NLoS is normally higher than the probability for LoS. Although NLoS error subtraction according to LoS mitigation may make all links usable for positioning determination, LoS mitigation is a much harder problem to tackle than LoS identification.

Given the complexity of the LoS mitigation problem, LoS identification may still be an attractive option for positioning determination. Although techniques based on using only LoS links for positioning determination are often referred to as LoS identification techniques, it should be noted that LoS identification according to embodiments disclosed herein may involve identifying LoS links, identifying NLoS links, and/or otherwise distinguishing LoS links and NLoS links from each other. Regardless of the type(s) of links that are actually identified, determining which links are NLoS links and removing them from positioning determination is an important step in improving the accuracy of positioning or localization systems based on LoS identification. For example, if no prior positioning or localization statistics about NLoS links are known, then an optimum positioning algorithm is one that determines which links are NLoS links and eliminates them from the positioning determination process. This is because the Cramer-Rao Lower Bound (CRLB) does not depend on NLoS links. In essence, LoS identification is a much simpler problem than LoS mitigation, but reliable LoS identification remains a challenge.

On the cusp of transformation to 5G, sidelink (SL) communication is becoming a fundamental driver of change, in particular with rising interest in such applications as UE cooperation and vehicle-to-everything (V2X) communications, for example. SL communication refers to the ability of close-by UEs to communicate or cooperate with each other directly, rather than through network communications. An SL is therefore an example of a direct wireless communication link between UEs. Such exploitation of spatial diversity beyond what is possible through Multiple Input Multiple Output (MIMO), for example, is expected to have enormous potential and enhance communication network capacity.

SL communication is also potentially beneficial for positioning, and may be useful in addressing some of the long-standing challenges facing the field of positioning, such as accurate and reliable NLoS elimination, anchor insufficiency, etc. For example, shadowing is the main phenomenon that causes NLoS, but decorrelates within the order of meters. With reference to FIG. 17, for example, another UE that is located just a few meters from the UE 1708, such as toward the BS 1702 or the BS 1706, could be unaffected by shadowing from the obstacle 1712 and be in LoS communications with each of the BSs 1702, 1704, 1706.

As such, shadowing can potentially be detected if UEs can be become "positioning proxies" for each other. Perhaps even more important is the fact that the probability of LoS in SL communications is expected to be higher than in uplink (UL) or downlink (DL) communications, because UE cooperation through SL communications is expected to be allowed only within limited geographical areas to conserve UE power and keep SL interference patterns in a communication network under control.

Some embodiments disclosed herein relate to building or training a model that predicts the presence of NLoS links using Machine Learning (ML), and illustratively Neural Networks (NNs). UL, DL, and SL communications and measurements are used in some embodiments in collecting data for building or training such a model. The present disclosure encompasses embodiments in which existing communication network infrastructure, rather than an expensive and non-autonomous expert system, is exploited to generate training datasets at a much larger scale and possibly in an uninterrupted manner instead of relying on availability of potentially less noisy but much smaller datasets obtainable from expert systems.

Distinguishing between LoS links and NLoS links has conventionally been done through a hypothesis testing framework. This involves forming a likelihood ratio $\Lambda(x)$ of a statistic x of the received signal and deciding in favor of one of the two hypothesis $\mathcal{H}_0$ (LoS) and $\mathcal{H}_1$ (NLoS):

$$\mathcal{H}_0: x \sim \mathcal{P}_x^{LoS}(x), \mathcal{H}_1: x \sim \mathcal{P}_x^{NLoS}(x) \qquad 23$$

$$\Lambda(x) = \frac{\mathcal{P}_x^{LoS}(x)}{\mathcal{P}_x^{NLoS}} \underset{\mathcal{H}_1}{\overset{\mathcal{H}_0}{\gtrless}} \gamma$$

where $\mathcal{P}_x^{LoS}$ and $\mathcal{P}_x^{NLoS}$ are the Probability Distribution Functions (PDFs) or likelihoods of LoS and NLoS, respectively. If distributions of x under LoS and NLoS are sufficiently distinct, then the above Likelihood Ratio Test (LRT) can help make a LoS/NLoS decision. Establishing this ratio requires knowledge of the PDFs and threshold $\gamma$, which depends on extensive prior knowledge that is typically collected through offline surveying. Ideally, $\gamma = \mathcal{P}(\mathcal{H}_1)/\mathcal{P}(\mathcal{H}_0)$, where $\mathcal{P}(\mathcal{H}_r)$ is the ground-truth probability that $\mathcal{H}_r$ happens. However, this is not known exactly, and therefore experimentation is used to find a best estimate. In an environment where LoS/NLoS happen with the same frequency, $\gamma = 1$.

In order to obtain labelled data for ML training, expert systems in an ultra-wideband (UWB) radio system or a high-resolution imaging system are to be used. However, one issue with such approaches for labelled data collection, which is also referred to as fingerprinting, is that these types of systems are expensive to operate. Generated labelled data are also not completely error-free. In addition, there is a potential scalability issue, especially in the context of using an expert system in wireless networks where the environment undergoes frequent changes that necessitate intermittent collection of training data from the new environment in order to pursue retraining. Just one labelled data set for an area of 100 m by 100 m with 1 m by 1 m resolution, for example, requires collection of 10,000 distinct fingerprints. Clearly this presents a scalability challenge for higher resolutions, larger areas, and/or retraining in expert system-based implementations.

When environment changes are ignored and an ML or Artificial Intelligence (AI) model is trained on a stale data set and utilized to predict NLoS bias at a location whose channel conditions have changed, significant prediction error can be introduced. This issue is known as concept/feature drift, and the resultant prediction error can manifest itself in the form of false alarms or misdetection, for example.

One possible approach to help mitigate or remedy drift and associated prediction error would be to morph or integrate an exploration subsystem, which is involved in label collection and training, into an exploitation subsystem, which utilizes a trained model. For example, one such approach may rely on "crowdsourcing" abilities of communication networks to collect a large amount of data during normal communications. This in effect leverages the distributed and mobile nature of UEs in order to collect large datasets for training. Existing infrastructure, rather than expensive and non-autonomous expert systems, can then be used to generate data for training but at a much larger scale and in an uninterrupted manner instead of relying on availability of smaller amounts of labelled data from expert systems.

Overall, existing ML solutions for LoS identification suffer from several shortcomings, including reliance on the availability of an expert system, high associated cost, being labor-intensive, and not being robust to feature and concept drift as the wireless communication environment is constantly changing.

The present disclosure relates in part to a model for predicting the presence of LoS/NLoS links based on range estimates that were collected or otherwise determined from UL, DL, and SL communications, in a cost-effective and adaptive manner. Other information, such as angle estimations based on UL communications, may also be used in building or training such a model.

In some embodiments, training data for developing a model includes a collection of tuples $\{(x, w)_l\}_l$, where x is a feature of lth link that is spatially unique but can be replicated temporally, and w indicates whether the lth link is NLoS, LoS, or unknown. For example, in one embodiment, $w \in \{-1,0,1\}$ indicates whether the link is NLoS (w=1), LoS (w=−1), or its status is unknown or indecisive (w=0).

Current approaches for collecting labels or training data are exhaustive processes as discussed above. An expert system is needed to survey the environment by collecting data x from each BS, and to then determine whether the link that is observed to that BS is or is not an NLoS link so that labels w can be generated and (x, w) can be formed before moving to a new location to repeat this process. Obtaining labels that are free from error is a laborious and costly task. When a link is obstructed, inspection based on received signal power is not in itself a reliable indication for the presence or absence of LoS. Instead, a specialized system such as a UWB system with high resolvability that has a multi-GHz sampling rate is needed to be able to detect whether there is a direct-path component of a signal that has a stronger indirect-path component. Even an expert system that is often used for training data collection introduces some error into the labeling process, due to such conditions as lack of synchronization, blockage, etc. Completely pure labels cannot be achieved in practice through streamlined processes.

In accordance with teachings in the present disclosure, labels for building or training a model are generated using the same devices that communicate in network, such as UEs and BSs. Although this may introduce some error into the labeling process, a dataset may be continuously updated without requiring an offline exploration or surveying stage, to collect data for training or otherwise building a model, that is separate from a prediction or exploitation stage to use the model for prediction.

In a communication network that supports UL, DL, and SL communications, Reference Signals (RSs) that are normally used for establishing and/or maintaining communication links can also be used to estimate ranges between network elements. See FIG. 18, which is a block diagram illustrating another example wireless communication network.

The example wireless communication network 1800 includes BSs 1802, 1804, each shown by way of example as a gNodeB (gNB), and UEs 1810, 1812, 1814, 1816, 1818, 1820. The operating environment of the UEs includes obstacles in the form of reflectors 1830, 1832, 1834 and shadowing obstacles 1840, 1842, 1844. Unobstructed LoS links are shown as solid lines, and different dashed line types are used in FIG. 18 to illustrate NLoS links and LoS links that are affected by shadowing. The path between the gNBs 1802, 1804 is shown as a solid line, but may be considered a special type of LoS link in the context of range estimation because BS locations are expected to be known and fixed in many embodiments, and inter-BS range is either known or can be readily determined. This type of LoS link is also referred to herein as a virtual LoS link.

Figure 18:
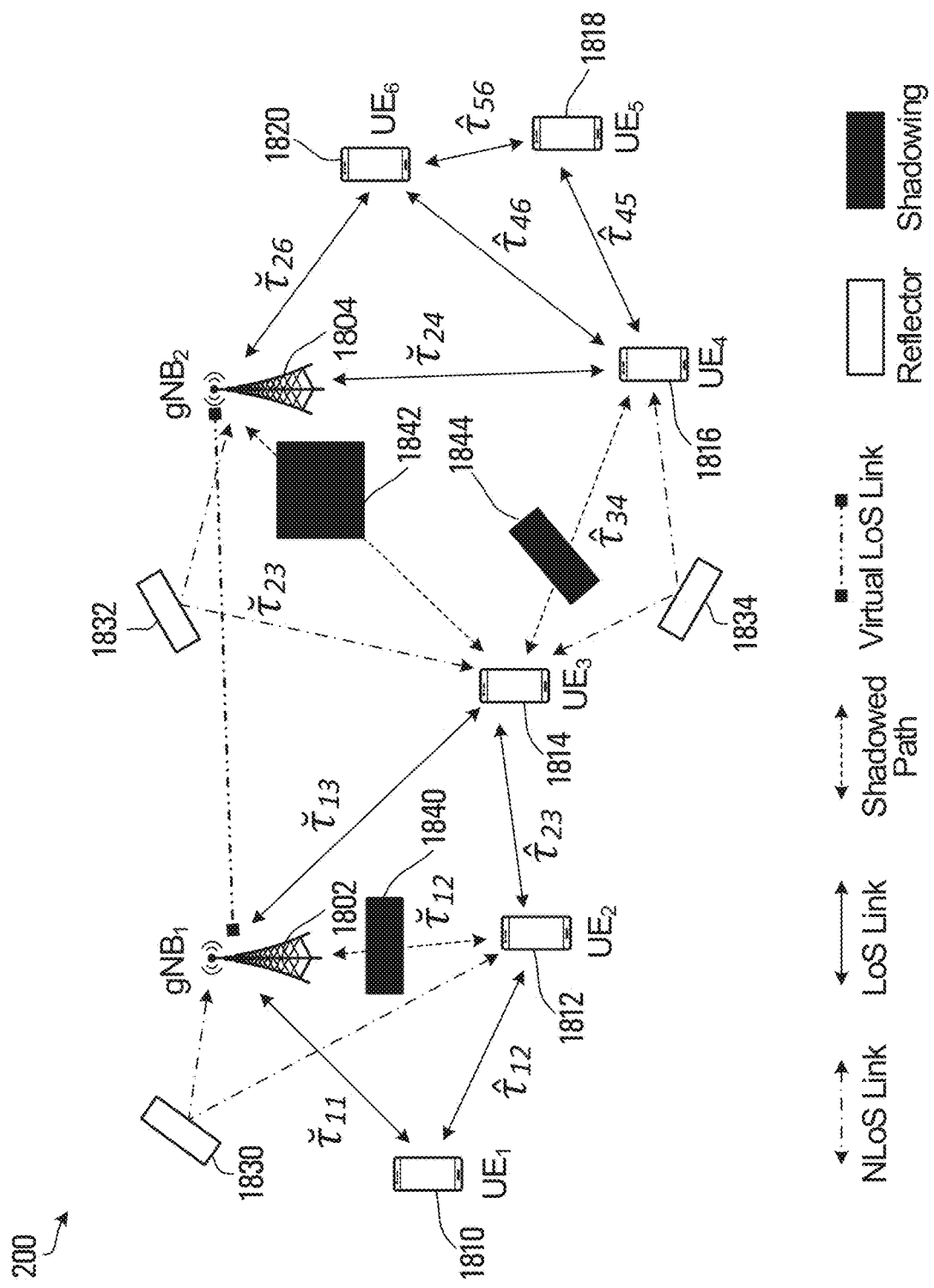
FIG. 18 is a block diagram illustrating another example wireless communication network.

Communications may take place over any or all of the links shown in FIG. 18, and those communications are exploited in some embodiments to establish a connectivity graph. A connectivity graph includes edges that represent links between communication network nodes such as UEs and BSs, and also includes respective range estimates that are obtained for those links or edges. For example, the UL/DL range estimates $\check{\tau}$ and the SL ranges estimates shown in FIG. 18 may be transmitted to network equipment, such as one of the gNBs or a separate positioning server, for further processing. A full-connectivity graph is also referred to herein as G=(V,E).

With $\mathcal{N}$ denoting the set of all nodes (UEs and BSs) in the network, and $\mathcal{N}^v \subset \mathcal{N}$ denoting the set of nodes that (i) are connected to a UE v and (ii) were subject to range measurements with v, the connectivity graph G is defined by vertex set V and edge set E as given by $$V = \mathcal{N} \quad E = \{(v,v'): v,v' \in V \wedge (v \in \mathcal{N}^{v'} \vee v' \in \mathcal{N}^v)\} \qquad 24$$

In order to establish G at network equipment, each UE relays signaling that is indicative of the following set to that network equipment in some embodiments $$T_v^{SL} = \{(x_{v,v'}, \hat{\tau}_{v,v'}, id_{v'}): v' \in \mathcal{N}_{UE}^v\}, v \in V \qquad 25$$

where $\mathcal{N}_{UE}^v \subset \mathcal{N}^v$ is the set of UEs that (i) are connected with UE v and (ii) were subject to range estimates to UE v, $\hat{\tau}_{v,v'}$ is the SL range estimate between UEs v and v', and $x_{v,v'}$ is a processed version of SL channel data, also referred to herein as a channel tensor, that is obtained by transforming raw channel data $h_{v,v'}$ into a form that is free from or at least has reduced spurious fluctuations that inhibit learning, such as random synchronization errors and Small Scale Phase (SSP) for example. A cross-covariance tensor is one example of $x_{v,v'}$.

Similarly, with $\mathcal{N}_{BS}^v \in \mathcal{N}^v$ denoting the set of BSs that (i) are connected with UE v and (ii) were subject to DL range measurements with UE v, in some embodiments signaling that is indicative of the following is also relayed by the UE to network equipment that is to establish the connectivity graph $$T_v^{DL} = \{(x_{v,v'}, \check{\tau}_{v,v'}): v' \in \mathcal{N}_{BS}^v\}, v \in V \qquad 26$$

where $\check{\tau}_{v,v'}$ is the DL range estimate between BS v' and UE v and $x_{v,v'}$ is a channel tensor as described above.

A full connectivity graph may also take into account $T_v^{UL}$, the information set inferred by each BS as a result of UL ranging. Each BS, like each UE, may transmit signaling that is indicative of this set to a network component that generates the connectivity graph, if the connectivity graph is not generated by the BS itself.

Given sets $T_v^{SL}$, $T_v^{DL}$, $T_v^{UL}$, $\forall v \in V$, a full-connectivity graph can be established and NLoS/LoS labels for the tensors $x_{v,v'}$ can be generated as disclosed by way of example in further detail elsewhere herein. These labels and tensors are subsequently used in training, which is also disclosed herein by way of example.

When there is no range estimate on a particular SL/UL/DL or the range estimate for a link is stale, in some embodiments the corresponding edge in the connectivity graph is removed or updated with a new range estimate. Range estimate expiration relates to environment changes, due to UE mobility for example, as a result of which distances between UEs and other elements in a communication network vary in time. Without any blockage or shadowing in a communication network, all links are LoS links. In this case, any closed connectivity path, such as a "triangle" or more generally a loop, "cycle", or "circle" r, denoted by $\text{Cir}_r=(V_r, E_r)$, in the full-connectivity graph has the property that $$\tau_{v,v'} < \sum_{(a,b) \in E_r \setminus (v,v')} \tau_{a,b}, \forall (v, v') \in E_r \quad (27)$$

where $\tau$ is the general notation for true range in UL/DL/SL and $V_r$, $E_r$ are the vertices and edges of rth sub-graph circle $\text{Cir}_r$ on the full-connectivity graph. In the present disclosure, closed connectivity paths are referred to generally as "circles" simply for ease of reference. It should be appreciated, however, that a closed connectivity path or loop is not necessarily circular in shape, and may instead be triangular or more generally polygonal.

Figure 19:
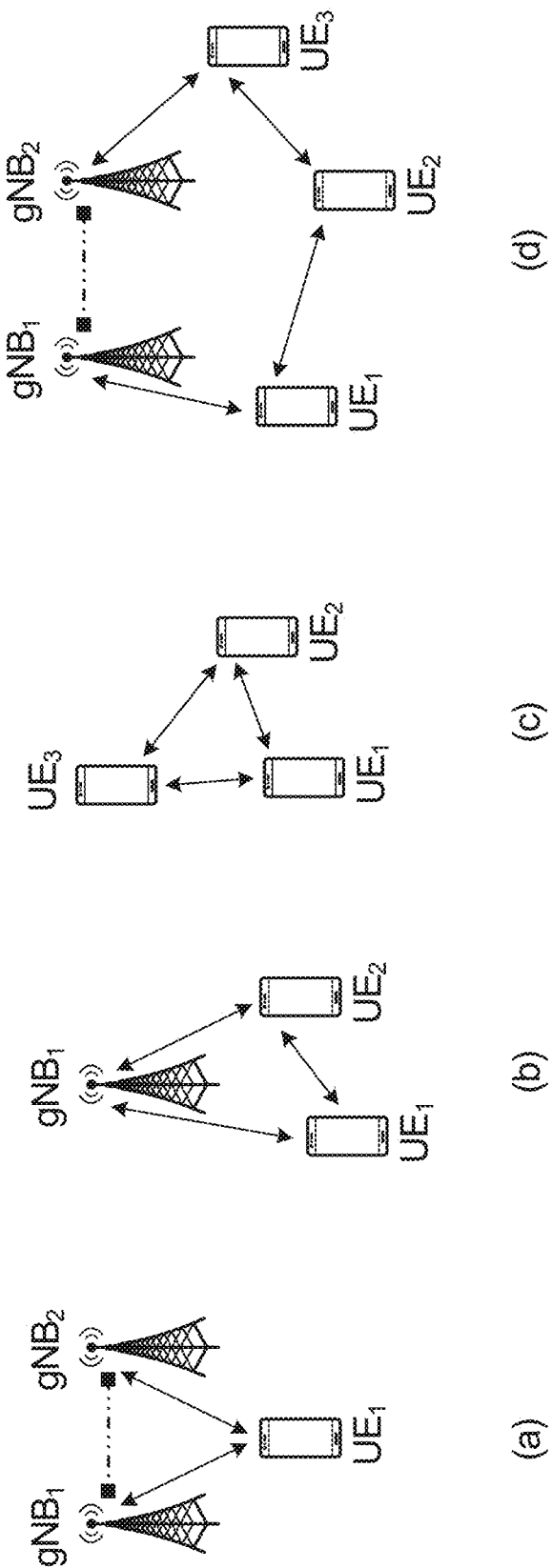
FIG. 19 includes block diagrams illustrating examples of connectivity circles.

FIG. 19 includes block diagrams illustrating examples of connectivity circles. The examples (b) and (d) in FIG. 19 are applicable to the UE positions as shown in FIG. 18, and the examples (a) and (c) relate to different UE positions than those shown in FIG. 18. Other connectivity circles are present in example shown in FIG. 18, and it should also be noted that others may dynamically appear and disappear as UEs move.

In general terms, equation 27 specifies that the range for any edge in a closed connectivity path should be smaller than the sum of ranges for the other edges in that same closed connectivity path. In the simple case that $|E_r|_0=3$, equation 27 is the triangle inequality. In reality, some links may be NLoS links as shown in FIG. 18, which causes $\tau \neq \hat{\tau}$ and $\tau \neq \tilde{\tau}$ because $\hat{\tau}_{v,v'}=\tau_{v,v'}+\ell_{v,v'}$, and $\ell_{v,v'}>0$. Therefore, equation 27 might not be satisfied for circles that include one or more range estimates $\hat{\tau}$ and/or $\tilde{\tau}$. When equation 27 is not satisfied for any range estimate $\hat{\tau}_{v,v'}$ associated with a closed connectivity path, it can confidently be asserted that $\hat{\tau}_{v,v'}$ is a range estimate obtained on an NLoS link. If equation 27 is satisfied, however, then no definitive conclusion can be made regarding LoS/NLoS status of the link for which inequality $\hat{\tau}_{v,v'}$ was obtained. A violation of equation 27 for a connectivity circle having three or more edges is definitive of an NLoS link, but a link for which equation 27 is satisfied could be a LoS link or an NLoS link.

To potentially improve the chance of detecting NLoS, an exhaustive search through a full-connectivity graph G may be performed, to find a minimum distance circle between every two nodes v,v'

$$(r^*_{v,v'}, d^*_{v,v'}) = \min_r \left( s = \sum_{(a,b) \in E_r \setminus (v,v')} \tau_{a,b} : r \in \mathcal{N}_{circ} \right) \quad 28$$

where $\mathcal{N}_{circ}$ is the set of circles in the graph and $r^*_{v,v'}$ is an index of a circle that achieves the minimum sum delay $d^*_e$ based on ranges or range estimates associated with the edges that form a circle including v,v'. Equation 28 in effect represents searching through the connectivity graph to find all the circles that connect every two nodes, obtaining the sum of delays on each circle, and finding the minimum sum of delays over all those circles. The following criterion can then be evaluated $$\hat{\tau}_{v,v'} \underset{\mathcal{H}_{0,1}}{\overset{\mathcal{H}_1}{\gtreqless}} d^*_{v,v'}. \quad 29$$

This criterion is based on an expectation that any link having a range estimate that is greater than the entire delay of the minimum distance circle is likely an NLoS path. An equality condition, in which $\hat{\tau}_{v,v'}=d^*_{v,v'}$ may be treated in the same manner as a range estimate that is above the threshold or in the same manner as a range estimate that is below the threshold. For example, the equality condition may be treated in the same manner as a range estimate that is above the threshold to potentially increase the number of training samples for which a definitive label can be generated. In other embodiments, because the equality condition is less definitive of an NLoS condition than an inequality $\hat{\tau}_{v,v'}>d^*_{v,v'}$ in equation 29, it may be preferable to treat the equality condition in the same manner as a range estimate that is below the threshold to decrease the probability of misdetection of NLoS.

Equations 28 and 29 are checked $\forall(v,v') \in E$. Note that equation 28 excludes inter-BS edges due to the way E was defined above. Inter-BS links need not necessarily be excluded in all embodiments. For example, a communication network could potentially include one or more movable BSs such as drone BSs, and the techniques disclosed herein could be applied to inter-BS links that include at least one movable BS.

If all UEs in a communication network can communicate with each other and with all BSs, then there are $N_{circ}$ circles in the set $\mathcal{N}_{circ}$ which is given by $$N_{circ} \leq \sum \left( \binom{N_{BS}+N_{UE}}{k} - \binom{N_{BS}}{k} \right) \quad 30$$

where $N_{BS}$ and $N_{UE}$ denote, respectively, the number of BSs in set $\mathcal{N}_{BS}$ and the number of UEs in set $\mathcal{N}_{UE}$, and $$\binom{a}{b}$$

denotes an "a choose b" operation. The term k is constrained to being greater than three in determining $N_{circ}$ because a circle or closed path between any two network elements or nodes v,v' includes those two network elements or nodes and at least one more network element or node.

The set $\mathcal{N}_{circ}$ contains numerous possibilities, examples of which are illustrated in FIG. 19. Although the examples (a) and (d) in FIG. 19 include inter-BS links, inter-BS ranging is not necessary in communication networks in which all BSs are fixed. For fixed BSs, the ground-truth location of each BS is available and can be used to determine inter-BS ranges. It should be noted, however, that some embodiments may involve one or more movable BSs, which may be treated in the same way as UEs for the purposes of ranging and positioning determination.

In practice, the connectivity graph is much sparser because: (i) only close-by UEs may communicate with each other, (ii) even close-by UEs might not need to establish a SL, and (iii) range estimates on SLs might not be available or may become unreliable or stale.

If $\mathcal{H}_1$ is satisfied in (1-7) for an edge (v,v'), then in some embodiments $w_{v,v'}$ is set to 1; otherwise, if $\mathcal{H}_{0,1}$ is satisfied, then in some embodiments $w_{v,v'}$ is set to 0 to provide an unknown or "indecisive" clue that $\mathcal{H}_{0,1}$ does not imply LoS or NLoS. It should be noted that these values, and others herein, are solely for the purpose of illustration. Other values may be used in other embodiments to indicate LoS, NLoS, or an indecisive result or unknown LoS/NLoS state.

In some embodiments, training for LoS identification with these choices of labels is done through an NN with a three-state output, whereby labels for the third state are obtained through another type of discrepancy check described elsewhere herein. Alternatively, a regression problem may be formed through different choices of labels. In the case of regression problem formulation, considering a link for which equation 27 or (1-7) is not violated, a probability of NLoS is assigned to that link in some embodiments using information from received signal power p, or correlation magnitude if a correlator is used to detect range $$w_{v,v'} = \frac{p_{v,v'}^{-1}}{\sum_{(a,b)\in E_{v,v'}^*} p_{a,b}^{-1}} \quad 31$$

The logic behind equation 31 is quite intuitive. The larger the power of the eth link, the lower its probability of NLoS, and hence the smaller the value $w_{v,v'}$. Nonetheless, it should be kept in mind that the validity of equation 31 hinges on an assumption that all transmit powers and Automatic Gain Control (AGC) gains are equalized on all the vertices of a connectivity graph. It should also be noted that equation 31 applies to embodiments in which higher values of $w_{v,v'}$ indicate higher probability of NLoS, which need not necessarily be the case in all embodiments. An analogous approach may be developed based on equation 31 for lower values of $w_{v,v'}$ indicating higher probability of NLoS, for example.

In constructing or compiling a training set, a training sample $(x_{v,v'}(t), w_{v,v'}(t))$ is formed for $\forall (v,v') \in E$ at time t, to be added to the training set $\mathcal{T} = \mathcal{T} \cup (t)\{(x_{v,v'}(t), w_{v,v'}(t))\}$. Note that construction of a training set in some embodiments is an ongoing process that is carried out through a crowd-sourcing process that is transparent to UEs. This means that all UEs contribute to evolving the training data without their communications being disrupted. Therefore, no separate, offline surveying step using an expert system (UWB radio, ultrasonic, RADAR, LIDAR, etc.) is needed, in contrast to previous fingerprinting methods.

These label generation techniques exploit spatial diversity. Angular diversity may also or instead be used in other embodiments.

A spatial diversity approach may accurately generate labels for some but not necessarily all links in a communication network. For example, there may be situations in which NLoS exists on one or more edges of the minimum distance path or circle between two nodes or vertices but the condition for the NLoS hypothesis $\mathcal{H}_1$ in (1-7) is not satisfied. Although the number of unlabeled links could potentially be reduced by applying equation 27 to each minimum distance circle in a connectivity graph, this would not address the fact that the spatial diversity approaches above do not generate any clues about LoS links, for hypothesis $\mathcal{H}_0$. A NN trained with such labels, without LoS labels, would be expected to result in a predictor with higher misdetection rate ($P_{MD}$) but lower false alarm rate ($P_{FA}$), defined as $$P_{MD} = \mathcal{P}(\mathcal{H}_0 | \text{Link is NLoS})$$

$$P_{FA} = \mathcal{P}(\mathcal{H}_1 | \text{Link is LoS}) \quad 32$$

These two quantities are directly related two important measures of performance in machine learning, known as recall and precision. A better balance between $P_{MD}$ and $P_{FA}$ is often desired, but achieving a better balance involves generating LoS clues and labels as well. According to another aspect of the present disclosure, AoA is estimated at BSs and the law of cosines is used to generate LoS clues and labels.

One reason to concentrate on angular diversity and AoA measurement or estimation at BSs only, and using UL communications, is to abide by the following important practical constraint: AoA is measured or estimated relative to broadside of a receiver's antenna or antenna array, which is the reference of the antenna's or array's Local Coordinate System (LCS). Although a local angle can be converted to a Global Coordinate System (GCS) if the direction of true North is known, for mobile UEs where orientation is constantly changing, tracking the time-varying offset between antenna or array broadside and true North is possible but can be highly erroneous and processing-intensive. For example, tracking such offset is theoretically possible through readings obtained from 3D gyroscopes inside Inertial Measurement Units (IMUs) at UEs to identify angular shift, along with magnetometer readings to identify the direction of true North, but the level of error in such readings from off-the-shelf IMUs embedded within UEs may be too high to track UE antenna offset with sufficient accuracy for angular diversity techniques as disclosed herein. Aside from this practical aspect, accurate AoA measurement in a multipath environment depends on availability of antenna arrays with a large aperture, and accordingly a large number of physical antenna elements, which is often not feasible at UEs. Therefore, UL AoA estimation or measurement at BSs is primarily considered herein. Angular diversity techniques may also or instead be applied at UEs in other embodiments in which this is feasible.

FIG. 20 includes block diagrams illustrating estimation of range and AoA between a BS and two UEs. The range estimates are over SL, UL, and DL, and AoA estimation is over UL, at the BS. AoA estimation in this example includes angles $\breve{\theta}_{01}$ and $\breve{\theta}_{02}$.

The $UE_2$-BS and $UE_1$-$UE_2$ links are LoS, whereas the $UE_1$-BS link is NLoS, as shown at the left in FIG. 20. The middle diagram in FIG. 20 illustrates a connectivity graph corresponding to the BS and UEs in the left diagram, labeled with range and angle information. On the right in FIG. 20, with $d_{01}$, $d_{12}$, $\theta$, two triangles ABC and ABD can be visualized.

The law of cosines defines a mathematical relationship between sides and angles of the triangle ABC in the middle diagram in FIG. 20 as follows:

$$d_{02} = d_{01}\cos(\theta) \pm \sqrt{d_{12}^2 - d_{01}^2 \sin^2(\theta)} \quad 33$$

where $\theta$ is the angle between the two sides of a triangle. In the connectivity graph shown in the middle diagram in FIG. 20, $d_{a,b} = \tau_{a,b} \cdot C^{EM}$ with $\tau_{a,b}$ denoting the range estimate a,b $\in \{0,1,2\}$ and $C^{EM}$ denoting electromagnetic wave propagation speed, and with the BS indexed as 0 in this example. Also, $\theta = \breve{\theta}_{02} + \breve{\theta}_{01}$ where $\breve{\theta}_{01}$ and $\breve{\theta}_{02}$ are the estimated UL AoAs relative to the broadside of the BS antenna array. The two possibilities in equation 33, given the knowledge of $d_{01}$, $d_{12}$, and $\theta$, are perhaps best illustrated by sides AD and AC at the right in FIG. 20. In practice, the physical distance of an SL is often in the order of several meters or less, whereas that of UL/DL can be in the range of hundreds of meters. In symbol notation, $|SL|<<\min(|UL|,|DL|)$. This implies that $|AD|\approx|AC|$. As such, $\bar{d}_{02}\leftarrow 0.5(|AD|+|AC|)$ is a reasonable approximation.

When ranges and AoAs are measured with infinite precision, $\bar{d}_{02}=d_{02}$; otherwise, $\bar{d}_{02}\neq d_{02}$. In practice, it is the latter that tends to be the case, for one or both of the following reasons: ranges and AoA can never be measured accurately due to bandwidth limitations and limited length of an antenna array; and NLoS on either of sides AB and AC in FIG. 20 causes a bias on their corresponding range estimates.

From a practical perspective, NLoS causes a much wider discrepancy gap $|\bar{d}_{02}-d_{02}|$ compared to the bandwidth or aperture limitations noted above. This discrepancy forms the basis of providing clues about the LoS state or nature of links. For example, if $|\bar{d}_{02}-d_{02}|>>0$, then it can be inferred that AB/AC are NLoS/LoS, or
AB/AC are LoS/NLoS, or
AB/AC are NLoS/NLoS but with unequal NLoS biases.

Alternatively, if $\bar{d}_{02}\approx d_{02}$, then it can be inferred that

AB/AC are LoS/LoS, or
AB/AC are NLoS/NLoS but with equal NLoS biases.

NLoS biases on two independent links are independent random variables, and therefore having equally biased NLoS links is highly improbable. This serves as the basis for the following hypothesis testing criteria $$\begin{cases} \mathcal{H}_0 & \bar{d}_{a,b} \approx d_{a,b} \\ \mathcal{H}_{0,1} & |\bar{d}_{02} - d_{02}| \gg 0 \end{cases} \qquad 34$$

Although these criteria are based on an assumption that SLs are LoS links, this is an assumption that can often be satisfied with confidence at least because SL communications are between close-by UEs. To potentially increase confidence that the LoS assumption on SL is satisfied, in some embodiments only SLs whose received power is above a confidence threshold are added to a connectivity graph.

To generate labels, in some embodiments a connectivity graph is used to locate all triangular connectivity paths that are found between UEs and BSs, but potentially excluding inter-BS triangles if BSs have fixed locations. There are two different types of triangular connectivity paths that may be found in a connectivity graph, as shown by way of example in FIGS. 21A and 21B. A first type triangular connectivity path shown in FIG. 21A is between two fixed BSs and one UE, and a second type path is shown in FIG. 21B is between one BS and two UEs, as discussed in detail above with reference to FIG. 20. No range or AoA estimation is performed between fixed BSs because their known locations and array orientations deliver their distance and AoAs as if virtual range and AoA measurements had been performed. In this case, although the angle between the links connecting UE to the two BSs (denoted by $\theta_{12}$) is not measured directly, it can be estimated from AoA measurements $\theta_{01}$ and $\theta_{02}$ along with fixed BSs' antenna orientations $\eta_1$ and $\eta_2$ according to $\theta_{12}=\pi-\theta_{01}-\theta_{02}-\eta_1-\eta_2$. This information and the fact that the inter-BS link is presumably LoS can be used in equation 34 to assess the presence or absence of LoS. A type (a) path is expected to yield more accurate LoS labels, whereas a type (b) path relies on an assumption of having LoS SL upon which the hypothesis testing in equation 34 can be conducted. The only significant differences between the two types (a) and (b) is that the LoS assumption on the SL in type (b) is replaced by a "virtual" LoS link between BSs in type (a), and the approximation above for equation 33 in the case of an SL link being much shorter than the UE-BS links might not apply, depending on the distance between the BSs in type (a).

To potentially improve confidence on the SL in type (b) being truly LoS, the connectivity graph may be pruned by removing edges corresponding to SLs for which received power falls below a threshold $p^0$. This is a graph with a set of edges given by $$E'=\{E: p_{v,v'}>p^0, v\in \mathcal{N}_{UE}{}^{v'} \wedge v'\in \mathcal{N}_{UE}{}^{v}\} \qquad 35$$

where E is given by equation 24 above. With such pruning, only close-by connections participate in establishing triangular connectivity paths, which increases the chance of LoS on SL.

To reduce ambiguity that may remain from NLoS labelling due to "indecisive" spatial diversity labels, such as $w_{v,v}=0$ in an example above, it is possible to apply the following logic: If a UL/DL edge $(v,v')\in E'$ has already been labelled as an NLoS link, with $w_{v,v}=1$ in an example above, then it is excluded from further consideration. Otherwise, the hypothesis testing using equation 34 is conducted on $(v,v')$. It should be appreciated, however, that spatial diversity techniques and angular diversity techniques are not dependent upon each other. Although both techniques are based on closed connectivity paths, these techniques could be applied independently of each other and not necessarily in combination.

The same edge in a connectivity graph may be a side to many triangles, and with the evaluation of equation 34 being a threshold-dependent decision, one edge could be identified both LoS and NLoS based on equation 34. With $n_{v,v'}{}^1$ denoting the number of times an edge $(v,v')$ was identified LoS and $n_{v,v'}{}^2$ denoting the number of times it was inconclusive, where $n_{v,v'}=n_{v,v'}{}^1+n_{v,v'}{}^1$ is the number of connectivity graph triangles of which $v,v'$ is a side, then the following voting is carried out based on $n_{v,v'}{}^1$ and $n_{v,v'}{}^2$ in some embodiments $$w_{v,v'} = \begin{cases} -1 & n^1_{v,v'} \geq n^2_{v,v'} \\ 0 & n^1_{v,v'} < n^2_{v,v'} \end{cases} \qquad 36$$

where $w_{v,v}=-1$ denotes LoS and $w_{v,v}=0$ reflects the indecisive nature of that link. Training an NN with such labelled data, however, may still yield a model that can predict labels for channels with indecisive labels in training data. Equation 36 represents one embodiment, and in another embodiment the equality condition $n_{v,v'}{}^1=n_{v,v'}{}^2$ is assigned to $w_{v,v}=0$.

Various embodiments that involve range and/or angle measurement or estimation are described above and elsewhere herein. Range measurement or estimation between UEs need not necessarily be restricted only to Radio Frequency (RF) measurement. Other ranging techniques may also or instead be exploited in order to measure or estimate range, such as ultrasound systems, radar-based ranging, laser distance estimation, and vision/camera processing for example. As long as range estimates between UEs are available, LoS/NLoS labels can be created for training or otherwise developing a model. Similar comments apply to range estimation or measurement between UEs and BSs, and to angle estimation or measurement.

Some embodiments take spatio-temporal information into account. In mobile cellular networks, connectivity changes over time. For generation or collection of labelled data based on connectivity as disclosed herein, it may be preferable for edges to be regularly added to or eliminated from the full connectivity graph. See FIG. 22, for example, which includes block diagrams illustrating another example wireless communication network with a moving UE, and simplified views of connectivity graphs.

Figure 22:
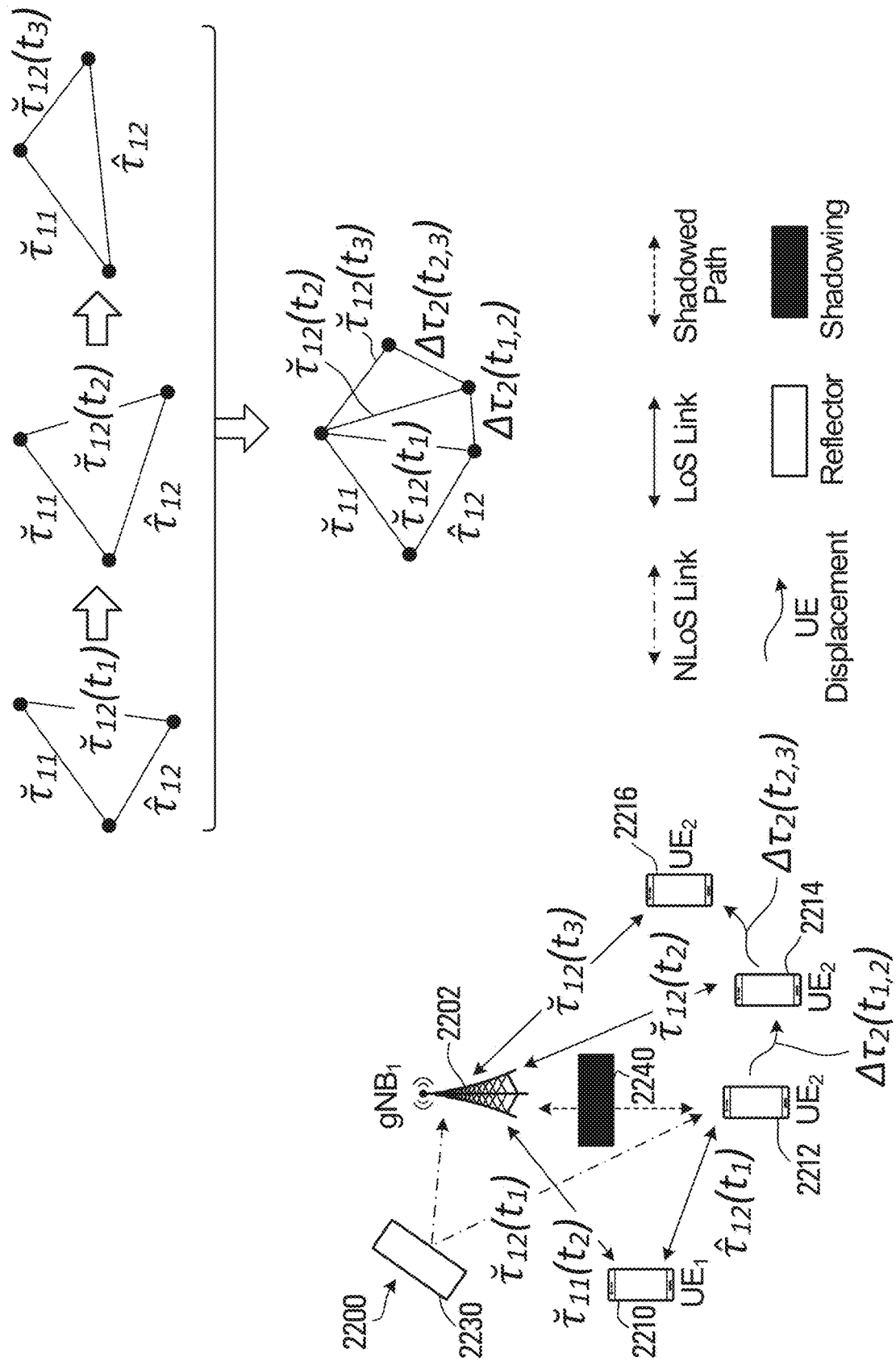
FIG. 22 includes block diagrams illustrating another example wireless communication network with a moving UE, and simplified views of connectivity graphs.

The example wireless communication network shown at 2200 in FIG. 22 includes a BS 2202, shown by way of example as a gNB, and two UEs. $UE_1$ is stationary at a position 2210 in the example shown, and $UE_2$ moves between positions 2212, 2214, 2216 over time. The operating environment of the UEs includes obstacles in the form of a reflector 2230 and a shadowing obstacle 2240. Links are shown in FIG. 22 in the same way as in FIG. 20.

Range estimates in UL/DL/SL between the BS 2202, the stationary $UE_1$ and the mobile $UE_2$ are shown in the network block diagram at 2200, simplified connectivity graphs at times $t_1$, $t_2$, $t_3$ are shown at the upper right in FIG. 22, and a simplified spatio-temporal connectivity graph shown at the lower right in FIG. 22. A spatio-temporal connectivity graph may be generated when displacements $\Delta \tau_2(t_{t,t+1})$ are available.

As illustrated in FIG. 22 at 2200 and the connectivity graphs at the upper right, edges in the connectivity graph change or "expire" and become stale if UEs change location. It may be that only UEs are aware of their intra-cell and/or intra-beam mobility. For example, tracking at a BS whether or not a UE has moved may involve monitoring the Doppler shift of signals received from that UE, which is erroneous when the UE-BS link is NLoS. Therefore, in some embodiments UEs signal their movement to a BS and/or another component that maintains a connectivity graph so that the connectivity graph can be updated accordingly. Alternatively, if a BS or another component that maintains a connectivity graph knows or can estimate or predict how much a UE has moved within a certain time interval, then edges need not necessarily be removed from a connectivity graph as quickly as in other embodiments, so that spatio-temporal diversity can be exploited. The time interval over which edges are maintained in a connectivity graph instead of being removed after UE movement may depend on such factors as the speed of the UE, whether there is acceleration or sudden turns on the part of the UE, etc. As an approximate guide, movement time intervals for spatio-temporal diversity are expected to be on the order of seconds rather than minutes or hours, for example.

Tracking the displacement of UEs is possible through such devices as inertial sensors in IMUS, or odometers in wheel-based systems if a UE is or is associated with a vehicle, for example. Some IMUs are built from micro electro-mechanical sensors that measure the change in capacitance in order to record a terminal's line acceleration and angular velocity in three orthogonal directions, for example. For the purposes of connectivity, we are interested in knowing displacement, and only 3D accelerations of a UE v, which can be expressed as a vector $a_v(t)=(a_x{}^v(t), a_y{}^v(t), a_z{}^v(t))$, $\forall v \in \mathcal{N}_{UE}$, can be used to derive displacement $$\Delta \tau_v(t, t+\Delta t) = \frac{1}{C^{EM}} \left| \int_t^{t+\Delta t} \int a_v(t') dt' \right|_2, \; v \in \mathcal{N}_{UE} \qquad 37$$

where $C^{EM}$ denotes electromagnetic wave propagation speed.

A connectivity graph that is obtained or maintained in this way, to retain edges after a UE has moved, may be more dense or much less sparse than a purely spatial connectivity graph, thereby potentially offering more information to tighten bounds of constraints such as equation 28. Higher density of a connectivity graph that exploits spatio-temporal information is readily apparent from a comparison of any of the three individual spatial connectivity graphs at the top right in FIG. 22 with the spatio-temporal connectivity graph at the lower right in FIG. 22, which includes nodes corresponding to all three positions of $UE_2$ and edges associated with all of those positions instead of just one node and associated edges for a single position of $UE_2$.

Such higher density in a connectivity graph may increase the likelihood of generating more accurate NLoS/LoS training labels, and/or being able to generate decisive or definitive labels for more links. The $\Delta \tau_v(t, t+\Delta t)$ displacements may be transmitted by a UE to a BS, a positioning server, and/or another component that maintains a connectivity graph by all UEs, periodically and/or when a UE is moved a certain distance. These displacements can be deemed as virtual range estimates as if the information collected from one UE at multiple different locations at different times had been collected from multiple UEs at those locations in one snapshot, and can be used to make the connectivity graph more connected, denser, or less sparse.

It should be noted that displacement-based updates and retention of edges in a connectivity graph may supplement but not entirely replace other connectivity graph updating. For example, acceleration estimates are noisy and inaccurate because $$a_v(t) = \bar{a}_v(t) + n_v(t) \qquad 38$$

where $\bar{a}_v(t)$ is the ground truth acceleration of a UE and $n_v(t)$ is an additive noise term. This being the case, the double-integration of noise in equation 37 causes the estimated displacements to continuously drift away from actual displacement. Therefore, UEs might also send a "displacement flag" or other indication to a positioning server or other component that maintains a connectivity graph, to signal that sufficient movement has been made since the last update to warrant updated SL range estimates rather than additional displacement-based updates from the UE. A UE could instead just stop sending displacement information and revert to determining and sending a range estimate after a certain number of displacement updates have been sent, a certain amount of time has elapsed since the most recent range estimate, and/or after the UE has been moved by more than a certain distance. These conditions are also examples of conditions that may trigger sending of a displacement flag by a UE. It should also be appreciated that sending a displacement flag and/or otherwise initiating a new range estimate may be performed by one or more other components in a communication network, and not only by a UE.

Turning now to training, in some embodiments an NN is trained, by a positioning server in some embodiments, with a training set $\mathcal{T} = \{(x_l, w_l)\}_l$, which may be continuously incremented. The training set may contain data in UL/DL to/from different BSs and SL among different UEs. This means that a single NN may be trained, rather than having several NNs. If the goal were to predict LoS/NLoS only in UL and DL, then it is possible to have one NN per BS. However, in order to also predict LoS/NLoS on SL, the problem of developing an NN for each UE becomes computationally challenging.

With three-state labels, for NLoS, LoS, and indecisive or unknown as discussed at least above, the problem of LoS identification can be cast as a classification problem. In order to make the classification problem possible, in some embodiments labels are converted to a "one-hot" or a single binary "1" value encoded representation as follows $w=1 \rightarrow [1,0,0]$ $w=0 \rightarrow [0,1,0]$ $w=-1 \rightarrow [0,0,1]$  39

This is an example only, and other encoding or labeling may be applied in other embodiments.

Figure 23:
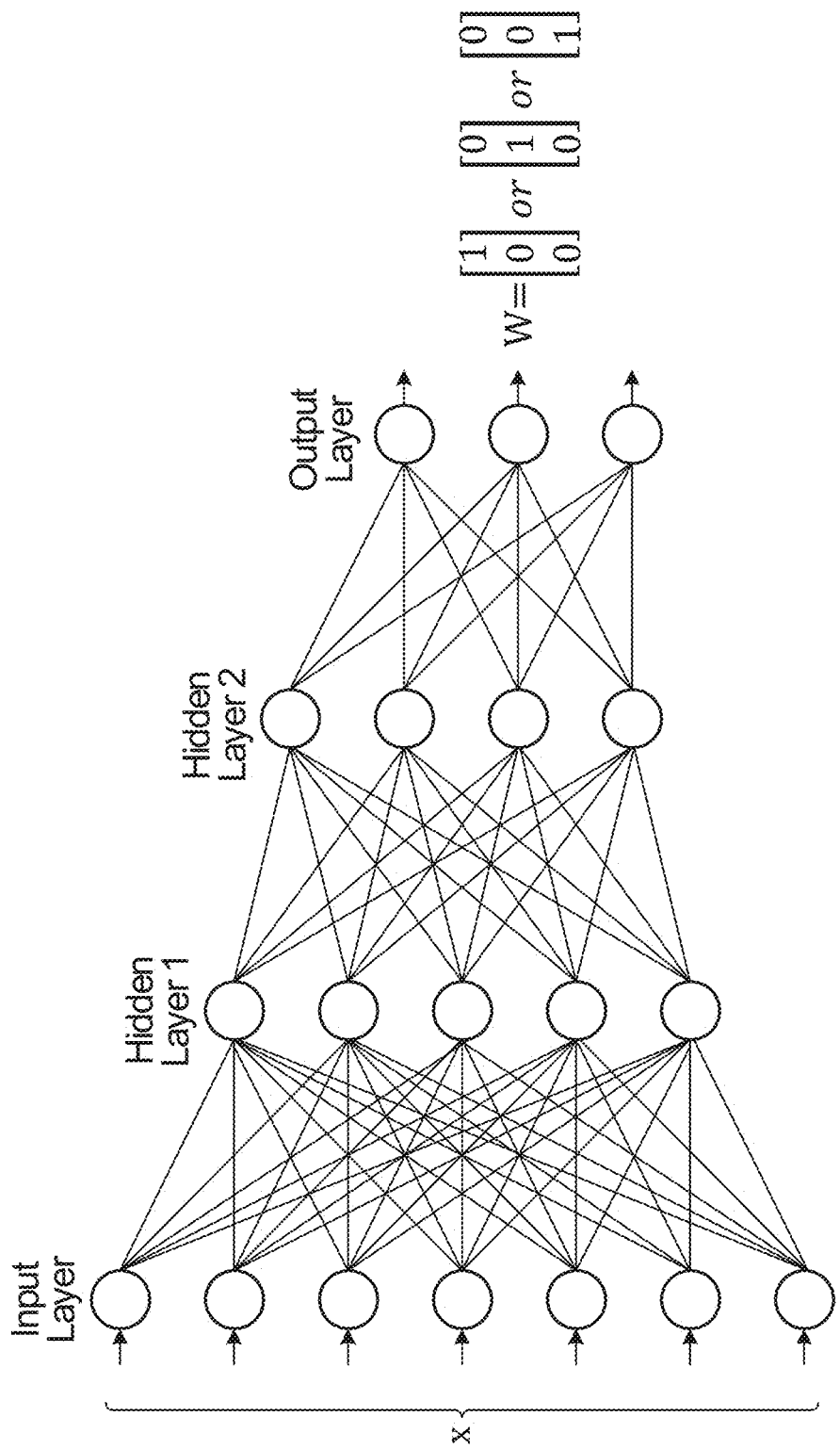
FIG. 23 is a schematic diagram of an example neural network according to an embodiment.

FIG. 23 is a schematic diagram of an example NN according to an embodiment. The example NN in FIG. 23 is a feed forward and Fully Connected NN (FCNN), with several layers to transform an input at the left to a three-state output at the right. In FIG. 23, neurons are shown as circles, branches are shown as lines, and layers are arranged by column. Although a feed forward FCNN as shown in FIG. 23 may be trained using collected training data and used to predict LoS/NLoS status of links, this is just an illustrative example. Other NNs may be used in other embodiments, such as Convolutional NNs (CNNs), Recurrent NNs (RNNs), etc. The present disclosure is not limited to any particular type of NN.

Considering the example NN in FIG. 23, in some embodiments the input to the NN is a cross-covariance tensor x of channel data, vectorized into a long vector $x_l \leftarrow \text{vec}(x_l)$ for training. As described in detail elsewhere herein, collection of training samples may exploit spatial, angular, and/or temporal diversity. Label criteria for generating labels for training data as disclosed above may be summarized as follows $$\begin{cases} \mathcal{H}_1 & \hat{\tau}_{v,v'} \geq d^*_{v,v'} \\ \mathcal{H}_0 & \overline{d}_{a,b} \approx d_{a,b} \\ \mathcal{H}_{0,1} & \hat{\tau}_{v,v'} < d^*_{v,v'} \vee |\overline{d}_{a,b} - d_{a,b}| \gg 0 \end{cases} \Rightarrow \begin{cases} \mathcal{H}_1 & w_{v,v'} = 1 \\ \mathcal{H}_0 & w_{v,v'} = -1 \\ \mathcal{H}_{0,1} & w_{v,v'} = 0 \end{cases}$$

A training sample $(x_{v,v'}(t), w_{v,v'}(t))$ is generated for every edge $(v,v') \in E$ of a connectivity graph to build a training set $\mathcal{T} = \{(x_{v,v'}(t), w_{v,v'}(t))_{v,v',t}\}$ across space and time, and labels are encoded according to one-hot encoding in some embodiments, such as for training the example NN in FIG. 23.

The data in the training set are provided to an NN whose loss function is a binary cross-entropy in some embodiments $$\mathcal{L}_1(W) = -\sum_{l=1}^{|\mathcal{T}|} \sum_{p=1}^{3} w_{l,p} \log(f_w^{M1}(x_l)[p]) \quad 40$$

where $f_w^{M1}(x_l)[p]$ is pth output of the NN, and W denotes the weight tensors, not to be confused with labels $w_l$, of the FCNN at all layers that are to be learned through the following minimization in some embodiments $$W^* = \underset{W}{\operatorname{argmin}} \mathcal{L}_1(W) \quad 41$$

Note that for equation 40 to be well-defined, outputs $f_w^{M1}(x_l)[p] \in [0,1]$, $\forall l,p$, a constraint that is satisfied if a softmax activation is applied to the output layer, for example.

Once the model is trained, it can be used to infer whether a link is LoS or NLoS. In some embodiments, this involves observing a new channel in UL, DL, or SL to obtain h, applying the same preprocessing as done for training data to get x, and then finding $$\begin{cases} \mathcal{H}_1: f_{W^*}^{M1}(x)[1] > \max(f_{W^*}^{M1}(x)[2], f_{W^*}^{M1}(x)[3]) \\ \mathcal{H}_0: f_{W^*}^{M1}(x)[3] > \max(f_{W^*}^{M1}(x)[1], f_{W^*}^{M1}(x)[2]) \\ NaN: f_{W^*}^{M1}(x)[2] > \max(f_{W^*}^{M1}(x)[1], f_{W^*}^{M1}(x)[3]) \end{cases} \quad 42$$

where $f_{w^*}^{M1}(x)$ [$1 \leq j \leq 3$] denotes jth output of the 3-states NN, $\mathcal{H}_1$ is the NLoS hypothesis on the link with channel tensor x, $\mathcal{H}_0$ is the LoS hypothesis on the link with channel tensor x, and NaN is a symbol denoting an indecisive state on the link with channel tensor x.

Whereas training is expected to be carried out by network-side strong AI engines with large processing units connected to unlimited power sources as opposed to battery-driven UEs, performing inference can be done by UEs. This may be especially practical in embodiments in which cellular chipsets come with a separate AI unit that can perform inference quickly and efficiently, as is now often the case.

UE-based inference might also be preferred when SL measurements are involved. If UEs are to use NLoS/LoS predictions but do not themselves run the model, then they will have to send live measurements $T_v^{SL}\{(x_{v,v'}, \hat{\tau}_{v,v'}, \text{id}_{v'})\}$: $v' \in \mathcal{N}_{UE}^v\}$, $v \in V$, or at least signaling indicative of observed channel data, to another component of a communication network so that the model is run to predict whether a link (v,v') is a LoS link or an NLoS link: $w_{v,v'} = f_{w^*}^{M2}(x_{v,v'})$. The channel tensors $x_{v,v'}$ that are used in some embodiments, for example, can be of very high dimension. It can therefore be quite resource intensive for SL inference to be performed at BSs or other network components.

Although $T_v^{SL}$ are also sent in UL in some embodiments to establish a connectivity graph and generate training data, it should be noted that training and retraining are expected to happen much less frequently than inference. Therefore, a more practical solution, in terms of communication resource usage, may be to transfer the model to UEs once training or retraining is completed. A model for a geographical area that is covered by several BSs, for example, can be broadcast to all UEs for the first time after initial training, instead of being unicast. For subsequent retraining, weights in an NN may be initialized to the most recent optimal configuration, and the NN can then be retrained in substantially the same way as initial training but with a new or updated training set. When retraining is complete, an update such as only the weights that have changed by a certain amount, along with the locations of those weights in the model, may be distributed to UEs.

A model may be defined at least in part in a large database of weights, which may be hundreds of Megabytes to several tens of Gigabytes depending on the capacity of the model. Due to changes in environment caused by such factors as mobility and/or phase-in/phase-out of obstacles such as signal scatterers and reflectors, periodic retraining may be preferred in wireless applications. Although a model may be broadcast or otherwise transferred to UEs in some embodiments to enable UEs to perform inference, it may be impractical to transfer the entire model to each UE every time the model is retrained.

Fortunately, the operating environment in a wireless communication network does not typically change so abruptly as to require full retraining. In some embodiments, a model is retrained with only limited batches of online retraining data. For example, retraining data may be collected only from certain coverage areas that are known or expected to have changed, or only retraining data that is expected to modify some but not all of the NN weights in the model may be collected. Even full retraining using data collected from an entire coverage area is unlikely to change every weight in a model. As such, a positioning server or other network equipment can send to UEs only those weights that changed, or changed significantly by more than a threshold amount, with the positions of those particular weights in the NN model as noted at least above. This can significantly reduce the burden of communicating a large NN model to every UE every time the model is retrained.

Thus, in some embodiments, a full trained model is distributed to UEs only once, and thereafter only changes are distributed to the UEs after retraining.

With the model known at the UE v, the UE can run input data, such as channel data $x_{v,v'}$ that it observed in DL and SL, through the model to predict whether each of the DL and SL links to which it is connected is LoS or NLoS, and form the following sets in an embodiment $$\mathcal{N}_{LoS\text{-}UE}^v = \{v': f_{w^*}(x_{v,v'}) \approx -1 \wedge v' \in \mathcal{N}_{UE}^v\}$$

$$\mathcal{N}_{LoS\text{-}BS}^v = \{v': f_{w^*}(x_{v,v'}) \approx -1 \wedge v' \in \mathcal{N}_{BS}^v\}$$

$$\mathcal{N}_{LoS}^v = \{v': f_{w^*}(x_{v,v'}) \approx -1 \wedge v' \in \mathcal{N}^v\} \qquad 43$$

According to equation 43, $\mathcal{N}_{LoS\text{-}UE}^v$ and $\mathcal{N}_{LoS\text{-}UE}^v$ are, respectively, the set of all UEs and the set of all BSs, on the full-connectivity graph G, that have an LoS path to v, and $\mathcal{N}_{LoS}^v = \mathcal{N}_{LoS\text{-}UE}^v \cup \mathcal{N}_{LoS\text{-}BS}^v$. In some embodiments, signaling indicative of the set $\mathcal{N}_{LoS}^v$ is then forwarded by all UEs to a network component that maintains a connectivity graph, so that the connectivity graph can be pruned to only retain edges that are associated with LoS links and therefore are not associated with NLoS. This pruned graph can be denoted $G^{LoS} = (V^{LoS}, E^{LoS})$. The same result could be achieved by determining sets that do not include elements of $\mathcal{N}_{LoS\text{-}UE}^v$ and $\mathcal{N}_{LoS\text{-}BS}^v$ and sending signaling that is indicative of such sets. In other words, inference may identify LoS or NLoS/unknown sets, and pruning could be based on indications of LoS or indications of NLoS/unknown.

Several different embodiments are envisioned to integrate aspects of the present disclosure into network architecture, depending on whether inference is to be performed by UEs, and/or at a network side such as by a Location Management Function. It is expected, however, that training using network resources will generally be preferred, given that training can be an extremely resource-intensive process that is not particularly suited to UEs with more limited power, computation resources, and memory.

A positioning server is an example of network equipment by which features disclosed herein may be provided in some embodiments, and includes at least a transmitter and receiver to support communications with other devices such as BSs and/or UEs, and a processor and/or other components configured to support positioning determination. A positioning server is also an example implementation of a Location Management Function (LMF).

A primary goal of LoS identification is to identify NLoS links and exclude them from position estimation. Therefore, an important consideration is how LoS SL range measurements between a UE v and another UE v'∈ $\mathcal{N}_{LoS\text{-}UE}^v$ can be used for positioning determination, with the UE locations $z^v = (z_1^v, z_2^v, z_3^v)$ and $z^{v'} = (z_1^{v'}, z_2^{v'}, z_3^{v'})$ both being unknown. Another application of the proposed LoS identification method is in exploiting the knowledge as to whether a link is NLoS in order to improve robustness of that link for future communications. For instance, if the UE on the transmitting side of an SL knows with high probability that its link to the receiving side is an NLoS link, then it may adjust its Modulation and Coding Scheme (MCS) and/or transmit power, for example, to reduce the likelihood that communications will undergo severe degradation, that retransmission will be necessary, etc.

In some embodiments, collaborative localization is used for UE position determination, based on range estimates performed in UL, DL, and SL along with the known locations of anchors. This is different from current positioning approaches in cellular systems where the network localizes each UE through solving a separate optimization problem. Instead, with SL information available, there will be one entangled position estimation problem for many UEs at the same time. This is considered in further detail below with reference to FIG. 24, which is a block diagram of a further example communication network, and illustrates cooperative UE positioning determination.

Figure 24:
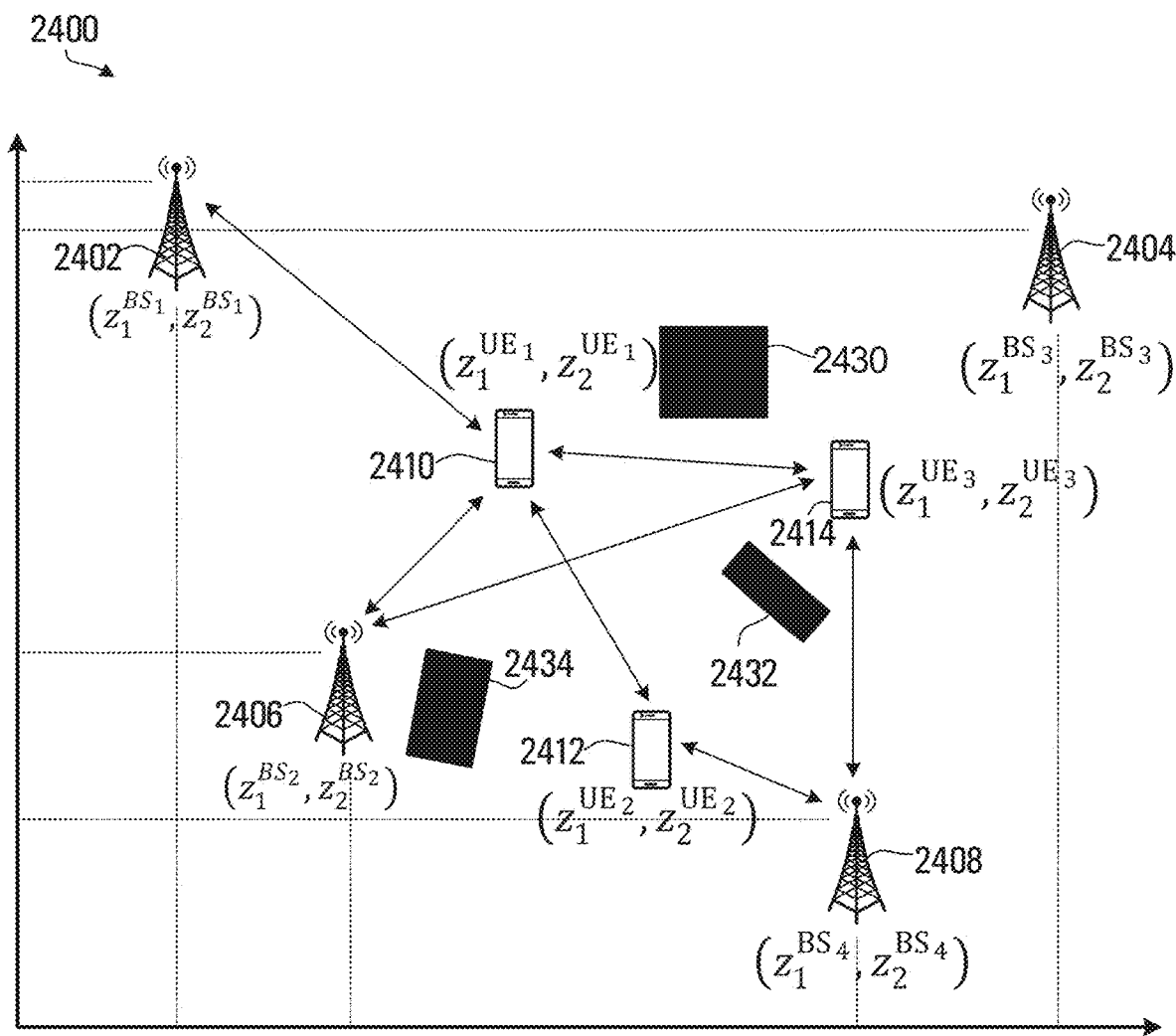
FIG. 24 is a block diagram of a further example communication network, and illustrates cooperative UE positioning determination.

The example wireless communication network 2400 includes BSs 2402, 2404, 2406, 2408 and UEs 2410, 2412, 2414, and the operating environment of the UEs includes obstacles 2430, 2432, 2434. FIG. 24 is intended to illustrate cooperative localization or positioning determination for three UEs with four BS anchors of known locations ($z_1^{BS_v}$, $z_2^{BS_v}$), v=1 ... 4 in 2D space, after identifying NLoS links and eliminating them from the final estimation problem. Therefore, only LoS links are shown in FIG. 24.

Locations of UEs may be considered sensitive information, and therefore in some embodiments joint position estimation for UEs is not performed at UEs but rather at a positioning server or other network equipment so that confidentiality of location information is maintained.

In the most general case, the Maximum Likelihood (ML) formulation of the positioning problem is given by $$\max_{\{z^v, v \in V^{LoS} \setminus V_{BS}\}} \text{Loss} = \prod_{t=1}^{T} \prod_{(a,b) \in E^{LoS}} \mathcal{L}(\tau_{a,b}(t) | z^a, z^b) \qquad 44$$

where T samples from each snapshot of the network are collected within a stationarity region in some embodiments in order to smooth the estimation. Assuming the measurement model induces Gaussian noise with similar variance, equation 44 reduces to a Minimum Mean Squared Error (MMSE) problem $$\min_{\{z^v, v \in V^{LoS} \setminus V_{BS}\}} -\log(\text{Loss}) = \prod_{t=1}^{T} \prod_{(a,b) \in E^{LoS}} \left(\tau_{a,b}(t) - \frac{1}{C^{EM}}|z^a, z^b|_2\right)^2 \qquad 45$$

This is a non-convex optimization problem that is commonly encountered in the positioning domain. There are also other approaches to solve this problem, through a message passing algorithm for example.

Various embodiments are described in detail above, primarily in the context of how elements in a communication network operate and interact. FIG. 25 is a signal flow diagram illustrating signaling according to an embodiment.

Other embodiments may involve similar signaling, at least during initial stages of training for example.

In the signal flow diagram 2500, two UEs including UE1 and UE2, a gNB, an LMF, and an AI engine are involved in a training phase 2510. The gNB, the LMF, and the AI engine are network-side components, and may be implemented together in network equipment or separately. Although only two UEs and only one gNB are shown in FIG. 25 to avoid congestion in the drawing, data collection during training, and similarly operation of a communication network, are expected to involve more than two UEs and more than one gNB.

Reference signaling from UE1, shown by way of example as SL Positioning Reference Signal (PRS) signaling, is transmitted to UE2 at 2512. Based on this reference signaling, at 2514 UE2 estimates SL range and channel data, and calculates a channel tensor in the example shown. UE2 also transmits signaling to the LMF at 2516. The signaling includes or is otherwise indicative of the SL channel tensor, the SL range estimate, and an identifier $id_1$ of UE1. UE2 also receives DL-PRS reference signaling from the gNB as shown at 2518, estimates range and channel data and calculates a channel sensor for the DL from the gNB at 2520, and transmits, to the LMF at 2522, signaling that includes or is otherwise indicative of the DL channel tensor and the DL range estimate, and in some embodiments an identifier (not shown) of the gNB. The transmission at 2522 is labeled as "UL/DL" in the drawing, which would be the case in embodiments with UL/DL channel reciprocity. DL channel tensors and range estimates for a UE-BS pair may or may not apply to UL between the same UE-BS pair.

It should also be noted that UE1 and/or the gNB may similarly receive reference signaling, estimate or calculate range, channel data, and channel tensors for one or more links, and transmit signaling to the LMF. This is not shown in FIG. 25 to avoid further congestion in the drawing.

At 2524, 2526, FIG. 25 illustrates optional signaling indicative of IMU-based displacements by the UEs to the LMF.

Connectivity graph generation and label generation by the LMF, based on received signaling, is shown at 2528. A training data set that includes or is otherwise indicative of channel tensors and generated labels is signaled to the AI engine by the LMF, and is used in training an NN-based model at 2530. NN weights are signaled to the LMF at 2532. In the embodiment shown, the NN weights, or at least changed weights in the case of retraining, are also signaled to UE2 at 2534, and may be broadcast to all UEs. It should be noted that not all embodiments involve inferencing at UEs and therefore NN weights need not necessarily be signaled to a UE in all embodiments.

In an operations phase or stage 2540 in the example shown, inferencing is performed at UE2. UE2 receives SL-PRS signaling 2542 from UE1, and performs SL NLoS prediction at 2544 based on the received signaling. Although not explicitly shown at 2544 to avoid further congestion in the drawing, UE2 may estimate channel data based on the reference signaling received at 2542 and calculate a channel tensor for input to an NN based on the channel data. Similarly, DL NLoS prediction may be performed by UE2 at 2548 based on PRS signaling 2546 received from the gNB.

FIG. 25 also illustrates optional signaling from UE2 to the LMF at 2550. The signaling at 2550 includes or is otherwise indicative of UEs and/or BSs, such as either or both of UE1 and the gNB in FIG. 25, with which UE2 has a LoS link. This signaling is shown by way of example as including LoS neighbor IDs, but other forms of signaling are also possible.

The signaling at 2550 enables pruning of a connectivity graph by the LMF, as shown at 2556. Positioning determination or location estimation as shown at 2558 is not necessarily dependent upon graph pruning at 2556 in all embodiments.

Retraining may be initiated in response to any of various conditions, and two examples of signaling that may initiate retraining are shown at 2552, 2554. A displacement flag, as indicated above, may be signaled by a UE that has been providing displacement updates. The displacement flag 2552 in FIG. 25 is illustrated as being signaled to the AI engine by the LMF, as another example. A decision to halt or suspend displacement updates and retrain a model may be made at the LMF, or another component, and not at a UE or at least not only at a UE.

Signaling of a new or updated batch of training data at 2554 may also or instead trigger retraining. PRS signaling may be communicated between UEs and BSs during normal operations associated with establishing and/or maintaining links, and accordingly training data collection and label generation may be ongoing, so that a new or updated training data set is available whenever retraining is to be performed. Retraining may be requested or initiated by any of the components illustrated in FIG. 25 or automatically, based on any one or more of: a threshold amount of time since previous training or retraining, movement of one or more UEs by more than a threshold distance, an error detection rate above a threshold, and/or any of various other factors, for example.

Retraining may proceed in much the same manner as shown at 2510 in FIG. 25, although in the case of retraining it is possible that only changed NN weights and their locations within the model are signaled to UEs at 2534 and/or to the LMF at 2532. NN weights before and after retraining may be compared, by the LMF for example, to detect changed weights or weights that have changed by more than a threshold amount, to be signaled to UEs.

Other variations in FIG. 25 are also possible. For example, NN weights need not be distributed to UEs if inferencing is performed at the network side, by the LMF in in FIG. 25 for example. During the operations phase 2540, a UE may transmit an SL and/or DL channel tensor to the LMF, and the LMF then performs NLoS inferencing for the SL and/or DL and signals information indicative of the results back to the UE and/or to one or more other components that are to use the results.

There are also various options for the signaling shown in FIG. 25. For example, range estimates, channel tensors, and possibly displacements are to be sent by UEs in uplink, to an LMF in some embodiments. Network equipment such as the gNB may advise each UE as to whether the UE is to communicate signaling associated with such information and if so, on which communication resources. This may be done by allocating a portion of format0 Downlink Control Information (DCI) in Physical Downlink Control Channel (PDCCH) to this task, for example. Each UE can use the common and dedicated search space in order to decode DCI to determine whether it is obliged to send range, tensor, and/or displacements, and over which resources.

When an NN model is to be transferred to UEs, this may be done by broadcast. To broadcast the model, which is expected to happen infrequently, UEs need to be able to determine the communication resources over which they can recover the model. Given the fact that NN models are expected to include millions of parameters, model transfer to transmit an entire model, or even a part of a model, might not be done through PDCCH due to the limitations of resources.

One possible option is to use format1 at DCI to inform UEs as to the resources, such as Resource Blocks (RBs), during which symbols will carry weights of a model so that each UE can recover the model. In one embodiment, once the model is available at UEs, inference is performed at the UEs. To the extent that inferred LoS status information is to be signaled to one or more network components such as the LMF as shown at 2550, Uplink Control Information (UCI) may be used to declare to the network component(s) the resources, such as RBs and symbols, of a UE carry that information.

Various embodiments are described in detail above. Disclosed features may be implemented in any of various ways and/or in any of various subsets or combinations, as described by way of example below. FIG. 26 is a flow chart illustrating an example of a method performed by a UE in an embodiment.

The example method 2600 includes receiving, at 2602, signaling that is associated with a direct wireless communication link between the first UE and a second UE. In an embodiment, signaling that is associated with a direct wireless communication link may be or include SL-PRS signaling, as shown by way of example at 2512 in FIG. 25. The example method 2600 also involves transmitting, at 2604, to network equipment in the wireless communication network, signaling that includes or is otherwise indicative of an estimate of range between the first UE and the second UE. The estimate of range is based on the received signaling. Signaling indicative of a range estimate is shown by way of example at 2516 in FIG. 25.

The network equipment to which the signaling is transmitted at 2604 may be, for example, a base station or other network equipment that is configured to build or maintain a connectivity graph or is otherwise involved in training or developing a prediction model as disclosed herein. The network equipment may implement an LMF as shown in FIG. 25, for example. In other embodiments, the network equipment to which the signaling is transmitted at 2604 is not itself directly involved in building or maintain a connectivity graph or is otherwise involved in training or developing a prediction model. A UE may transmit signaling at 2604 to a base station, which in turn relays that signaling to an LMF, for example.

The signaling that is transmitted at 2604 may include or otherwise be indicative of other information. For example, in some embodiments such signaling is further indicative of channel data estimated based on the received signaling. The channel data may be or include, for example, a transformed version of raw channel data that is estimated based on the received signaling. Chanel tensors referenced herein represent an example of such transformed raw channel data. An identifier as shown at 2516 in FIG. 25 is another example of additional information that may be included or otherwise indicated in the signaling that is transmitted at 2604.

Other operations may be performed in some embodiments. An example is shown at 2606, which involves transmitting to the network equipment signaling that is indicative of displacement of the first UE subsequent to transmitting the signaling indicative of an estimate of range at 2604. This is shown by way of example as IMU-based displacements at 2524, 2526 in FIG. 25.

These operations in FIG. 26 may be repeated, for multiple links, multiple UE positions, and/or retraining of a prediction model for example, as illustrated by the dashed return arrows between 2604, 2602 and 2606, 2602.

Some embodiments also or instead involve receiving signaling that is associated with a downlink communication link between the first UE and a network component in the wireless communication network. The network component from which such signaling is received may be, but need not necessarily be, the network equipment to which the signaling is transmitted at 2604. For example, as shown in FIG. 25, signaling indicative of a range estimate may be transmitted by UE2 to the LMF at 2516, but UE2 receives signaling associated with a downlink communication link from the gNB at 2518.

As shown by way of example at 2522 in FIG. 25, a method may also involve transmitting, to the network equipment to which signaling was transmitted at 2604, additional signaling that is indicative of an estimate of range between the first UE and the network component. The estimate of range between the first UE and the network component is based on the received signaling that is associated with the downlink communication link. The additional signaling may also be indicative of other information, such as downlink channel data that is estimated based on the received signaling that is associated with the downlink communication link. An example of such downlink channel data is a transformed version of raw channel data that is estimated based on the received signaling that is associated with the downlink communication link, such as a downlink channel sensor. The additional signaling may also be indicative of an identifier of the network component and/or the downlink communication link.

In some embodiments, at 2608 a UE obtains a prediction model for prediction of LoS status of communication links, and prediction or inference is performed at a UE. Although a UE may itself train or otherwise develop a prediction model, it is expected that a prediction model will be developed at a network side. A UE may, for example, receive at 2608 signaling that is indicative of a prediction model. The prediction model is based in part on the estimate of range that is indicated in the signaling transmitted at 2604 as disclosed elsewhere herein, and the signaling may be received from the network equipment to which the signaling is transmitted at 2604.

It should be noted that 2606 and 2608 are intentionally not connected in FIG. 26, to illustrate that a UE that obtains a prediction model at 2608 need not necessarily have been involved in training or otherwise developing that prediction model by transmitting signaling to network equipment at 2604, 2606.

For prediction or inference based on the prediction model, at 2610 a UE receives signaling associated with a communication link. The signaling may be or include a channel tensor for example. Based on the signaling received at 2610, a prediction LoS status of the communication link is obtained from the prediction model. At 2612, signaling that includes or is otherwise indicative of the prediction is transmitted. The prediction signaling may be transmitted from a UE to an LMF for pruning, for example.

The prediction-related operations in FIG. 26 may be repeated. For example, predictions may be obtained from the prediction model for multiple links, as illustrated by the dashed return arrow between 2612 and 2610. The prediction model may be replaced or updated in some embodiments, with a subset of weights that have changed as a result of retraining for example, and this is illustrated in FIG. 26 by the dashed return arrow between 2612 and 2608.

Other embodiments may include additional, fewer, and/or different operations, performed in a similar or different order.

FIG. 27 is a flow chart illustrating an example of a method performed by network equipment in an embodiment. The example method 2700 is intended to be illustrative of a method that may be performed at any of various types of network equipment. Consider, for example, the operations 2702, 2706, and 2708, which relate to receiving signaling that is indicative of an estimate of range, obtaining a prediction model, and transmitting signaling that is indicative of the prediction model. These operations could be performed, for example, at a BS, an LMF, or an AI engine.

With reference to FIG. 25, the LMF may receive signaling that is indicative of an estimate of range associated with a direct wireless communication link between a first UE and a second UE in a wireless communication network, in particular UE1 and UE2, as shown at 2516. The LMF may also obtain a prediction model, from the AI engine in this example, by receiving signaling that is indicative of the model, in the form of the weights at 2532 in the example shown. The prediction model is for prediction of LoS status of communication links in the wireless communication network, as disclosed elsewhere herein. The signaling at 2534 is illustrative of transmitted signaling that is indicative of the prediction model. This is one example implementation of the operations 2702, 2706, 2708 in FIG. 27.

Turning to the gNB in FIG. 25, UE2 may transmit signaling, which is indicative of an estimate of range associated with an SL between UE1 and UE2, to the LMF through the gNB, and similarly signaling indicative of the prediction model may be transmitted to UE2 through the gNB. At least in this sense, the gNB may perform the operation 2702 by receiving range estimate signaling from UE2, the operation 2706 by receiving prediction model signaling from the LMF, and the operation 2708 by transmitting the prediction model signaling to UE2.

An AI engine as shown in FIG. 25 may similarly receive signaling, obtain a prediction model by training, and transmit signaling that is indicative of the prediction model.

Thus, these and/or other operations illustrated in FIG. 27 are not necessarily limited to any particular type of network equipment. In some embodiments, operations such as those shown in FIG. 27 may even be performed elsewhere, including at one or more UEs if UE-side prediction model development and/or inference are supported for example.

FIG. 27 also illustrates, at 2712, transmission of signaling that is indicative of a prediction from the prediction model. A method may include either or both of 2708, 2712. In other words, a method may involve transmitting one or more of: signaling indicative of a prediction model for prediction of LoS status of communication links in the wireless communication network, and signaling indicative of a prediction, from the prediction model, of LoS status of one or more communication links in the wireless communication network. In either case, the prediction model is based in part on the estimate of range between the first UE and the second UE.

The signaling received at 2702 may also be indicative of other information, such as channel data that is estimated for the direct wireless communication link and/or an identifier, as disclosed elsewhere herein. The signaling received at 2710 may also or instead be indicative of channel data such as a channel tensor, for a communication link for which a prediction is to be made using the prediction model.

A method may include other operations. An example is shown at 2704, and involves receiving signaling that is indicative of displacement of the UE subsequent to determination by the first UE of the estimate of range for which signaling is received at 2702. As described elsewhere herein, such a displacement estimate may be used in training or otherwise obtaining a prediction model.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A method for estimating locations of obstacles to signal transmission in a wireless communication network, the method comprising:
   at a User Equipment (UE) in communication with the wireless communication network, in response to receiving a reference signal from a neighboring node via a non-line-of-sight (NLoS) transmission, transmitting an identification of the neighboring node to network equipment implementing the wireless communication network to facilitate estimating the locations of the obstacles to signal transmission based on estimates of a location of the UE and a location of the neighboring node,
   wherein the identification of the neighboring node is not transmitted in response to receiving the reference signal from the neighboring node via a line-of-sight (LoS) transmission.

2. The method of claim 1 wherein the neighboring node comprises a neighboring UE and the NLoS transmission comprises a sidelink transmission.

3. The method of claim 2 wherein the UE and the neighboring UE each comprise any one of a wireless transmit/receive unit (WTRU), a mobile station, a mobile subscriber unit, a cellular telephone, a station (STA), a machine type communication device (MTC), a personal digital assistant (PDA), a smartphone, a laptop computer, a touchpad, a wireless sensor, or a consumer electronics device.

4. The method of claim 1 further comprising processing the reference signal received at the UE from the neighboring node using a line-of-sight/non-line-of-sight (LoS/NLoS) prediction module to generate an inference as to whether the received reference signal was received via a LoS transmission or a NLoS transmission.

5. The method of claim 4 further comprising receiving LoS/NLoS prediction parameters at the UE from the network equipment for configuring the LoS/NLoS prediction module on the UE.

6. The method of claim 1 further comprising generating location information at the UE by receiving Global Positioning System (GPS) signals and further comprising transmitting the location information to the network equipment to facilitate estimation of the location of the UE.

7. The method of claim 1 wherein transmitting the identification of the neighboring node comprises transmitting an anonymized identifier included in the reference signal received by the UE from the neighboring node.

8. The method of claim 1 wherein the NLoS transmission comprises a downlink transmission.

9. The method of claim 1 wherein the non-line-of-sight (NLoS) transmission comprises a reference signal transmission having a propagation path that passes through an obstacle that acts as a shadowing obstruction between the neighboring node and the UE.

10. The method of claim 1 further comprising determining whether the non-line-of-sight (NLoS) transmission comprises a redirected reference signal transmission that has been reflected from the neighboring node to the UE by an obstacle.

11. The method of claim 10 wherein determining whether the non-line-of-sight (NLoS) transmission comprises a redirected reference signal transmission comprises:
generating a power delay profile (PDP) for the received reference signal at the UE; and
using the PDP to determine whether the non-line-of-sight (NLoS) transmission of the reference signal is associated with an indirect propagation path due to the reflection by the obstacle.

12. The method of claim 11 wherein generating a power delay profile comprises:
generating range estimates indicative of a range associated with a reference signal received from the neighboring node; and
determining a received power associated with the received reference signal.

13. The method of claim 10 wherein transmitting the identification of the neighboring node to network equipment comprises transmitting an indication that the reference signal associated with the NLoS transmission from the neighboring node was via an indirect propagation path.

14. A User Equipment (UE) for use in a wireless communication network, the UE comprising:
a transmitter and a receiver;
a processor in communication with the transmitter and receiver; and
a processor-readable memory in communication with the processor and storing processor-executable instructions which, when executed by the processor, cause the processor to perform a method comprising:
in response to receiving a reference signal at the receiver from a neighboring node via a non-line-of-sight (NLoS) transmission, causing the transmitter to transmit an identification of the neighboring node to network equipment implementing the wireless communication network to facilitate estimating locations of obstacles to signal transmission based on estimates of a location of the UE and a location of the neighboring node,
wherein the identification of the neighboring node is not transmitted in response to receiving the reference signal at the receiver from the neighboring node via a line-of-sight (LoS) transmission.

15. The method of claim 1, further comprising:
determining whether the received reference signal is received via the NLoS transmission,
wherein transmitting the identification in response to receiving the reference signal from the neighboring node via the NLoS transmission comprises transmitting the identification only in response to determining that the received reference signal is received via the NLoS transmission.

16. The method of claim 4, wherein transmitting the identification in response to receiving the reference signal from the neighboring node via the NLoS transmission comprises transmitting the identification only where the inference is that the received reference signal is received via the NLoS transmission.

17. The UE of claim 14, wherein the instructions, when executed by the processor, further cause the processor to process the reference signal received at the UE from the neighboring node using a line-of-sight/non-line-of-sight (LoS/NLoS) prediction module to generate an inference as to whether the received reference signal was received via a LoS transmission or a NLoS transmission.

18. The UE of claim 17, wherein the instructions, when executed by the processor, further cause the processor to receive LoS/NLoS prediction parameters at the UE from the network equipment for configuring the LoS/NLoS prediction module on the UE.

19. The UE of claim 14, wherein the instructions, when executed by the processor, further cause the processor to determine whether the non-line-of-sight (NLoS) transmission comprises a redirected reference signal transmission that has been reflected from the neighboring node to the UE by an obstacle.

20. A non-transitory processor-readable memory storing processor-executable instructions which, when executed by the processor, cause the processor to perform a method comprising:
at a User Equipment (UE) in communication with a wireless communication network, in response to receiving a reference signal from a neighboring node via a non-line-of-sight (NLoS) transmission, transmitting an identification of the neighboring node to network equipment implementing the wireless communication network to facilitate estimating locations of obstacles to signal transmission in the wireless communication network based on estimates of a location of the UE and a location of the neighboring node,
wherein the identification of the neighboring node is not transmitted in response to receiving the reference signal from the neighboring node via a line-of-sight (LoS) transmission.

* * * * *